(12) United States Patent
Noonan et al.

(10) Patent No.: US 9,936,442 B1
(45) Date of Patent: Apr. 3, 2018

(54) SYSTEM AND METHOD FOR WRIST BAND TRANSMITTER AND SYSTEM THEREOF

(71) Applicant: BINJ LABORATORIES, INC., Scituate, MA (US)

(72) Inventors: Joseph S. Noonan, Scituate, MA (US); James P. Noonan, Scituate, MA (US); Carl A. Giordano, Valley Cottage, NY (US); William T. Blake, Abington, MA (US)

(73) Assignee: Binj Laboratories, Inc., Scituate, MA (US)

( * ) Notice: Subject to any disclaimer, the term of this patent is extended or adjusted under 35 U.S.C. 154(b) by 0 days.

(21) Appl. No.: 15/292,087

(22) Filed: Oct. 12, 2016

Related U.S. Application Data

(63) Continuation-in-part of application No. 15/136,953, filed on Apr. 24, 2016, which is a continuation-in-part of application No. 15/046,378, filed on Feb. 17, 2016, and a continuation-in-part of application No. 13/936,166, filed on Jul. 6, 2013, now Pat. No. 9,344,992, which is a continuation-in-part of application No. 12/870,808, filed on Aug. 28, 2010, now Pat. No. 8,626,195, which is a continuation-in-part of application No. 12/510,036, filed on Jul. 27, 2009, now Pat. No. 8,983,446, which is a continuation-in-part of application No. 12/157,530, filed on Jun. 11, 2008, now Pat. No. 8,238,936, which is a continuation-in-part of application No. 11/457,786, filed on Jul. 14, 2006, now Pat. No. 8,078,190, said application No. 15/136,953 is a continuation-in-part of application No. 12/231,437, filed on Sep. 2, 2008, now Pat. No. 9,037,098, which is a continuation-in-part of application No. 12/157,530, filed on Jun. 11, 2008, now Pat. No. 8,238,936, which is a continuation-in-part of application No. 11/457,786, filed on Jul. 14, 2006, now Pat. No. 8,078,190.

(60) Provisional application No. 62/240,464, filed on Oct. 12, 2015, provisional application No. 62/151,923, filed on Apr. 23, 2015, provisional application No. 61/668,852, filed on Jul. 6, 2012, provisional application No. 61/237,682, filed on Aug. 28, 2009, provisional application No. 61/264,838, filed on Nov. 30, 2009, provisional application No. 61/307,838, filed on Feb. 24, 2010, provisional application No. 60/699,281, filed on Jul. 14, 2005, provisional application No. 60/739,877, filed on Nov. 23, 2005, provisional application No. 60/699,281, filed on Jul. 14, 2005, provisional application No. 60/739,877, filed on Nov. 23, 2005.

(51) Int. Cl.
*H04M 3/00* (2006.01)
*H04W 48/08* (2009.01)
*H04W 64/00* (2009.01)
*G01S 5/04* (2006.01)
*G01S 5/02* (2010.01)

(52) U.S. Cl.
CPC ............ *H04W 48/08* (2013.01); *G01S 5/0221* (2013.01); *G01S 5/04* (2013.01); *H04W 64/003* (2013.01)

(58) Field of Classification Search
CPC ........................... H04W 48/08; H04W 64/003
USPC .......................................................... 455/418
See application file for complete search history.

(56) References Cited

U.S. PATENT DOCUMENTS

| | | |
|---|---|---|
| 4,054,754 A | 10/1977 | Nicodemus |
| 4,638,496 A | 1/1987 | Jensen |
| 5,440,758 A | 8/1995 | Grube |
| 5,613,205 A | 3/1997 | Dufour |
| 5,966,655 A | 10/1999 | Hardouin |
| 6,031,490 A | 2/2000 | Forssen |
| 6,205,189 B1 | 3/2001 | Ha |
| 6,222,458 B1 | 4/2001 | Harris |
| 6,343,212 B1 | 1/2002 | Weber |
| 6,490,455 B1 | 12/2002 | Park |
| 6,580,372 B1 | 6/2003 | Harris |
| 6,687,506 B1 | 2/2004 | Girod |
| 6,765,492 B2 | 7/2004 | Harris |
| 6,907,254 B1 | 6/2005 | Westfield |
| 7,046,990 B2 | 5/2006 | Grego |
| 7,110,774 B1 | 9/2006 | Davis |
| 7,202,798 B2 | 4/2007 | Harris |
| 7,533,188 B1 | 5/2009 | Greger |
| 2001/0036821 A1 | 11/2001 | Gainsboro |
| 2002/0011119 A1 | 1/2002 | Bignell |
| 2002/0080954 A1 | 6/2002 | Felder |
| 2002/0087062 A1 | 7/2002 | Schmit |
| 2002/0098850 A1 | 7/2002 | Akhleruzzaman |
| 2003/0206112 A1 | 11/2003 | Harris |
| 2004/0009778 A1 | 1/2004 | Makuta |
| 2004/0033805 A1 | 2/2004 | Verma |
| 2004/0043774 A1 | 3/2004 | Lee |
| 2004/0113755 A1 | 6/2004 | Ricci |
| 2004/0198346 A1 | 10/2004 | Swensen |
| 2004/0203857 A1 | 10/2004 | Wang |
| 2004/0246139 A1 | 12/2004 | Harris |
| 2005/0046608 A1 | 3/2005 | Schantzq |
| 2006/0099968 A1 | 5/2006 | Harris |

(Continued)

*Primary Examiner* — Chuck Huynh
(74) *Attorney, Agent, or Firm* — Law Office of Carl Giordano, PC

(57) ABSTRACT

Disclosed is a system for managing wireless transmitting devices in which a wireless transmission from a transmission device is detected within or about a set area and an allowability of the transmission device to continue transmitting is based on an identification information, of the device, a location of the device and a number being called by the device.

8 Claims, 59 Drawing Sheets

(56) References Cited

U.S. PATENT DOCUMENTS

| | | |
|---|---|---|
| 2006/0105758 A1 | 5/2006 | Maislos |
| 2006/0111062 A1 | 5/2006 | Cunningham |
| 2006/0132307 A1 | 6/2006 | Velhai |
| 2006/0160545 A1 | 7/2006 | Goren |
| 2006/0192709 A1 | 7/2006 | Schantz |
| 2007/0206542 A1 | 9/2007 | Proctor, Jr. |
| 2009/0325566 A1 | 12/2009 | Bell |
| 2010/0159877 A1 | 6/2010 | Slakini |
| 2010/0159879 A1 | 6/2010 | Slakini |
| 2010/0176918 A1 | 7/2010 | Turner |
| 2014/0335846 A1* | 11/2014 | Wilson .................... H04K 3/65 455/418 |

* cited by examiner

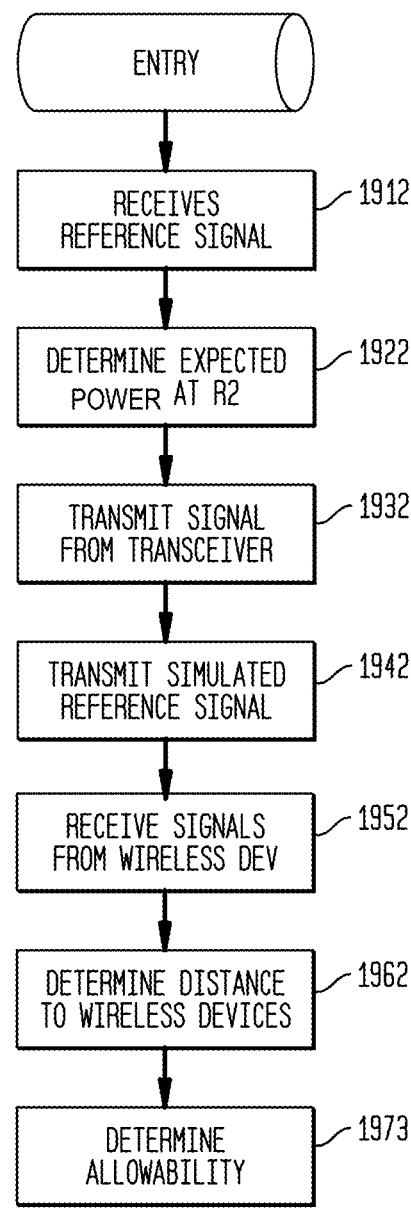

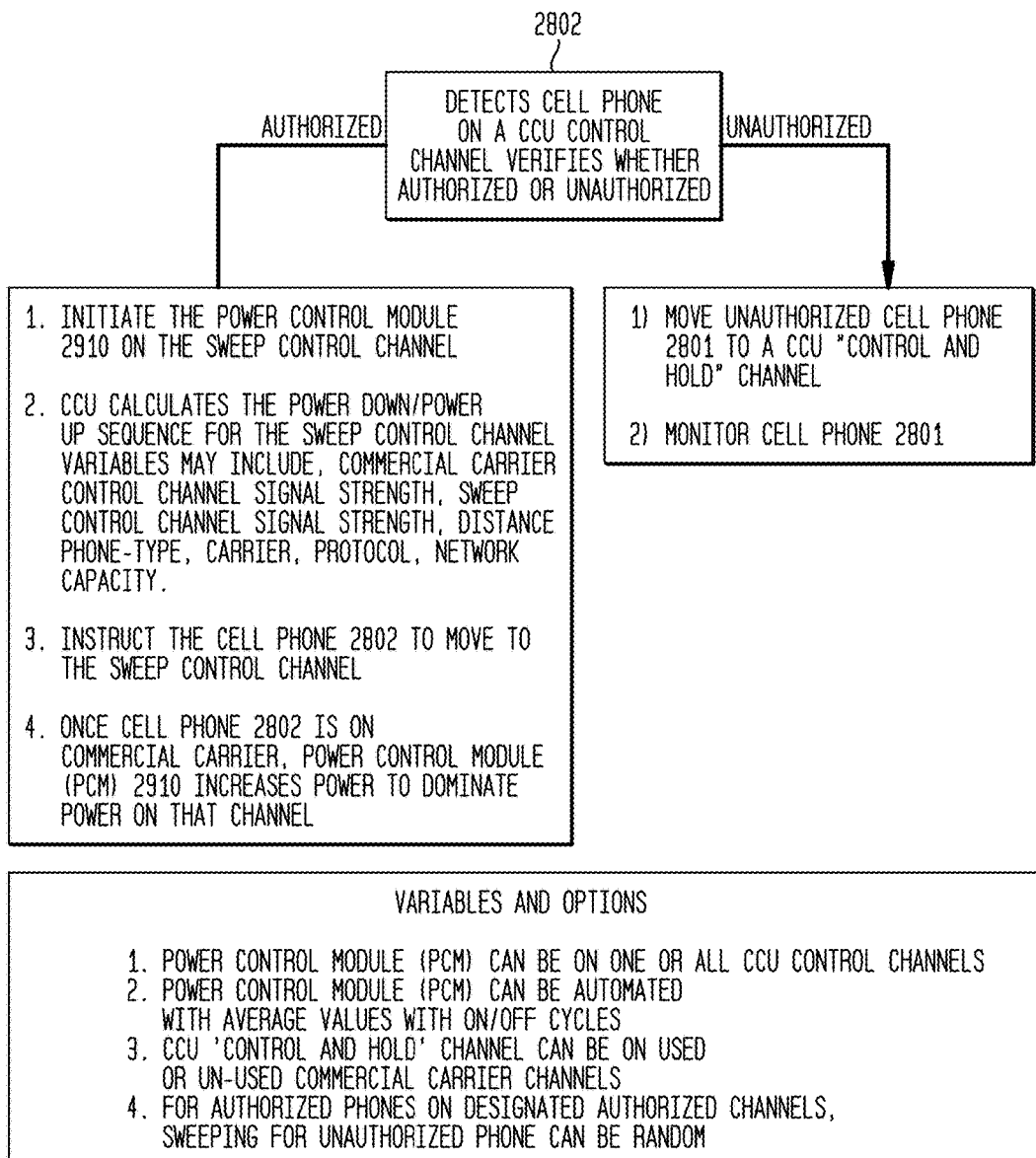

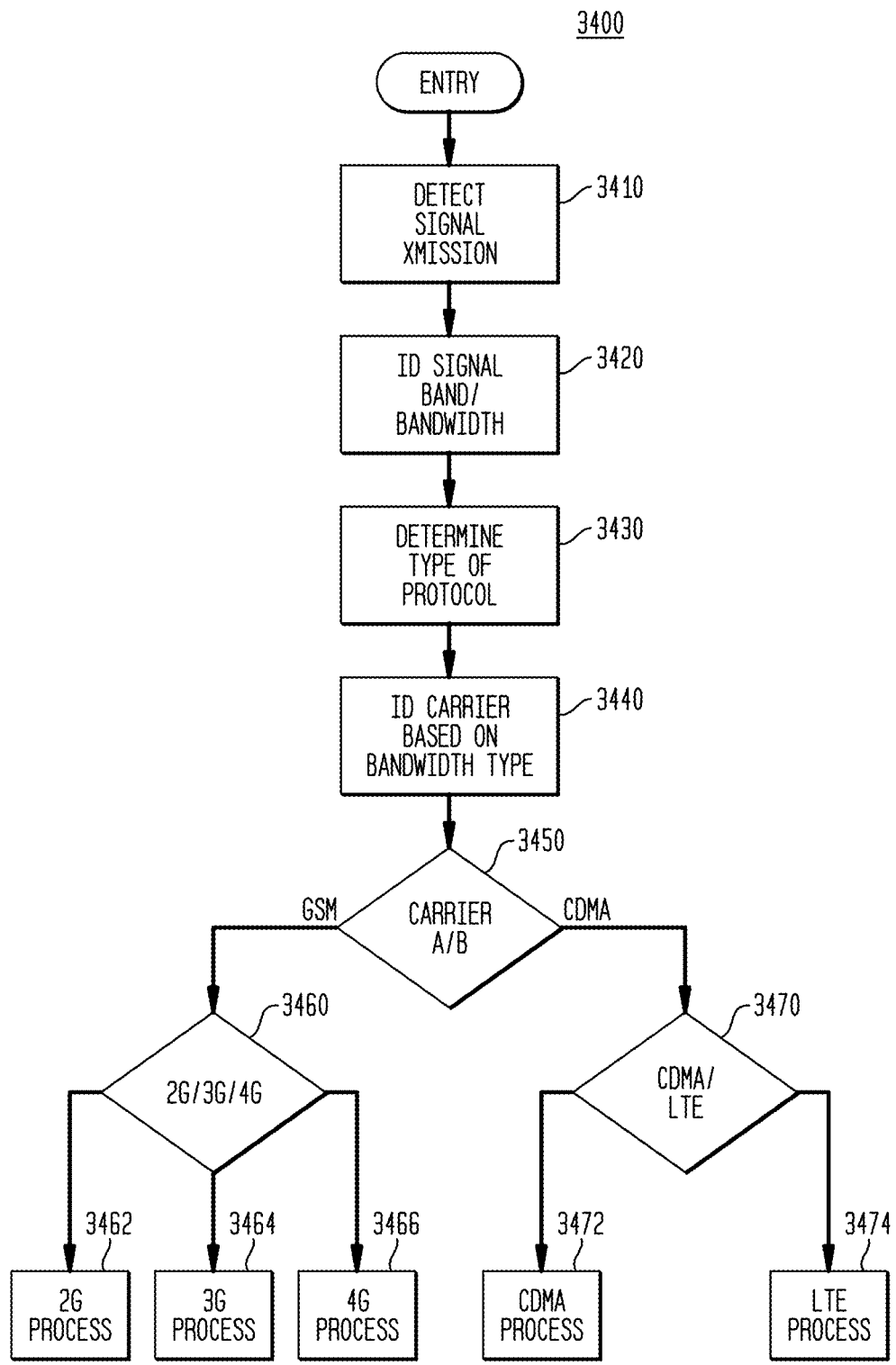

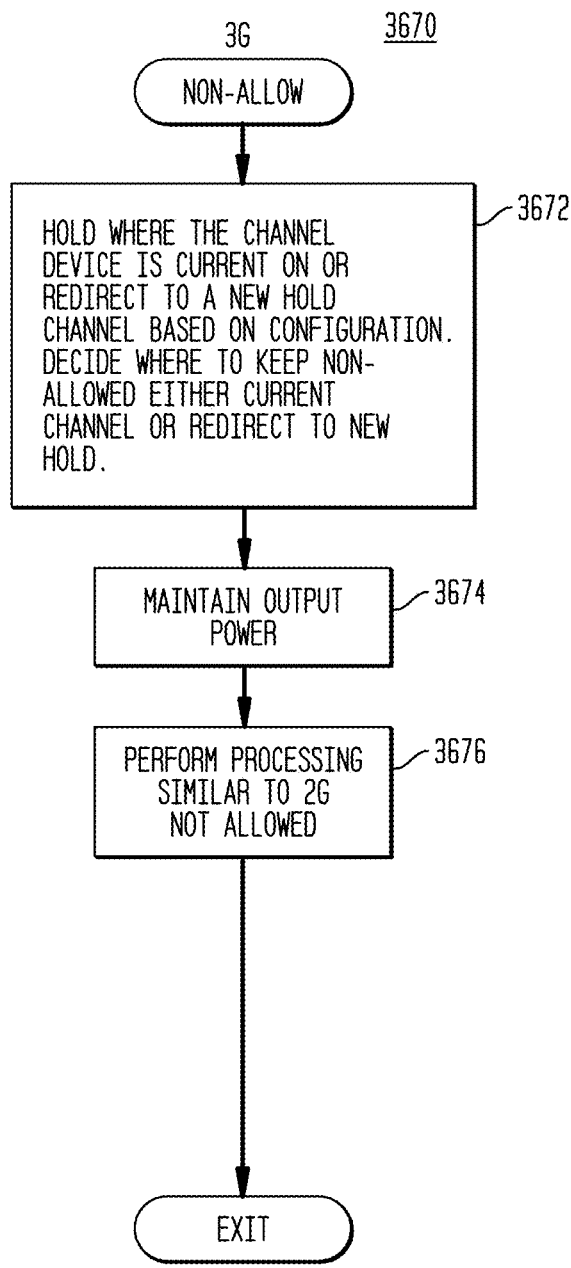

4000

4100

SYSTEM AND METHOD FOR WRIST BAND TRANSMITTER AND SYSTEM THEREOF

CLAIM OF PRIORITY

This application claims, pursuant to 35 USC 119, priority to and the benefit of the earlier filing date of provisional patent application:
Ser. No. 62/240,464 filed on Oct. 12, 2015; and
further claims, a Continuation-in-part pursuant to 35 USC 120, priority to and the benefit of the earlier filing date of application:
Ser. No. 15/136,953 filed on Apr. 24, 2016, which claimed pursuant to 35 USC 119 priority to and the benefit of the earlier filing date, of provisional patent application:
Ser. No. 62/151,923 filed on Apr. 23, 2015; and
further claimed, as a Continuation-in-part, pursuant to 35 USC 120 priority to and the benefit of the earlier filing data of that patent application entitled "System and Methods for Detecting and Controlling Transmission Devices filed on Feb. 17, 2016 and afforded Ser. No. 15/046,378; and
further claims as a Continuation-in-part pursuant to 35 USC 120, priority to and the benefit of the earlier filed data of that patent application entitled "System and Methods for Detecting and Controlling Transmission Devices filed on Jul. 6, 2013 and afforded Ser. No. 13/936,166 (now U.S. Pat. No. 934,492, issued May 17, 2016, which claimed pursuant to 35 USC § 119, priority to and the benefit of the earlier filing date of that patent application entitled "Systems and Methods for Detecting and Controlling Transmission Devices" filed in the United States Patent and Trademark Office on Jul. 6, 2012 and afforded Ser. No. 61/668,852, and,
pursuant to 35 USC § 120, as a continuation-in-part
to that patent application entitled "System and Method of Detection of Transmission Facilities," filed in the United States Patent and Trademark Office on Aug. 28, 2010 and afforded Ser. No. 12/870,808,
which claimed the benefit of the earlier filing date, pursuant to 35 USC 119, to U.S. Provisional App. No. 61/237,682, entitled "Method and System for Determining a Location and Tracking of a Wireless Device," filed on Aug. 28, 2009 and to U.S. Provisional App. No. 61/264,838, entitled "System and Method of Detection and Allowing Access of Transmission Facilities, filed on Nov. 30, 2009 and to U.S. Provisional App. No. 61/307,838, entitled "System and Method for Capturing and Controlling Transmission Devices," filed on Feb. 24, 2010 and
further claimed the benefit of the earlier filing date, pursuant to 35 USC § 120, as a continuation-in-part
to that patent application entitled "System and Method of Detection and Allowing Access of Transmission Facilities," filed in the United States Patent and Trademark Office on Jul. 27, 2009 and afforded Ser. No. 12/510,036, which claimed the benefit of the earlier filing date, pursuant to 35 USC 120, as a continuation-in-part;
to that patent application entitled "Tracking and Determining a Location of a Wireless Transmission," filed in the United States Patent and Trademark Office on Jun. 11, 2008 and afforded Ser. No. 12/157,530, which claimed the benefit of the earlier filing date, pursuant to 35 USC § 120, as a continuation-in-part;
to that patent application entitled "Systems and Methods of Detection Transmission Facilities," filed in the United States Patent and Trademark Office on Jul. 14, 2006 and afforded Ser. No. 11/457,786 (now U.S. Pat. No. 8,078,190), which claimed the benefit of the earlier filing date, pursuant to 35 USC § 119, outs. Provisional App. No. 60/699,281 filed on Jul. 14, 2005 and U.S. Provisional App. No. 60/739, 877 filed on Nov. 23, 2005. The entire contents of all of which are incorporated by reference, herein.

Application Ser. No. 15/136,953 filed on Apr. 24, 2016, further claimed the benefit of the earlier filing date, pursuant to 35 USC § 120,
as a continuation-in-part to that patent application entitled "Wrist Band Transmitter," filed in the United States Patent and Trademark Office on Sep. 2, 2008 and afforded Ser. No. 12/231,437 (now U.S. Pat. No. 9,037,098, issued on May 9, 2015), which claimed the benefit of the earlier filing date, pursuant to 35 USC § 120,
as a continuation-in-part to that patent application entitled "Tracking and Determining a Location of a Wireless Transmission," filed in the United States Patent and Trademark Office on Jun. 11, 2008 and afforded Ser. No. 12/157,530, which claimed the benefit of the earlier filing date, pursuant to 35 USC § 120,
as a continuation-in-part to that patent application entitled "Systems and Methods of Detection Transmission Facilities," filed in the United States Patent and Trademark Office on Jul. 14, 2006 and afforded Ser. No. 11/457,786 (now U.S. Pat. No. 8,078,190), which claimed the benefit of the earlier filing date, pursuant to 35 USC § 119, outs. Provisional App. No. 60/699,281 filed on Jul. 14, 2005 and U.S. Provisional App. No. 60/739,877 filed on Nov. 23, 2005. the entire contents of all of which are incorporated by reference, herein.

RELATED APPLICATION

This application is related to co-pending patent application entitled "Systems and Methods of Detection of Transmission Facilities," filed on May 4, 2013, and afforded Ser. No. 13/887,300, which claimed the benefit, pursuant to 35 USC 120,
as a continuation that patent application entitled "Systems and Methods of Detection Transmission Facilities," filed in the United States Patent and Trademark Office on Nov. 19, 2011 and afforded Ser. No. 12/323,817, which claimed the benefit, pursuant to 35 USC 120,
as a continuation that patent application entitled "Systems and Methods of Detection Transmission Facilities," filed in the United States Patent and Trademark Office on Jan. 1, 2011 and afforded Ser. No. 12/983,294, which claimed the benefit, pursuant to 35 USC 120,
as a continuation that patent application entitled "Systems and Methods of Detection Transmission Facilities," filed in the United States Patent and Trademark Office on Jul. 27, 2009 and afforded Ser. No. 12/510,006,
which claimed the benefit, pursuant to 35 USC 120,
as a continuation that patent application entitled "Systems and Methods of Detection Transmission Facilities," filed in the United States Patent and Trademark Office on Jul. 14, 2006 and afforded Ser. No. 11/457,786 (now U.S. Pat. No. 8,078,190), the contents of all of which are incorporated by reference, herein.

BACKGROUND

Field of the Invention

This invention relates to tracking and location of the field of wireless transmission and more particularly to the identification and determining a location of a wireless transmission device and controlling its use.

Background

There are many facilities, such as government buildings, and in particular correctional facilities, such as prisons, that do not permit cellular phone usage or wireless transmission devices on the premises or even possession of cellular phones being used by criminals. In earlier applications we explained how to positively identify wireless communication devices such as cell phone the premises or even possession of cellular phones and PDA and locate them, track their movements and control the use of the cell, if necessary.

Finding and preventing usage of cell phones and other transmission facilities is difficult, and a need exists for improved methods of detecting, locating, and managing the transmission of such devices.

SUMMARY OF THE INVENTION

The present invention is directed to systems and methods for the detection, determining the location and the ability to control wireless communications and their devices and the detection of airborne drones within or about a restricted area and remotely managing the detected drone so as to obscure images captured by the drones and/or control the drone to prevent any delivery that the drone may be attempting.

In one aspect of the invention, a system for detecting and managing drones comprises a detecting system for detecting the presence a drone within an area surrounding a restricted area, determining characteristics of the drone and/or capturing command signals to the drone, capturing the downlink channel utilized by the drone and provide desired information to the downlink channel and changing the data being received by the drone, manipulating the received data and transmitting authorized data.

Further the present invention is the management, integration/interaction of tracking wireless communications, staff, personnel and inmate, Cell phones, Wifi Devices, IED detonation devices and the ability to detect, track, control, manipulate and display said set interactions.

Methods relate to locating and managing the use and presence of wireless communication facilities are further disclosed. Embodiments relate to detecting wireless devices when they transmit a signal are further disclosed. Other embodiments relate to detecting of transmission devices when the transmission devices (i.e., facilities) are in a non-active transmission active state.

In embodiments the methods and systems disclosed herein include methods and systems for detecting a transmitting device within an obstruction rich environment. The methods and systems may include detecting the transmitting device within a wireless detection transmission facility; communicating signal information relating to the detected transmitting device from the wireless transmission detection facility to a central unit; determining the location of the transmitting device; displaying information of the detection and location of the transmitting device through a user interface; and providing the information to an action facility for causing actions related to the detected transmitting device. In embodiments, the wireless transmission detection facility is an antenna. In embodiments, the antenna is a dual dipole embedded antenna. In embodiments, the dual dipole embedded antenna is tuned to receive cell phone transmissions. In embodiments the dual dipole embedded antenna is tuned to receive a frequency band of approximately 700 to 950 MHz. In embodiments the dual dipole embedded antenna is tuned to receive a frequency band of approximately 1.7 to 2.0 GHz. In embodiments the dual dipole antenna is tuned to receive signals in frequency bands of approximately 700 to 950 MHz and 1.7 to 2.0 GHz. In embodiments the obstruction rich environment is a correctional facility. In embodiments the obstruction rich environment is a mall. In embodiments, communicating the information relating to the detected transmitting device from the wireless transmission detection facility to a central unit involves wireless communications. In embodiments, the wireless communications are 802.11 communications. In embodiments, determining the location of the transmitting device is accomplished through transmission triangulation. In embodiments location of the transmitting device is accomplished through a known location of a single antenna. In embodiments the location of the transmitting device is determined based on extrapolation of the receipt of a plurality of received signals through a series of non-iterative linear equations.

BRIEF DESCRIPTION OF FIGURES

The systems and methods described herein may be understood by reference to the following figures. It is to be understood that the figures and descriptions of the present invention described herein have been simplified to illustrate the elements that are relevant for a clear understanding of the present invention, while eliminating, for purposes of clarity only, many other elements. However, because these eliminated elements are well-known in the art, and because they do not facilitate a better understanding of the present invention, a discussion of such elements or the depiction of such elements is not provided herein. The disclosure herein is directed also to variations and modifications known to those skilled in the art.

FIGS. 19A and 19B illustrates an exemplary geographical representation to determine power allocation in accordance with the principles of the invention.

FIG. 29A illustrates an exemplary methodology of allowing communications via a wireless communication device within a controlled area and options allowing phones to communicate in accordance with the principles of the invention.

FIG. 34 illustrates a flow chart of an exemplary process for managing wireless communication devices in accordance with the principles of the invention.

FIGS. 36A-36D illustrate flow charts of exemplary processes for managing wireless communication devices operating in a second aspect of a first mode in accordance with the principles of the invention.

It is to be understood that the figures and descriptions of the present invention described herein have been simplified to illustrate the elements that are relevant for a clear understanding of the present invention, while eliminating, for purposes of clarity, many other elements. However, because these elements are well-known in the art, and because they do not facilitate a better understanding of the present invention, a discussion of such elements is not provided herein. The disclosure herein is also directed to variations and modifications known to those skilled in the art.

DETAILED DESCRIPTION OF THE INVENTION

Figure 1:
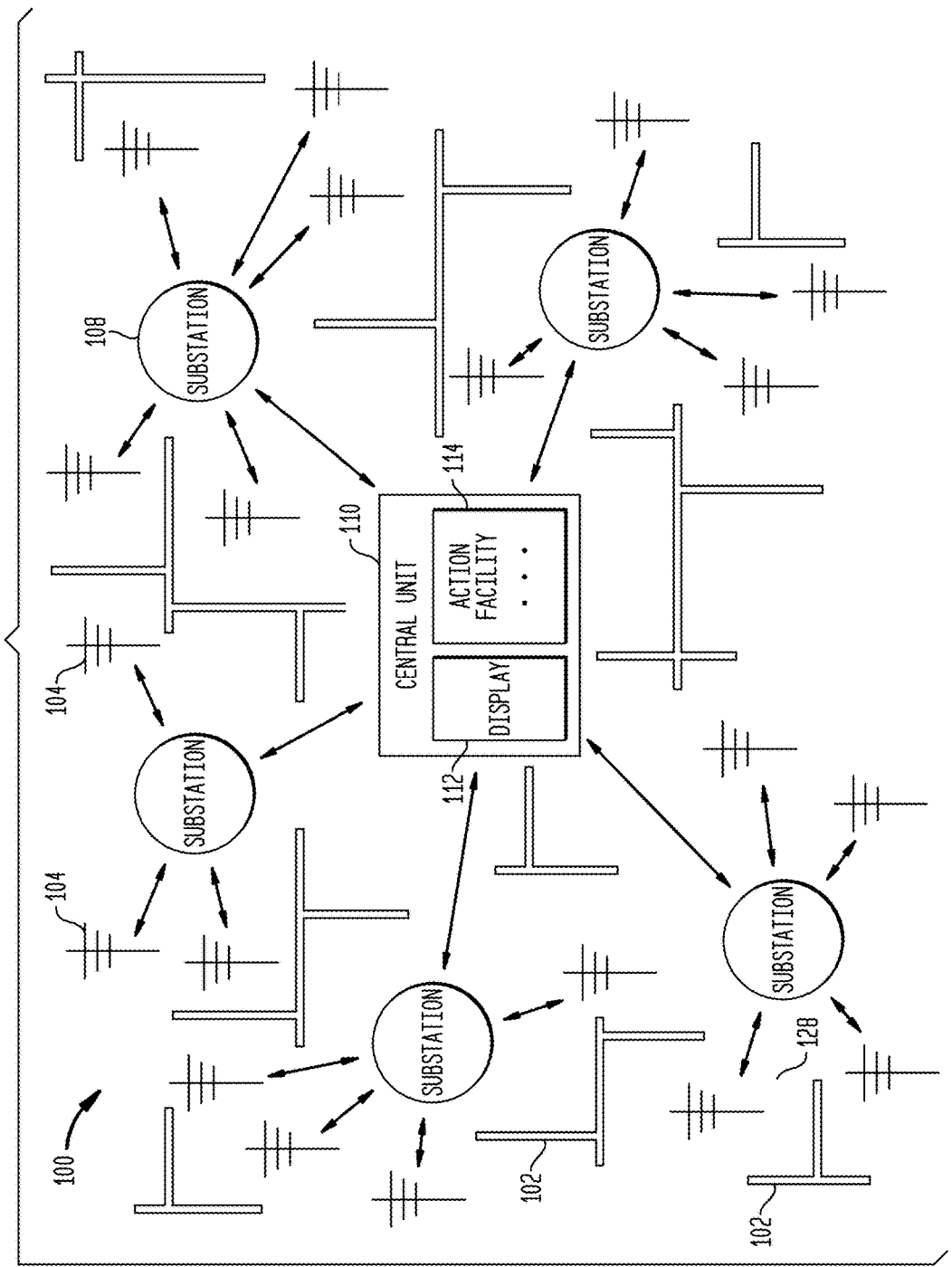
FIG. 1 illustrates an exemplary transmission detection, identification, and reporting system in accordance with the principles of the invention.
Figure 2:
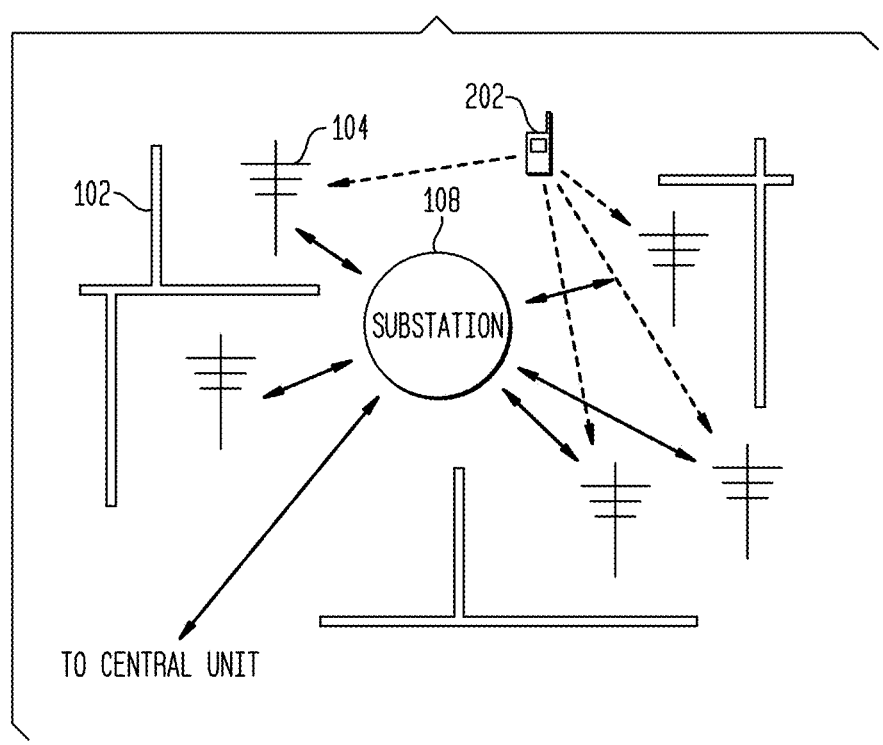
FIG. 2 illustrates a system for detecting a transmission facility.

Detection of a transmission facility, such as a mobile phone or hand-held radio transmitter, or other transmission facility as described herein, within an obstruction rich environment, such as a facility with many physical barriers to electronic transmission, is difficult to achieve. Referring to FIG. 1, the transmission detection, identification, and reporting system 100 described herein provides a method of detecting a transmission facility 202, such as depicted in FIG. 2, within an environment rich in obstructions 102. One embodiment of the transmission detection, identification, and reporting system 100 may involve the detection of a mobile phone within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

Figure 3:
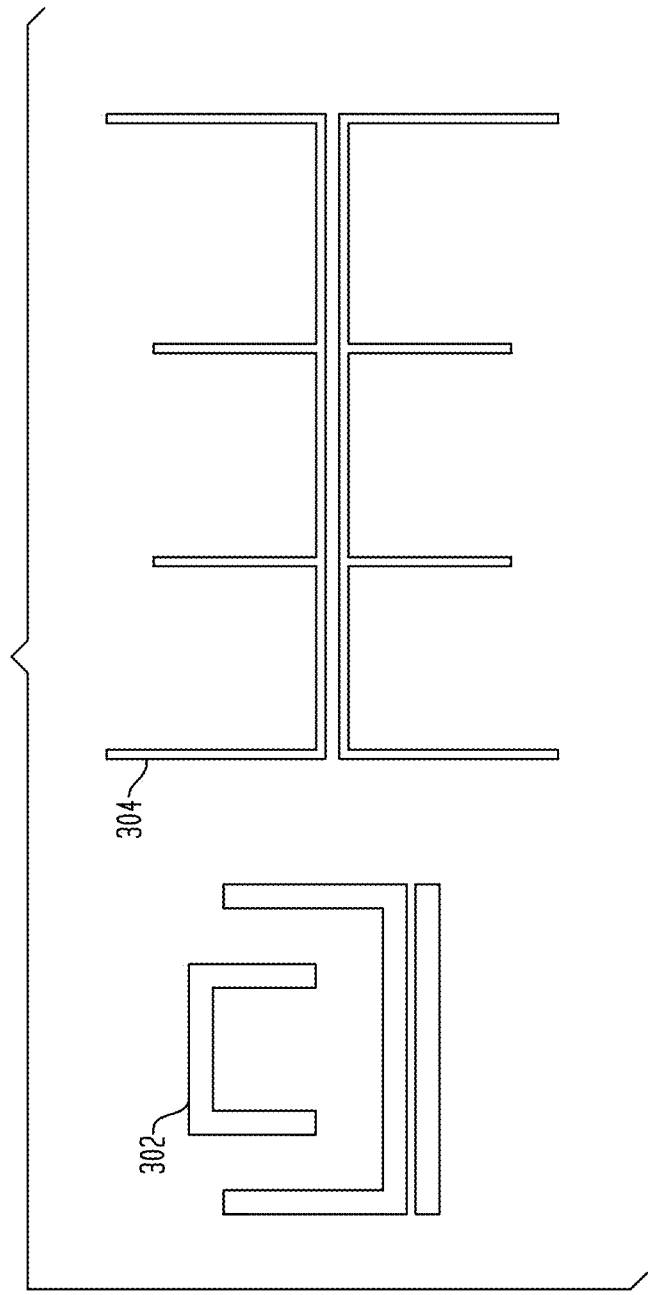
FIG. 3 illustrates exemplary antenna configurations.

In embodiments the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be selected as one or more of a dipole antenna 104, a Yagi-Uda antenna 104, a loop antenna 104, a quad antenna 104, a micro-strip antenna 104, a quad antenna 104, a helical antenna 104, and a phase array antenna 104, a patch antenna or a combination thereof.

In embodiments, the transmission facility 202 may be a mobile phone, such as a flip phone, a slide phone, a cellular phone, a handset, a satellite phone, a 3G phone, a wireless phone, a cordless phone or the like. In embodiments, the transmission facility 202 may be a radio, such as a Walkie-Talkie, a mobile radio, a short-wave radio, or the like.

In embodiments, the transmission band from the transmission may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, and/or a frequency suitable for 802.11x wireless communications, ultra wide band (UWB), Bluetooth, or the like.

In embodiments, the obstruction rich environment 102 may be a building, such as a corrections facility, a school, a government facility, a store, a mall, a residence, a hotel, a motel, or the like. In embodiments, the obstruction rich environment 102 may be a large confined space, such as a courtyard, a food court, a recess area, a hallway, greenhouse, recreation room, gymnasium, auditorium, kitchen, cafeteria, craft area, work area, library, prison yard, or the like. In embodiments, the transmission obstruction materials such as cinderblock, cement, rebar, wire cage, metal, metal coated surface, or the like. In embodiments, the obstructions in the obstruction rich environments 102 may be other construction materials, such as wood, glass, rug, flooring materials, roofing materials, and the like.

In embodiments, the transmitting signal information from the antenna 104 module to the central unit 110 may be through a communications connection, such as an IEEE 802.15.4 wireless network, IEEE 802.11 Wi-Fi, Bluetooth, Ethernet, and/or other similar type wireless communication protocols. In embodiments, the communications connection may utilize CAT-5, RJ-45, RS-232 connections, and/or other similar type wired communication protocols and hardware. In embodiments the communications connection may utilize an optical connection, such as a wireless infrared link, wireless visible light, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like. The detection of the cell phones may be further resolved down to cell phone manufacturer and cell phone provider.

In embodiments, the transmitting signal information to the central unit 110 may be made through an intermediate connection, such as a substation 108, router, switch, hub, bridge, multiplexer, modem, network card, network interface, processing unit, preprocessor, computer, repeater, antenna 104, and the like. (See FIG. 2).

In embodiments, the central unit 110 may have in part a computer, a computer system, a network of computers, a state machine, a sequencer, a microprocessor, a digital signal processor, an audio processor, a preprocessor, a microprocessor, and the like.

In embodiments, the central unit 110 may process information, such as location information, such as the location of people, inmates, corrections personnel, visitors, all personnel within the facility, equipment, resources, weapons, products, incoming goods, outgoing goods, and the like. In embodiments, the information may be a type of signal, such as mobile phone standard protocols such as CDMA, CDPA, GSM, TDMA, and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned.

In embodiments, the central unit 110 may have a display 112, such as a cathode ray tube (CRT), liquid crystal display (LCD), electronic paper, 3D display, head-mounted display, projector, segmented display, computer display, graphic output display, and the like. In embodiments, the central unit 110 may have an action facility 114, comprising a user interface for causing actions relating to the detected transmission facility 202. Actions may for example represent operations such as closing a door, sealing a room, deploying and action signal, initiating an alarm, and the like.

In embodiments the functions of a central unit 110 as described herein may be replaced by an alternate configuration, such as a configuration of multiple computers, such as a group of servers, processors, or the like, operating in parallel. In embodiments the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, amplitude, time, or a combination of these; or by identifying and locating an area associated with an antenna 104 with the highest signal strength. In embodiments, the location of a transmission facility 202 may be determined when the transmission facility 202 is powered off though detection of a null in the band-pass of a transmitted frequency sweeps due to the presence of a mobile phone antenna.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated by central unit 110 with results output to a display 112. A database of these signatures can be placed into the unit, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power.

Radiolocation, also referred to as radio-determination, as used herein, encompasses any process of finding the location of a transmitter by means of the propagation properties of waves. The angle, at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (iix) location based on proximity to known locations (including locations of other radio-transmitters), (ix) map-based location, or any combination of any of the foregoing, as well as other location facilities known to those of skill in the art.

Obstructions to radio wave propagation in the obstruction rich environments 102 may greatly reduce the effectiveness of many of the conventional radiolocation methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, tri-lateration, multi-lateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of Sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction rich environment 102, presents a significant challenge to authorities of the correction facilities. In an embodiment of the invention shown and described herein, the system maybe placed throughout the corrections facility for the purpose of alerting the corrections staff that cell phone activity is taking place, the location of the activity and the type, i.e., Nextel, T-Mobile, Verizon, and the like. The following technology may also allow for a standalone detection unit 408 or set of detection units 408 (see FIG. 4) to detect cell phones in schools, buildings and other environments in which the facility's or area's provider does not wish the use of cell phones and is interested in the detection of cell phone use.

In an embodiment, the system may include an integrated antenna 104 and RF detector (together referred to as a detector unit 408) (FIG. 4), a substation 108, (FIG. 1) whose purpose may be to communicate with each detector unit 408 within its sector, and report activity to the central unit 110; which reports confirmed activity, type of cell phone, and location to the display 112 of the central unit 110. These detection units 408 may be used individually or in conjunction with each other and may triangulate detection within a specific area. The outside yard areas may be monitored by detection units 408, which may cover large areas, such as 25×25 foot sectors or smaller areas, e.g., 5×5 foot sectors, to localize the detection of a cell phone (i.e., wireless transmission facility) and track its position from one sector to any adjoining sector. That is, as the person moves with a phone, the changing position of that phone may be reported. If the phone moves inside the facility, tracking may continue as interior detection units 408 detect the phone.

In an embodiment, within these basic groups of detection units 408 may be various detection unit 408 types. Some detection unit 408 types may be designed to be hard wired via RJ-45 connectors and/or CAT 5e cable, other detection units 408 may use 802.11b (WI-FI) wireless communications between detection units 408, and there may also be an Infra-Red (IR) set of detection units 408, which utilize optical communications techniques. Each communications type may have a specific purpose within the corrections facility or other type of building and/or areas. Hard-wired units may be used when it is not possible to use either an optical unit or a WI-FI unit. When there are walls embedded with metal or where the distance and the obstructions 102 may preclude a wireless technique. WI-FI detection units 408 may be used when it is effective to communicate in an area where there are obstructions 102 such as cement walls or cement with embedded rebar walls, facades, and the like. Optical detection units 408 may be used in areas where clear, line-of-site communications may be possible. Optical detection units 408 may operate over relatively long distances, (e.g., 3,000 feet), while WI-FI detection units 408 may be limited to shorter distances, such as 250 feet.

In an embodiment, there may also be a hand-held detection units 408 to be used once a cell phone has been detected, and the corrections officer(s) or monitor are attempting to pinpoint the location. This hand-held detection unit 408 may be similar to the integrated antenna/detector unit of the main system. This embodiment may also include a detector, discriminator and decoder module. The hand-held detection units 408 may detect and identify each cell phone and compare the cell phone identity to the allowed cell phone user list or in this case to a list of unauthorized cell phones. This detector unit 408 may output an audible alarm whose pitch changes as the signal becomes stronger or weaker.

In an embodiment, a second type of hand-held detector unit 408 may be used to detect a cell phone when it is either off or in a standby condition, also referred to as null detecting. Null detection may be used at an ingress or egress of a building or an area as a way of detecting a communication device or device with an antenna. This technique may be used in areas where it is unpractical, unwanted or unwarranted to have x-ray machines or more intrusive detection systems. A null detection system may also be deployed in a handheld device so an inspector can move through an area attempting to detect a communication device. In embodiments, the null detection system may detect the presence of a transmission facility even when the transmission facility is not transmitting a signal. In embodiments, a hand held or mounted null detection device may be used in a correctional institution or other government facility.

In embodiments, null detection may utilize a transmission-detection source, independent of the transmission source being detected, which is capable of sweeping across the frequency spectrum of interest and receiving it's returning signal. The transmission source sweeps the spectrum of interest, searching for distortions in the returned field. Distortions in the spectrum may be due to the presence of an antenna of a transmission facility 202. Matching the distortion, also referred to as a null in the band pass, to characteristics of known antennas used with mobile phones may allow the detection and/or identification of the transmission facility 202. The unit may output an audible "beep" if it detects a null, allowing the officers to focus in on the location of the cell phone. The range of the hand-held detection units 408 may be, for example, 15 to 20 feet. This will allow cell phones that are in the immediate vicinity to be quickly detected. The null detection may be applicable for ingress and/or egress detection.

In an embodiment, a survey may be performed to determine optimal placement and the type and number of detection units 408 required. This will insure the minimum number of required detection units 408 to perform optimal detection. The team may provide a report detailing the layout determined to be optimized for the facility and may review this report with the facilities staff so that any required modifications to the plan may be incorporated before installation is begun.

In an embodiment, the initial coverage of a facility may be in the cell blocks 402 (FIG. 4) and/or pod areas. The same may be true for linear facilities. The survey may cover the entire facility, including open areas, such as courtyards, where required. Inmate also work in large yard and plantations such as Angola State Prison, it is anticipated this technology may be deployed over a large outside area.

Figure 4:
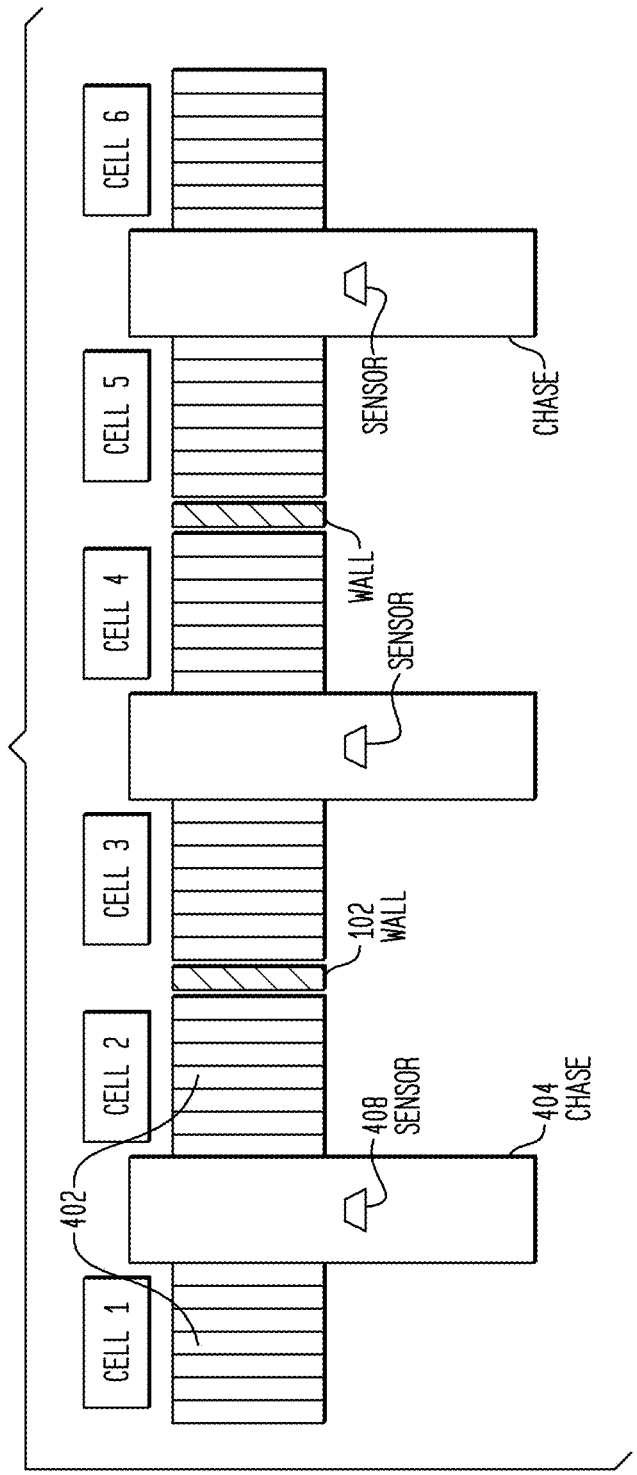
FIG. 4 illustrates a first system configuration for detecting a transmission facility in a cell environment.
Figure 5:
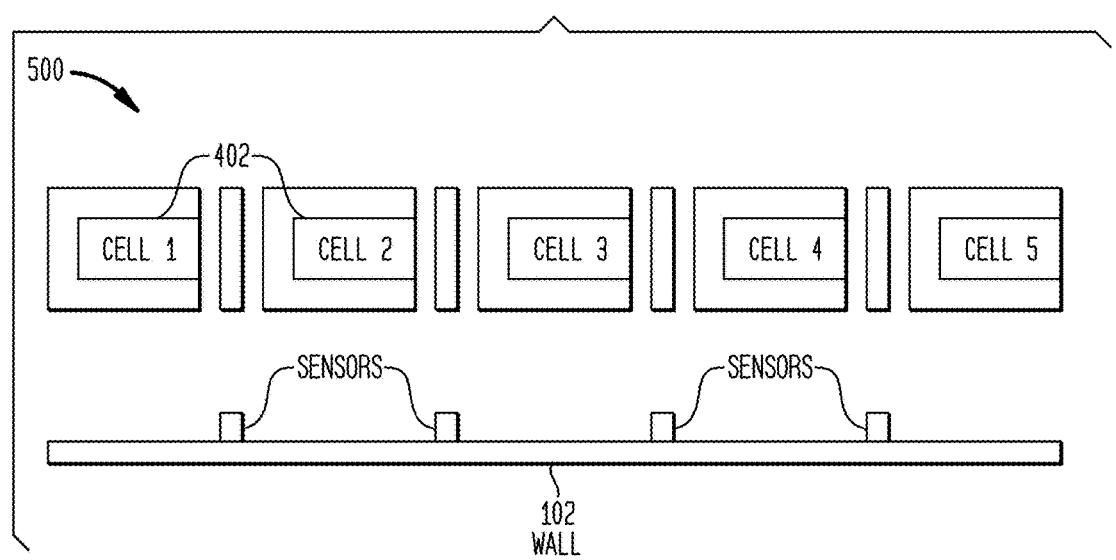
FIG. 5 shows a second system configuration for detecting a transmission facility in a cell environment.

In an embodiment, the cell block detection units 408 may be mounted inside each chase 404 (a column positioned between cells in a cell block that includes various utility facilities, such as plumbing and electricity), as shown in FIG. 4, and may communicate to a substation 108 (not shown in FIG. 4) located at one end of the block. This detection unit 408 may communicate its information to the central unit 110 so that tracking, confirmation, and display may be accomplished. For linear facilities 500, as shown in FIG. 5, detector units 408 may be mounted along the walls in the obstruction rich environment 102 opposite the cells 402 and perform their function similar to the detection units 408 mounted within a chase 404.

Figure 6:
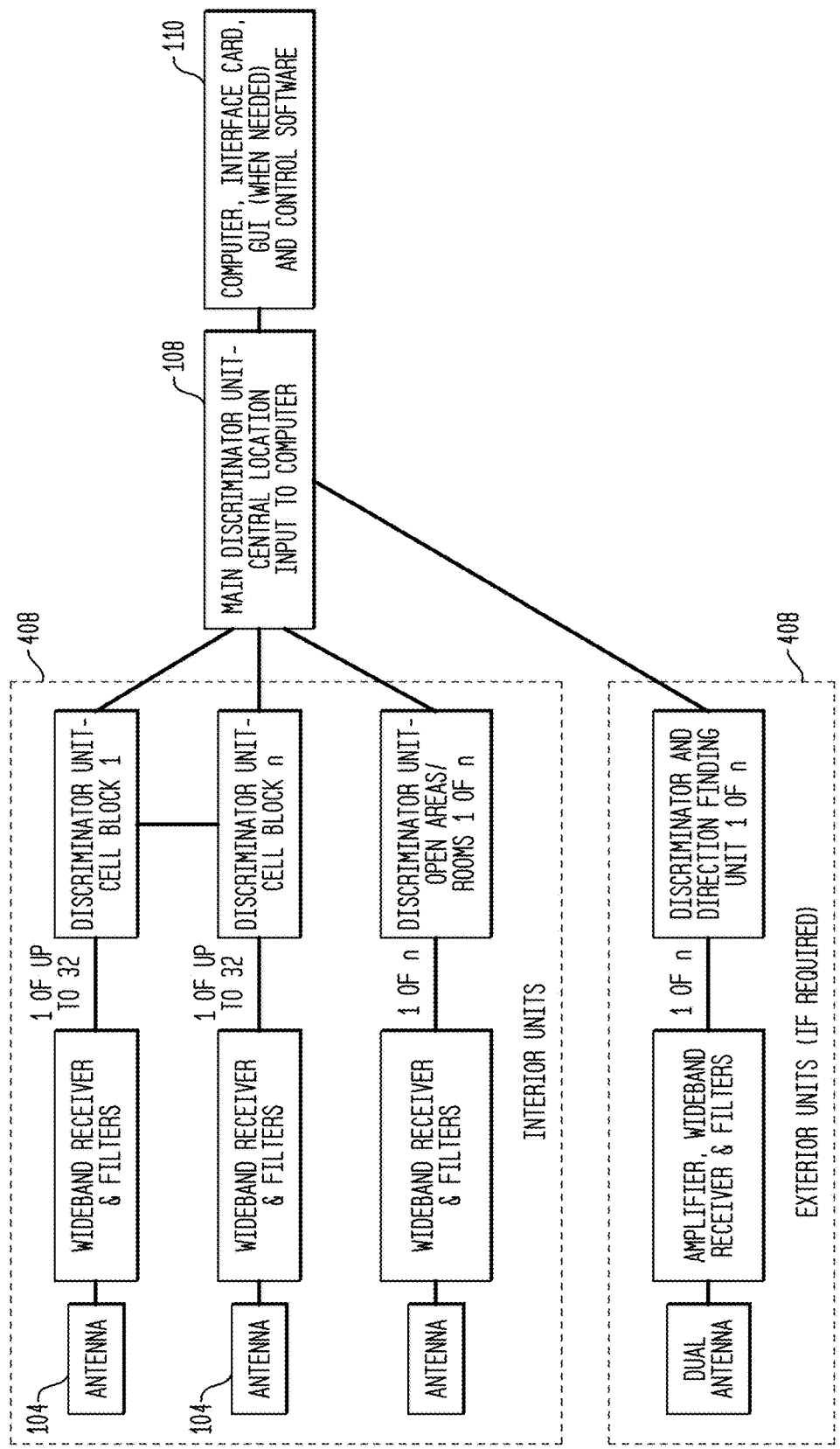
FIG. 6 illustrates a block diagram relating to actions taken when detecting transmission facilities.

In an embodiment, detector units 408 may be installed in open areas such as gymnasiums, kitchens, cafeterias, craft and work areas and other open areas where a cell phone may be used. The difference in these locations from the cell blocks 402 may include the method of detection and tracking. Since most facilities may only require the identification of a cell phones presence within a room, and there could be many inmates within that room, the process may be to lock-down the room, or rooms, in that area and use a hand held device and a physical search to pinpoint the phone location. A generalized block diagram of a detector unit 408 is shown in FIG. 6. For those facilities that require resolving the location within a large interior room or area, the use of triangulation to resolve to a 10×10 foot area may be used.

Figure 7:
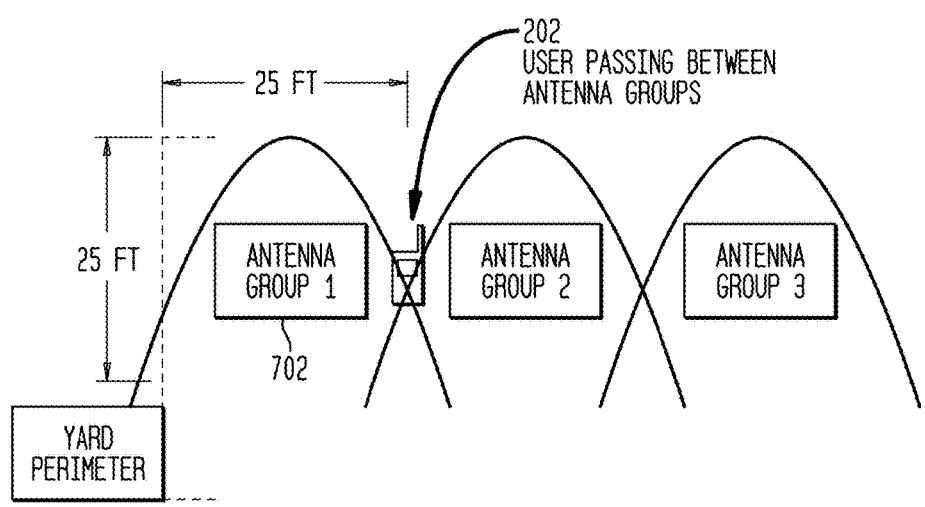
FIG. 7 shows a transmission facility detection system wherein an antenna array is used to determine location.

In an embodiment, facilities with the requirement to detect cell phones 202 in outside yard areas, the use of triangulation to a 25×25 foot space or smaller foot space (e.g., 5×5 foot) may be constructed. As a phone 202 is moved from area coverage 702 to area coverage 702, the system may track its movement. Each square foot sector may overlap an adjoining sector. In this way, as shown in FIG. 7, tracking may be continuous, without any gaps.

Figure 8:
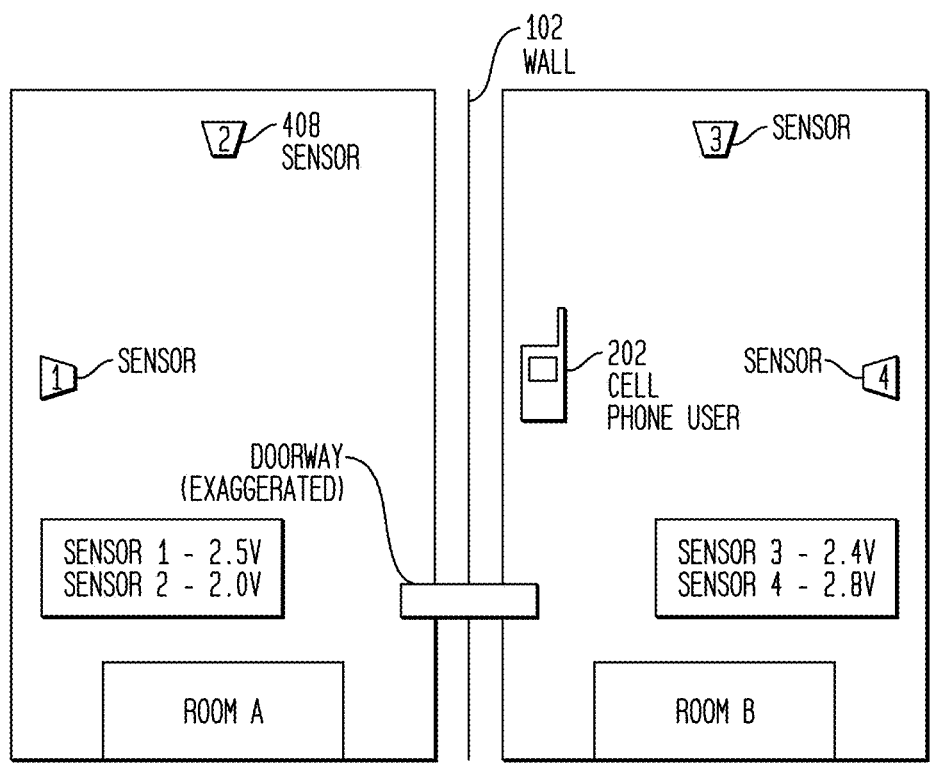
FIG. 8 shows a transmission facility detection system wherein a signal source is differentiated between two adjacent rooms.

In an embodiment, it may also be important to know whether a phone is located on one side of an obstruction or the other, such as doors, walls, and the like. If the wrong room is identified, it may make it more difficult to locate a phone and its user. As shown in FIG. 8, detection of the correct room may depend upon the level of the signal received. Proper placement of the detector units 408 may insure that the phone may be identified in the correct location.

Figure 9:
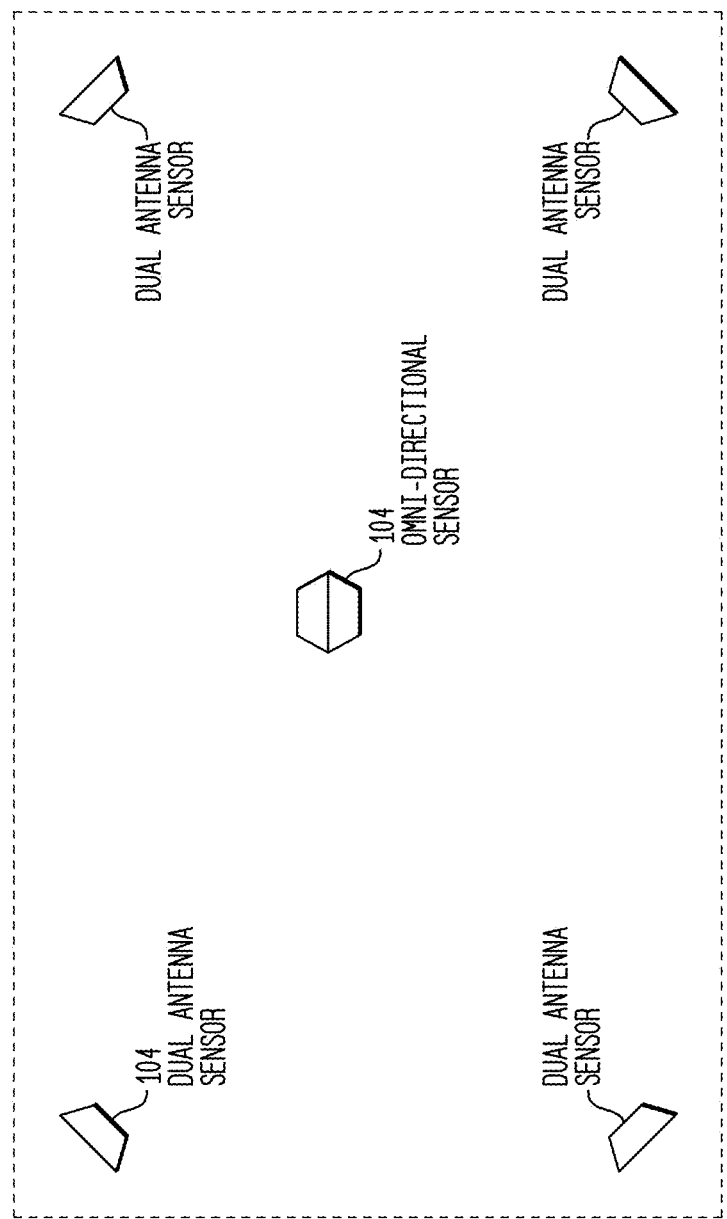
FIG. 9 illustrates a transmission facility detection system configuration employing multiple antennas used to identify a location of a signal source after detection of its presence.

In an embodiment, when sectoring a large room such as a gymnasium, the number and placement of antennas 104 may be critical. In order to sector large regions, such as a 10×10 foot section, within the room, the antenna 104 may need to be capable of narrowing their window to an area small enough to meet the requirement. In FIG. 9, there is shown an Omni-directional antenna 104, which detects signal presence generally in a 360 degree direction. Once a signal crosses a threshold, the direction finding antennas 104 may be turned on to determine the position of the signal. This may be reported to the display 112 and tracked until it is either turned off or moves to another room or hallway. Then, normal positional tracking may take place. It is to be understood that the FIG.s and descriptions of the present invention described herein have been simplified to illustrate the elements that are relevant for a clear understanding of the present invention, while eliminating, for purposes of clarity only, many other elements. However, because these eliminated elements are well-known in the art, and because they do not facilitate a better understanding of the present invention, a discussion of such elements or the depiction of such elements is not provided herein. The disclosure herein is directed also to variations and modifications known to those skilled in the art.

In an embodiment, the transmission detection, identification, and reporting system 100 may work in conjunction with a personal alarm system, or an inmate tracking system, or a combination of all three and the like. This dual/tri role system(s) may allow for more cost effective use of the detection units 408 and provide for greater protection for the correctional officer and inmate alike. This detection system may utilize an individualized frequency, with known frequency separation between detection units 408 and between corrections officer's frequencies and Inmate frequencies. The detection configuration of the detection units 408 may provide complete coverage of the facility. Each transmission facility unit may be continually tracked throughout the facility. At all ingress or egress points the focus of the detection may ensure accurate location of all correctional and inmate personnel. With the combined systems more detection units 408 may be needed to ensure full coverage. In an embodiment, the known identity of the transmission facility, in this case a cell phone being carried and/or used by an officer or inmate can be accurately associated with another known identity of another transmission facility, in this case a corrections officer and/or inmate wearing a transmission facility. In this embodiment, the use of an authorized cell phone or an authorized transmission facility by an unauthorized person can be accurately detected and reported. This embodiment can be utilized inside the facility or outside the facility.

In an embodiment, the transmission detection, identification, and reporting system 100 may allow for cell phone owner discrimination. The system may provide for the allowance of authorized cell phones within the prohibited area. The system may detect and identify each cell phone and compare the cell phone identity to the allowed cell phone user list. The system may record all phone use and may automatically alert the facility of all prohibited cell phone use. In addition, each cell phone detection event may be identified with a unique identifier and time code, to ensure proper identification. The CCTV system may also be integrated to ensure greater accuracy identifying illegal use of wireless transmission devices.

Figure 10:
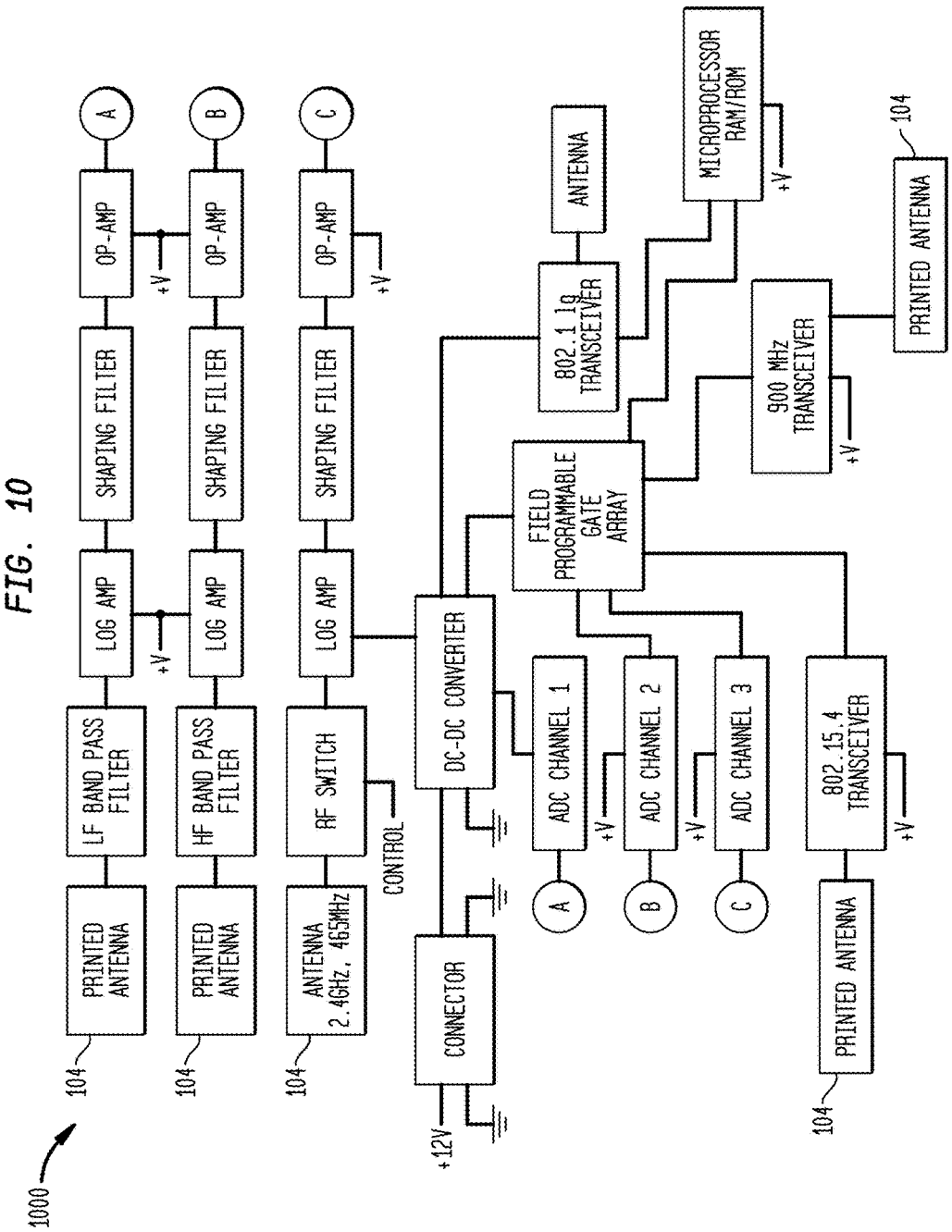
FIG. 10 shows a schematic diagram of a system for detecting signals of a transmission facility.

The cell scan-1 detection system 1000, shown in FIG. 10, is an embodiment of a system for detecting signals of a transmission facility. Antenna 104 receives transmission signals from wireless transmission device (not shown). Antenna 104 may operate, for example in the range of 2.4 GHz with a bandwidth of 465 MHz The received signals are then provided to a low pass filter and a log amplifier, wherein the level of amplification is based on the input level of the input signal. The amplified signal is next provided to a shaping filter and an operational amplifier. The amplified signals are provided to an analog-to-digital (ADC) converter and provided to a Field Programmable Gate Array (FPGA). Information from the FPGA may be provided to a microprocessor to supplement the processing and control imposed by the FPGA. The FPGA may receive information from dedicated frequency bands (e.g., 900 MHz) or from known wireless protocols (e.g., 802.15.4). The microprocessor may then determine whether a detected transmission facility for example is a person with a transmission facility (e.g., wristband, a cell phone) and may allow or prevent that person from accessing an area. The microprocessor may also alert the central unit of the persons entering or desire to enter a restricted area. In another embodiment, if the transmission facility, for example, is a cell phone and the cell phone was in use within a restricted area, the cell phone would be identified by the central unit as being in a restricted area, then the system will determine whether the cell phone is authorized or not authorized, then the system would make a determination, based upon set rules whether to allow or disallow the transmission unit within the restricted area.

The cell scan-1 detection system 1000, shown in FIG. 10, is an embodiment of a system for detecting signals of a transmission facility. An antenna 104 receives wireless transmission facilities in a 2.4 GHz band, with a 465 MHz antenna. In other aspects, the detection system may detect signals in other frequency bands, for example, 933 MHz, 433 Mhz, 2.4 GHz and other known frequencies. The detected signals are provided to High and Low band RF filter. The RF filters (band pass filter) isolate sets of frequencies for greater sensitivity. For example, the received signals may be provided to a low band RF filter to isolate low band RF signals and high band RF filters to isolate high band RF signals. The isolated RF signals are provided to Log Amplifiers that amplify or boost the signals using known amplification methods. The switch between two Wi-Fi frequencies switches all three wireless signal inputs into a log amp circuit and then to a smoothing filter to clean up the signals to be analyzed. The signals are then provided to an Operational Amplifier (Op Amp) which amplifies the received analog signal. The amplified RF signal is then processed through an A/D converter which changes the signal into a digital signal. The signal is then processed in a processing unit (in this case a dedicated Field Programmable Gate Array (FPGA)) and the results are then transmitted via a dedicated 2.4 GHz transceiver unit. The 2.4 GHz transceiver unit has several other applications, and is used to transmit and receive communication information and to connect to external Wi-Fi communication devices. An example of this is an education system for inmates, medical monitoring equipment in a hospital application, an interactive ID for safe school applications. The 900 MHz transceiver unit is for sync-ing the sensors. The 465 MHz transceiver unit is for communication with inmates bracelets and Staff (personal alarm system) as is further discussed in the aforementioned related patent applications. The lower frequency of the 465 MHz unit also provides better wall penetration and alterative wireless communication device with better wall penetration. In another embodiment, the front end of the signal detection circuit an amplifier (e.g., 0-40 dB gain) is added before the RF filter (for example an 824-849 MHz RF filter) to provide for greater sensitivity. In additional, a mixer and Voltage Controlled Oscillator (VCO) (not shown) is added after the RF filter. The output of the mixer is an IF (intermediate) frequency that is amplified and then provided to a band pass filter (e.g., a 200 MHz filter with a bandwidth of 4 MHZ). The signal is then amplified and then provided to the Log Amp then to an Op Amp and then to threads (A/D). Depending on the noise floor (which is determined by proper grounding), one with an understanding of RF circuitry would know to have proper impedance matching between components, and will utilize transformer(s) where appropriate. The IF section's general parameters are 70 MHz to 350 MHz and sensitivity is related to frequency and the width of the band pass filter. As would be appreciated, the tighter the width of the band pass, the greater the sensitivity. In another embodiment, the VCO/mixer maybe fixed and the IF band pass filter may be the bandwidth of a desired frequency providing for faster detection without the need to scan. Additionally the greater the dynamic range of the sensor system the greater accuracy and resolution in determining the exact location of the transmission facility.

In an embodiment as shown in FIG. 10, the processing section may be placed on a separate board, this provides for multiple sensors front ends utilizing one back end processing unit. This provide for more cost effective sensors and versatility of assets. This also allows for specific functionality such as antenna array directional location and angle tri-angulation being synchronized to at least one processing unit. It is also anticipated the more expensive processing component be shared such a transmission signal decoding, data analysis, communications and the like.

Figure 11:
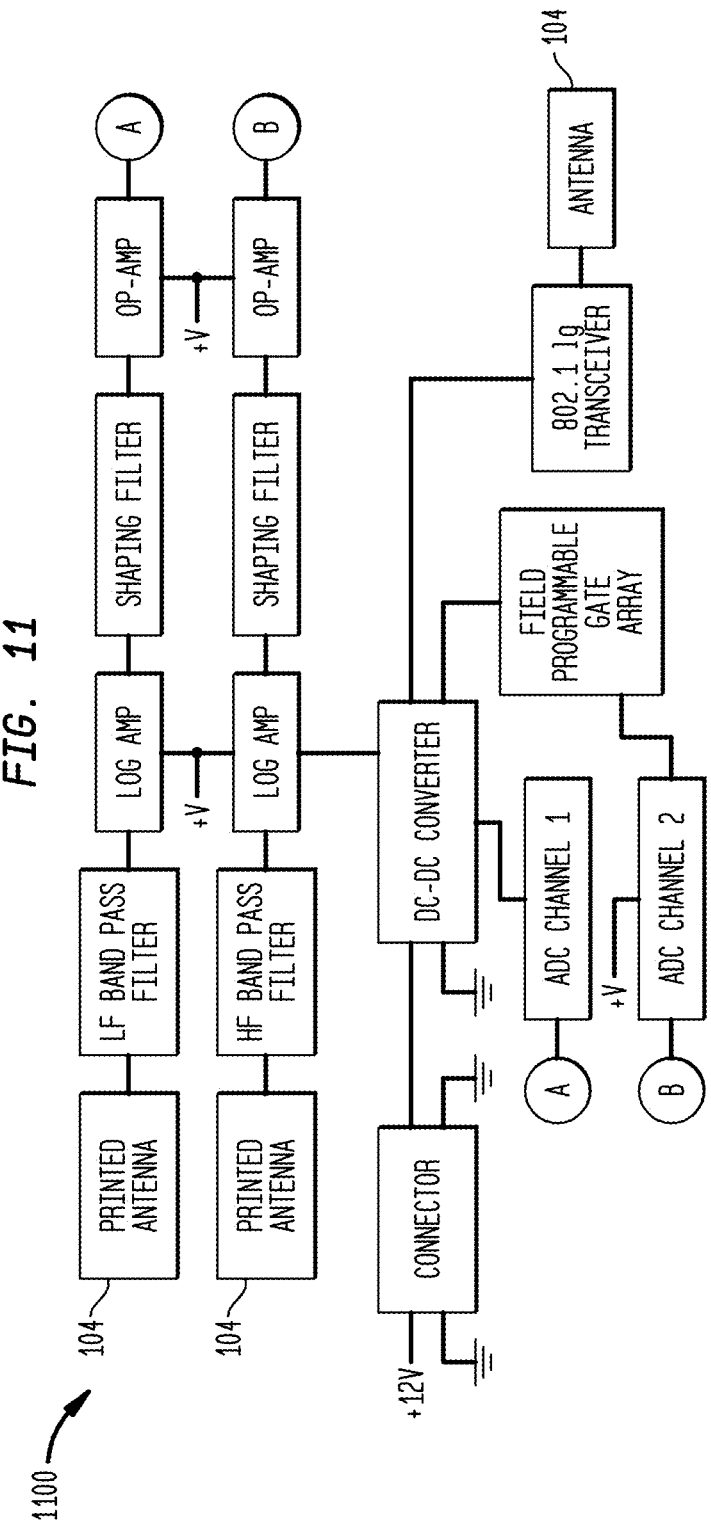
FIG. 11 shows a schematic diagram of an alternate embodiment of a system for detecting a signal of a transmission facility.

The cell scan-2 detection system 1100, shown in FIG. 11, shows an alternate embodiment of a system for detecting a signal of a transmission facility. The RF filters (i.e., band pass filter) isolate sets of frequencies for greater sensitivity, in this example a low band cell phone signals and high band cell phone signals. The operation of the elements in FIG. 11 is similar to that of FIG. 10 and need not be discussed in detail herein.

Figure 12:
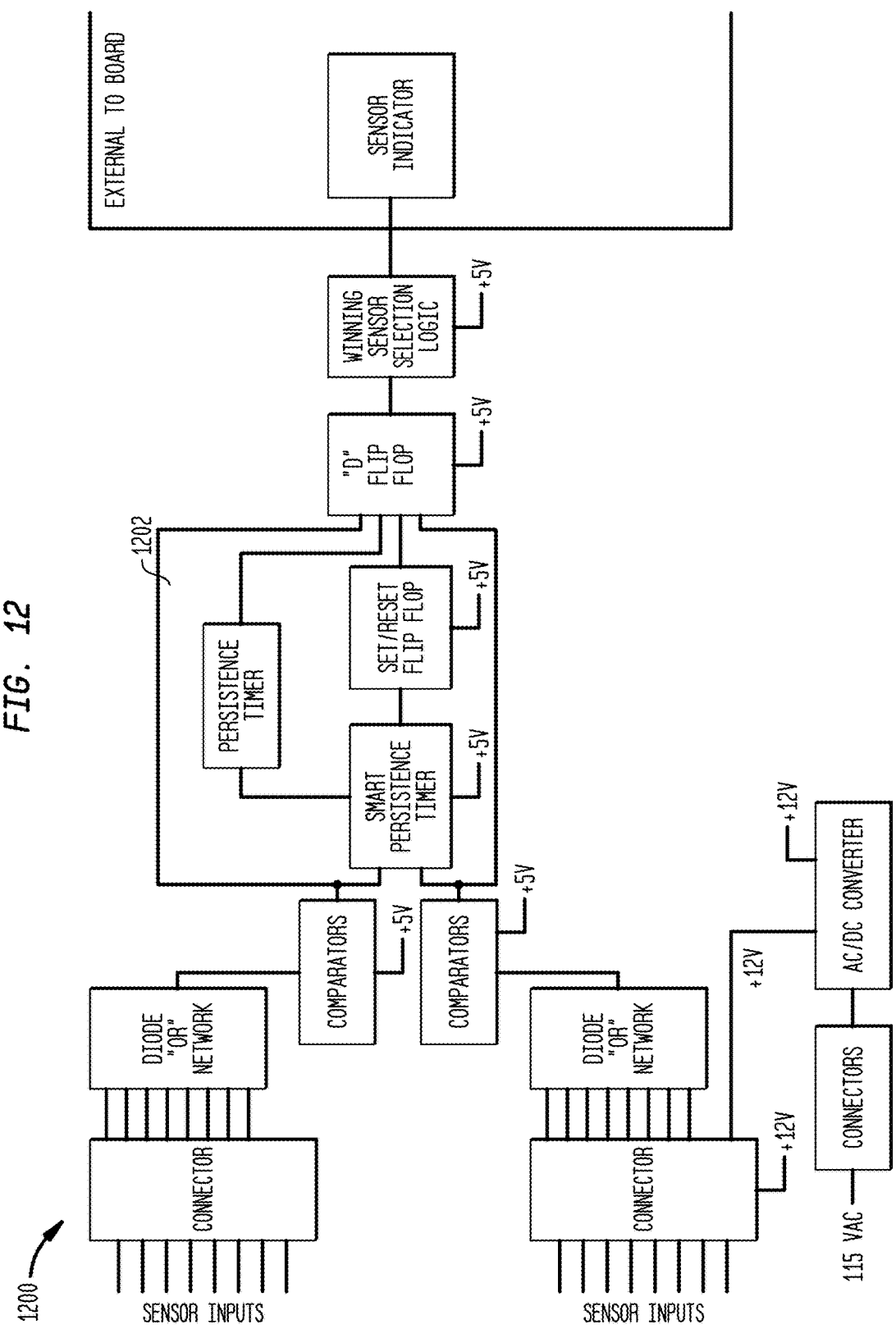
FIG. 12 shows a schematic diagram of a main circuit board within a system for detecting transmission facilities.

The main board system 1200, shown in FIG. 12, is an embodiment of a main circuit board within a system for detecting transmission facilities. The system may be used to determine each signal received is an actual cell phone signal and not a spurious output. Thus, a test may need to be performed that checks for the 'persistence' of the received signal. A persistence test may run a timer 1202 for a minimum required time that may be nearly as long as the time of the shortest signal type expected. If the signal is present at the end of the timeout period, it is less likely to be a spurious response and more likely that it is a cell phone output. For example, if a GSM signal of 500 microseconds long is the shortest duration signal of all the cell phone protocols received, the persistence test may run for 450 microseconds to further ensure that the received signal is not merely a spurious response.

Figure 13:
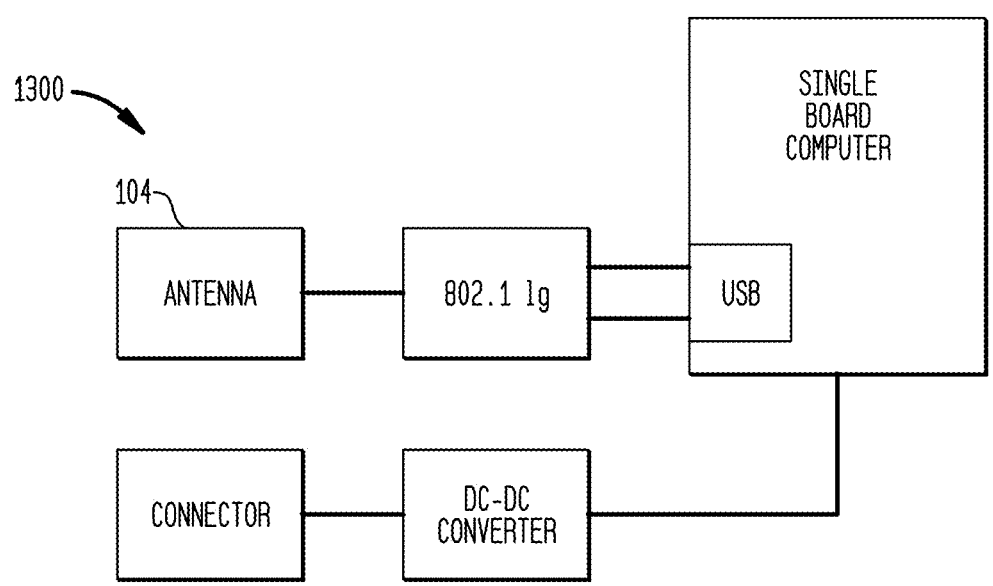
FIG. 13 shows a schematic diagram of a sub-station in a system for detecting transmission facilities.

The sub-station system 1300, shown in FIG. 13, is an embodiment of a sub-station in a system for detecting transmission facilities.

Figure 14:
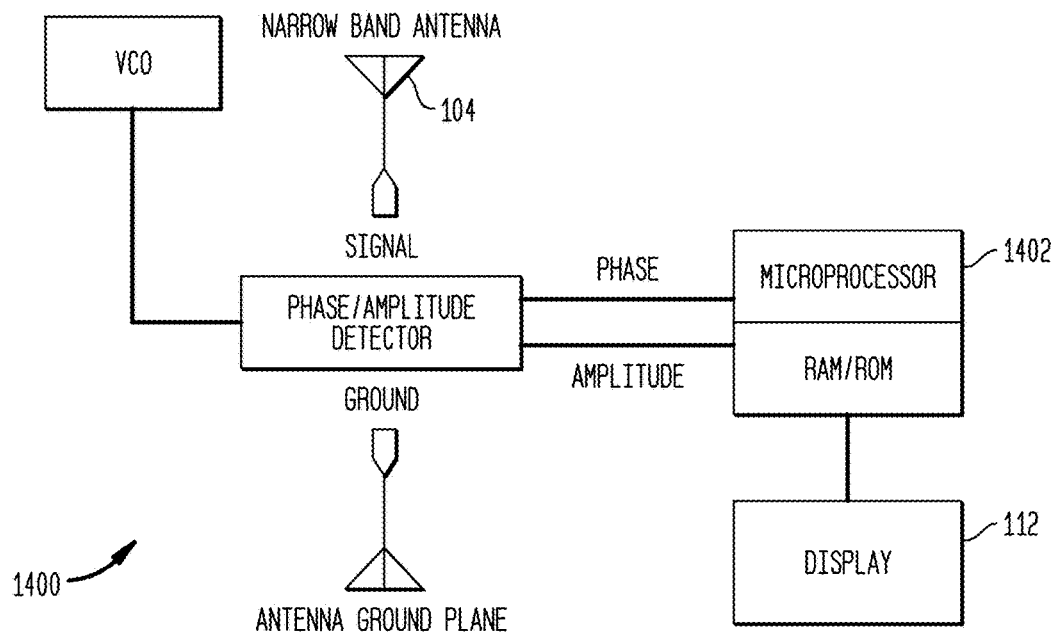
FIG. 14 illustrates a null detection facility.

FIG. 14 illustrates an embodiment of a null detector (1400), wherein the VCO in FIG. 14 tunes to known antenna frequencies and the system detects a null in the known antenna frequencies in which the antenna is detected. In embodiments, the null detection system may detect the presence of a transmission facility even when the transmission facility is not transmitting a signal. In embodiments, a hand held or mounted null detection device may be used in a correctional institution or other government facility. In embodiments, null detection may utilize a transmission-detection source, independent of the transmission source being detected, which is capable of sweeping across the frequency spectrum of interest and receiving its returning signal. The transmission source sweeps the spectrum of interest, searching for distortions in the returned field. Distortions in the spectrum may be due to the presence of an antenna of a transmission facility 202.

In embodiments of the system described herein, detection levels may be determined by which output levels are possible with the various cell phone technologies that are in use today. Since the system described is an amplitude system, the strongest and weakest possible signals must be determined in order to identify the system's required dynamic range. Cell phone signals vary from −22 dBW to 6 dBW and this range defines the detection requirements of the system. This translates to a maximum signal of 4.0 Watts at the antenna. The minimum value is equal to 0.006 Watts or 6 milliwatts. Therefore, the dynamic range required is −52 dBm to +36 dBm. In order to achieve such a dynamic range, an amplifier that is gain adjustable is required such that with an input value of +36 dBm, the amplifier is not saturated.

In the embodiment, the system determines the characteristics required to insure that each cell phone is correctly identified. The amplitude of each signal is determined which allows the system to determine which sensor has received the largest signal. The system time stamps each data sample so that other sensors receiving the same signal will be recognized as such when the data is presented for analysis. Each sensor analyzes the wave shape of the signal detected. Each transmission type (i.e., CDMA2000, PCS, TDMA, GSM, IS-95, etc.) has a unique wave shape. These wave shapes allow the analysis software to recognize that signals seen in different parts of a facility can be associated with each other (using time and wave shape) and the signal that consistently contains the largest amplitude will be identified as closest to the cell phone transmission In embodiments of the invention, signals directed toward an IED (improvised explosive device) may be intercepted, identified and denied service. Such interception may be up to a known range in forward and side quadrants. The identification and determination of the position of the person or persons using a satellite phone and/or land-based cell phone may be determined. Cell phones, as well as other RF devices, e.g., garage door openers, walkie-talkie, etc., may be captured, identified and/or jammed that are attempting to activate or contact the IED.

In embodiments of the invention, when a cell phone, for example, is on, but not in an active communication, the cell phone is essentially invisible to anyone attempting to monitor cell phone activity. In order to be aware of the existence of such "on but not transmitting devices" the system described herein operates as a cell tower. That is, the system actively addresses the problem of cell phone detection by operating (becoming) the tower. A vehicle with similar (but modified equipment to that of a cell tower) may actively poll the area of phones that are "on but not in a communication of any sort.—The vehicle (i.e., Pseudo Tower) collects the current database of active phones and those phones in standby from the tower(s) in the area and uses this data base to poll these phones in order to locate them. Once potential phones that could be possible detonation cell phones are identified and located, the Pseudo Tower would affect a handoff and make itself the active tower. Thus, the captured cell phones are not allowed to rotate back to (i.e., connect to) the local cell phone tower, insuring that any calls attempting to communicate with the detonation cell phone will not be sent. As one of the goals is to identify the person who is attempting to contact the detonation cell phone, a call history of each suspect cell phone may be analyzed.

When a caller attempts to activate an IED; the caller's presence can be identified. Furthermore, the call being made is not forwarded to the detonation cell phone and the IED will not be activated. By determining a peak angle (triangulation) the caller's cell phone/satellite phone signal, the direction of the caller is then known. Direction identification is performed by using a technique such an interferometry. In this case, multiple antennas employing interferometry may be used to scan through the current cell phone traffic identifying first, candidate threats and then, pinpointing high probability locations which can be viewed through a high powered binoculars to determine whether the candidate is in need of investigation. Criteria for determining which cell locations may be threats is a pole or road sign, etc. The Pseudo Tower may continue controlling all of the phones in the area, preventing any forwarding of calls until all possible threats have been cleared. At this point, the personnel have the option of going after the caller or deactivating the IED, or both. It would be possible to clear the area and detonate the device later if that is a desired plan of action.

Given the varying parameters by which detonation can take place, the Pseudo Tower may also be designed to deny service to any active and inactive phone within a given geographical area and pinpoint the location of said phones.

Satellite cell phone transmission presents a somewhat different problem. Since the transmission from phone to satellite to phone is communicated to a number of satellites, becoming a replacement for the satellite will require cooperation from the provider. Via one or more specific codes, the satellites may be told that the vehicle mounted satellite simulator (i.e., Pseudo Tower) will be taking over the control of phones within a certain radius. Since this is a moving or ever changing circle, the replacement "satellite" will have to continuously update the actual satellite of its position and which phones are being released and which phones are being controlled. Once this function has been implemented, the control of the suspect phones is similar to that of the cell phone. Determining the caller's position and the location of the detonation phone is as above.

Figure 15:
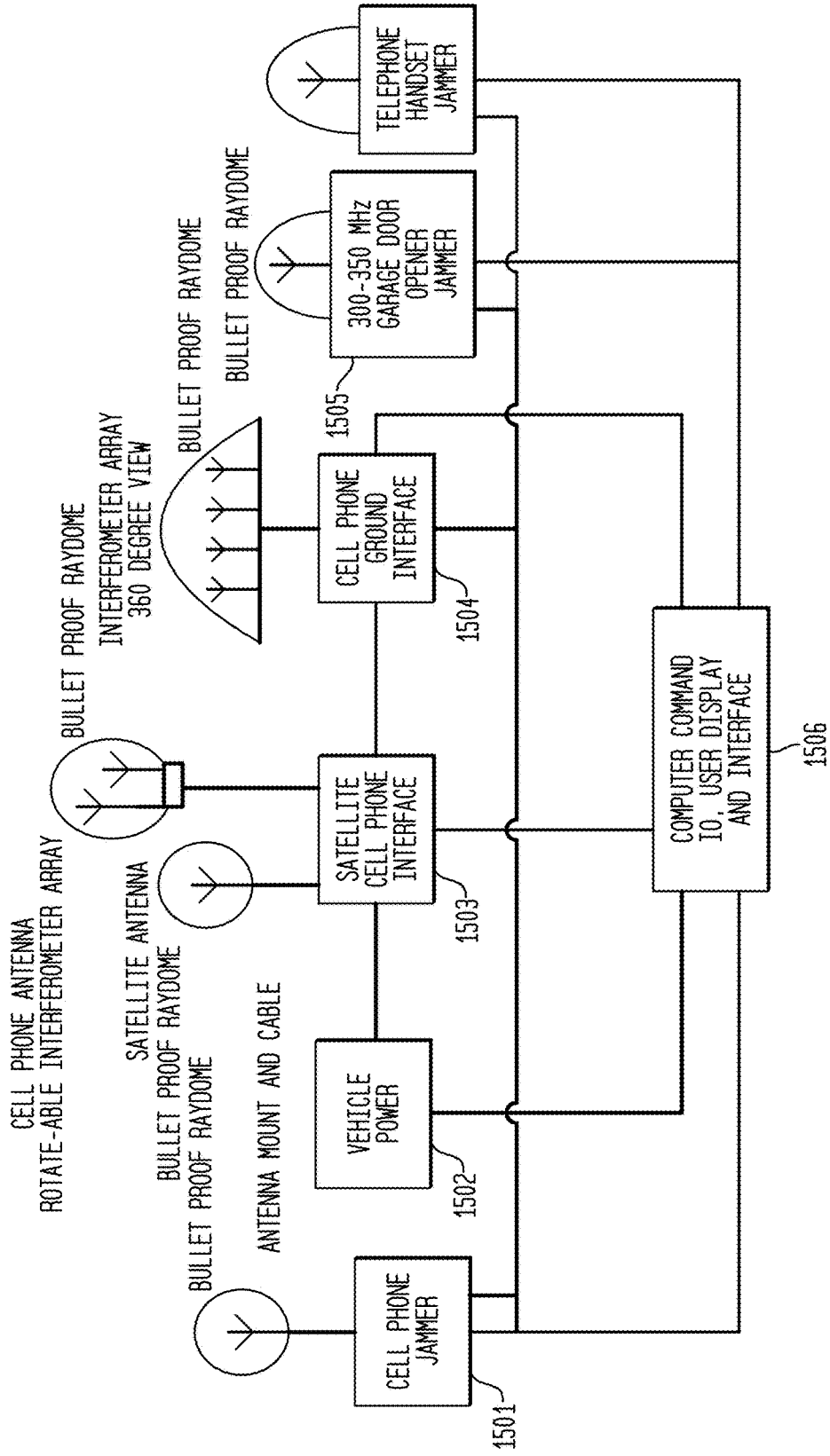
FIG. 15 Illustrates a system for detecting and controlling a transmission facility.

FIG. 15 illustrates an embodiment of a Cell Phone Detection, Control and Position Identification system (1500) in accordance with the principles of the invention which comprises cell phone jammer (1501) system that covers at least one of the known frequency ranges assigned to cell phone or mobile communication devices. In this embodiment to cover all the known frequencies and also used to stimulate wireless communication devices, a Power Unit (1502) provides the necessary power to run all the units within the Cell Phone Detection, Control and Position Identification system 1500, Satellite Cell Phone Interface 1503 operates as an interface and communications unit between the Cell Phone Detection, Control and Position Identification system 1500 and a satellite cell phone provider (not shown), a Cell Phone Ground Interface unit 1504, which includes base station technology for all communication devices operating within an area of interest. Also shown is an optional 300-350 MHz Jammer unit (1505) that operates to jam communication devices that communicate through an intermediary device, such as door openers, Walkie-Talkies and the like. It is anticipated that the system described herein is to be modular and expandable to cover the entire frequency spectrum in which transmission facilities (cell phones, mobile communications devices) operate. The Computer Command I/O, User Display and Interface 1506, comprises a communication, command and control system ($C^3$) that manages communication, command and control of the detection system 1500. Unit 1506 may further comprise one or more databases, and/or processes to execute the processing described, herein. Although not shown it would be appreciated that Command I/O unit 1506 may be in communication, via a public or private network, to one or more devices to provide information to or obtain information from remote sites (not shown).

Figure 16:
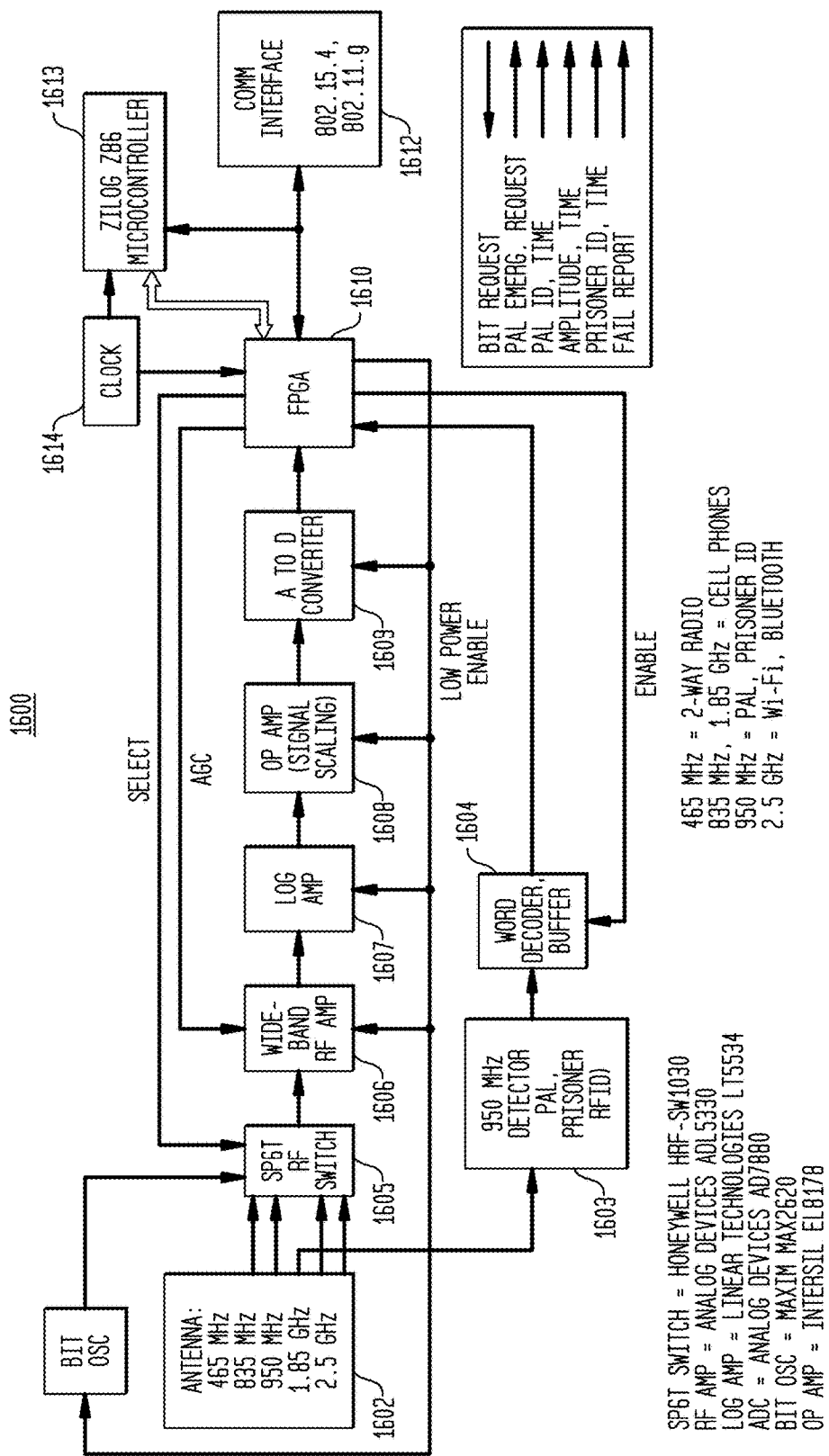
FIG. 16 Illustrates a system for tracking and locating transmission facilities.

FIG. 16 Illustrates a block diagram of an embodiment of a Cell Phone and Wireless Transmission Detection Facility in accordance with the principles of the invention. In the illustrated embodiment 1600, antenna 1602 is a multi-band directional array that operates to detect signals in a low band and in a high band (835 and 1.85 GHz range, respectively), a two way radio band (465 MHz), a Wi-Fila Bluetooth band (2.5 GHz) and PAL (Personal Alarm Locator) band (950 MHz). In the illustrated embodiment, the antenna connects to two components, first to a detector (1603) and also to a decoder (1604). The detector 1603 and decoder 1604 decodes the PAL Identification signal and may further decode biometric information, emergency information. In other embodiments, detector 1603 and decoder 1604 are configured to decode cell phone identifications. Antenna 1602 provides detected signals to a 6 way input switch (1605). The output of switch 1605 is connected to a wideband RF amplifier (1606). Wideband RF amplifier 1606 represents a variable gain amplifier that adjusts the detected signal amplitude based on the band in which a detected signal is detected by antenna 1602. In another aspect of the invention switch 1605 may be connected to a block gain amplifier (not shown) to provide amplification of the detected signal and the amplified detected signal may then be provided to a corresponding RF filter based on the frequency band of the detected frequency.

The wideband RF amplifier 1606 is connected to a Logarithmic amplifier 1607 (i.e., log amp) that amplifies the received or detected signal using a logarithmic function. Log amplifiers are well-known in the art to provide a larger amplification of a weak signal and a smaller amplification of a strong signal. The output of Log amplifier 1607 is provided to an Operational amplifier (OpAmp) 1608. The OpAmp 1608 amplifies the input signal and provides the amplified input signal to an A/D converter 1609 for conversion of the input analog signal to a digital signal. The converted (i.e., digital) signal is then provided to a FPGA (Field Programmable Gate Array) 1610 for subsequent processing. FPGA 1610 controls the operation of the illustrated Cell Phone and Wireless Transmission Detection Facility 1600 through feedback signals to switch 1605, for example. FPGA 1610 controls which signal frequency band and signal frequency is evaluated in what sequence. In the illustrated embodiment, FPGA 1610 communicates with the other sensors and/or access points via a communication interface 1612. In one aspect of the invention, communication interface 1612 may communicate with one or more wireless communication devices that operate using well-known IEEE wireless standard communication protocols (e.g., 802.15 and 802.11). In another embodiment, the communication interface may operate as a transceiver (transmitter/receiver) that may interface with two-way wireless transmission devices such as Walkie-Talkie or cellular telephone phones. The FPGA 1610 also interfaces with a microprocessor 1613, e.g., a Zilog Z86, an Intel xx86 series, Motorola Power PC. Processor 1613 may assist in the decoding, and operation of the Cell Phone and Wireless Transmission Detection Facility 1600. FPGA 1610 and the microprocessor 1613 may be synchronized by a crystal clock 1614. In other embodiments of the invention, the communications may be via a category 5 network interface connection in conjunction to the communication Interface 1612. Although an FPGA is referred to and illustrated in the embodiment of the invention, it would be recognized by those skilled in the art that the processing described by the FPGA may also be performed in other specific processor processors (e.g., ASIC) or in a general purpose processor which when loaded with and executing an applicable software module converts the general purpose processor into a special purpose processor. As would be recognized, the system shown in FIG. 16 is similar to those shown in FIGS. 10 and 11.

Returning to the embodiment of the Cell Phone Detection, Control, and Position Identification system shown in FIG. 15, control of a wireless communication device (i.e., transmission facility 202) may utilize jammers, and/or transmitter to either prevent the wireless communication device to receive or transmit information (preventing the triggering of the device), additionally the jammer/transmitter may be used to stimulate the transmission device and force the transmission device to re-acquire the base station technology, Wi-Fi, and 3rd party (in this example, when the wireless communication device re-acquires the base station technology, it will attach to our base station (Pseudo-tower). To ensure wireless communication device acquires our base stations as opposed to the network's base station, we provide greater signal strength drawing the wireless communication device to our base station. To facilitate the manipulation of incoming calls, the base station in FIG. 15 is backhauled to the actual wireless communication provider. This will provide for the ability to intercept all incoming calls, identify who the calls are and triangulate where those calls are originating from. In this embodiment, it is anticipated the incoming caller is in visual range as the detonation device. The signal detection sensors are deployed to locate the triggering communication device, as well the detonating device. Another method in this embodiment to acquire wireless communications is to raise the signal strength of the base station, in which the target wireless communication device sees the greater signal and automatically acquires the greater signal. The goal of this embodiment is to acquire, control, and obtain location and/or to stimulate a wireless communication device, which may be, in an active, non-transmitting, state or in a standby state, then to take control of said device, and prevent the device from detonating the IED. Additionally, this embodiment is designed to jam all communications devices in which control in not possible; an example would be the car door opener device. In a preferred embodiment, such as in 3G and 4G technology, an example a UMTS communication device, where encryption keys are required to communicate with cellular devices and there is an interest to control such devices, such as in a prison environment, and the Communication Control unit is not connected, and/or not being provided the encryption keys to communicate with the devices, and the system is not looking to disrupt the Commercial Cellular network, providing a greater signal then the commercial carrier, on the same frequency, signal and with or without the same scrambling codes (Pilot Information) as the commercial cellular network, the cellular device will attempt to communicate with the Communication Control unit emulating a UMTS radio (without encryption keys), the cellular device will determine it cannot communicate and then is forced to a 2G protocol, then the system, can capture the cellular device and control it. One of the downsides to this technique, when the cellular device is trying to communicate with the Communication Control unit, the cellular device broadcasts its inability to communicate with the Communication Control unit, this signal is picked up by the Commercial Cellular network and the commercial cellular network's Key Performance Indicators (KPI's) are degraded. To prevent this, in a preferred embodiment, jamming the uplink of the cellular device preventing the device from communicating to the Commercial Cellular network and/or modifying the instructing the cellular device's Maximum Allowed Uplink Transmit Power to −50 dB and the Inter-frequency Neighbor Cell Maximum Allowed Uplink Power to −50 dB, will prevent the commercial cellular network from receiving the cellular devices signal and thus not distributing the commercial cellular network's Key Performance Indicators (KPIs).

The embodiment shown in FIG. 15 utilizes a high level of signal detection sensitivity to detect the presence of a wireless communication device (transmission facility) within a known distance from the transmission detection facility. In this embodiment, the application is interested in two distinct communication devices; 1) the detonation device; 2) the trigger of the detention device. To take control of the detonation device, understanding the communications of that device and the communications device's access point is important. The control software is designed to first detect wireless communication devices in the zone of interest, in this application (a roadside application) the signal sensor provides a variable gain component with gain control over 60 dB range with approximately −40 dB attenuation and +20 dB gain. (see FIG. 16). This ability provides vary the sensitivity, depending on the type of wireless communication detected, and provide a safe and adequate distance from potential IED. The transmitter module also has a variable gain output to stimulate and jam different distances depending on specific applications. Furthermore, the base station transceiver technology provides viable gain to increase and/or decrease the capture radius as desired. Once the wireless communications devices within the area of interest are captured by the base station, the system concentrates on the trigger wireless communication device. The same methods as described above are used to detect and hone-in on the triggering device. All sensors and transceivers have Omni- and directional-capability, which increases their versatility. As mentioned earlier, signal power is a critical component when dealing with wireless transmission devices, the communication protocol typically, by design, causes communication with the largest available signal source. Typically, this is the closest source (i.e., base station), in our case, we are interested in all wireless communications devices within the area of interest to be controlled by our base station technology.

In accordance with one embodiment of the invention, the jammer units 1501 may jam or interfere with one or more frequencies or frequency bands to force wireless communication device within a local area to lose contact with an available base station and/or access point and to reacquire a connection to a local base station cell tower and/or access point. When the transmission facility (wireless communication device) initiates a process (referred to as handshake) to re-acquire a communication link with the available local base station cell tower, the communication link is diverted to, and re-acquired by, the detection system 1500 (which is referred to as a pseudo-base station) due to the greater signal power of the pseudo-base station or taking the actual base station and/or access point off-line. In another aspect of the invention, the pseudo-base station power is raised so as to be greater than actual cell tower signal strength. The signal detection sensors monitor the signal strength of the actual cell tower output to the wireless communication devices and increases the transceiver output of the pseudo-base station to provide the adequate difference between the actual base station and the pseudo-base station to transfer the wireless communication device from one base station to another. Thus, the cell phone, for example, will transition to the larger signal strength of the pseudo-base station and establish a communication with the pseudo base station. In a further aspect of the invention, the pseudo-base station may actively poll the area for cell phone (transmission facilities), and trigger the cell phones within an area of interest to cause the cell phones within the area to attach to the pseudo-base station.

In one aspect of the invention, where the application is to control the transmission facility within a local area, and to prevent communications from reaching the transmission facility of interest, the pseudo-base station may deny transmission of signals from the transmission facility to an actual base station or deny transmission of signals from the base station to the transmission facility. As mentioned earlier, in the latter case, backhauling the pseudo-base station to the local carrier network will allow for the positive identification of the triggering device, while still denying the ability to detonate the IED.

In an embodiment of the invention where it is important to identify and not control the transmission facility within an area of interest providing greater power, polling, control line request, interleaving existing towers and/or jamming to force the transmission facility to communicate its identification parameters. In this embodiment of the invention, gaining control of the cell phone (or wireless communication device or transmission facility) within the area of interest allows the system to prevent incoming and/or outgoing communications. Thus, as the wireless communication device is re-acquiring a communication link with the access point or base station, the wireless communication device provides its identification information that positively identifies each transmission facility within the area of interest. This identification information may be provided to the actual cell tower provider, which uses this information to individually disable the cell phone (transmission facility) from receiving or transmitting data, voice and/or communicating in any manner.

In an embodiment, the detection system 1000 (see FIG. 10) is synchronized with an access point, and/or base station technology. This synchronization allows the tracking and positive identification of each transmission facility within an area of interest. In this example, the transmission facility of interest (a triggering device) may be connected to or trying to communicate with another transmission facility, such as a cell phone or a land line phone.

In an embodiment, of the Cell Phone Detection, Control, and Position Identification System shown in FIG. 15, determines the identification of an incoming caller based on information contained in the transmission signal and does not allow connection to the wireless network while determining the location of the caller by triangulating the caller from a plurality of detected signals and tracks the caller thereafter. In this embodiment of the invention, the system shown in FIG. 15 disables the wireless device from receiving or transmitting signals from/to the wireless network and tracks the caller using the wireless device. The Cell Phone Detection, Control, and Position Identification System described in FIG. 15 also has the capacity to track wireless transmission facilities from great distances, and in this application, the system is mobile, therefore, tracking the caller. In one aspect of the invention, where the cell phone or transmission facility information is known, as determined through its communication with a pseudo-base station, for example, additional information can be gathered, requested and/or, extracted from the cell phone or transmission facility. Information such other transmission devices, cell phones, etc., that have been contacted or which have data transferred may be gathered, requested and/or extracted.

In an embodiment where information redundancy and positive authorization is important and positive identification is critical, the tools used in a school bus safety application egress point and school tracking system have direct applicability to positive identification of personnel and prison system automation, cost effectively tracking and monitoring lower threat classified inmates and staff and inmate safety. Safety application and tracking systems are more fully disclosed in the aforementioned related patent applications, whose contents are incorporated by reference herein. In an embodiment Cell Phone Detection, Control, and Position Identification System, the tools and application described may include facial and voice recognition, retina scan technology, card swipe, fingerprint analysis, in preventing escapes and misidentification within a prison environment. Classification of an inmate is a key component to safety within a correctional environment.

In an embodiment where positive identification of the transmission facility 202 and positive identification of the user of the transmission facility 202 is important, as discussed earlier hand-held detection units 408 detector decoding module (and or chipset) or a hand-held detection units 408 in sync with the pseudo-base station/wireless access point module provides the location and the identification of the transmission facility 202 or in this case, for example a cell phone or a 802.xx (e.g., 802.11a/b/g/n, 802.15) communication device. In corrections facilities, outside areas of the facility, for example, represent a large area and the like.

For example, like Angola state prison, where inmates and visitors and staff work a close-circuit television (CCTV) in synchronization with, or in communication, with the hand-held detection units 408 allows the CCTV to focus on the user of the cell phone. The CCTV system feeds images to the facial recognition software and a database of all known personal and/or inmates, to find a match and/or create an entry of new found cell phone and their owner's and/or user's identity. In the case of a prison application, building a database of know criminals, their associates and biometric information, including facial recognition, for data mining purposes is critical. An example is where inmates are passing contraband and using cell phone to coordinate their efforts. Where positive identification of the transmission facility 202 and positive identification of the user of the transmission facility 202 is important, utilizing cell phone identification, location tracking and positive identify of the criminals involved is crucial to preventing and stopping their criminal enterprise.

In another embodiment and application where positive identification of the transmission facility 202 and positive identification of the user of the transmission facility 202 is important, as discussed earlier the hand-held detection units 408 detector/decoding module (and or chipset) or a hand-held detection units 408 in sync with the Pseudo-base station/wireless access point module provides the location, in school safety where a student's location and a perpetrator who preys on school students, the tagging of visitors, student and employees is critical. In this application, CCTV and facial recognition, for data mining purposes of student, facility visitors (wanted or unwanted) is critical. In another embodiment, a biometric detection device is deployed to positively identify people. This device may include several devices to determine unique characteristics of a person, fingerprint, IRIS scan, and DNA detection. These biometric system are built to detect passively, the fingerprint detection device can be built into door handles in large building and other egress points. The DNA detector can be deployed in turnstile doors and egress points pressured air and vacuum systems can funnel the biometric identifiers to the DNA a receptors for analysis. Each embodiment of the biometric applications will be outlined in detail for implementation.

In embodiments, a method of detecting, identifying and tracking the movements of a specific transmission facility 202 in standby requires provoking and/or requiring the transmission facility to transmit a signal and to detect its unique identification. As discussed and explained previously, a hand-held detection units 408 with an integrated identification detector/decoding module (and or identification chipset module) and/or a hand-held detection units 408 which functions in conjunction base station and/or wireless access point technology, blocking and/or jamming technique in concert of the identification function provides the tools to detect the transmission facility, track its location, and to detect its unique identification. Tracking all transmission facilities and making positive identification of all communications. Utilizing and utilizing CORI and SORI databases of known perpetrator of students to detect when a threat is near, around or in a school facility is critical to school safety.

In the embodiment of FIG. 15, an interface with existing communication devices, such as a wireless cell phone provider or Wi-Fi access provider, may be provided. The interface which will allow and/or deny control is executed by the wireless provider.

In the embodiment of FIG. 15 the detector units (not shown) may include an antenna and a controlling unit, where matching the transmission facilities 202 with its unique identifier is critical for proper identification, tracking and control in this configuration, the detector units may individually control or may direct control over the transmission facilities 202.

Figure 17:
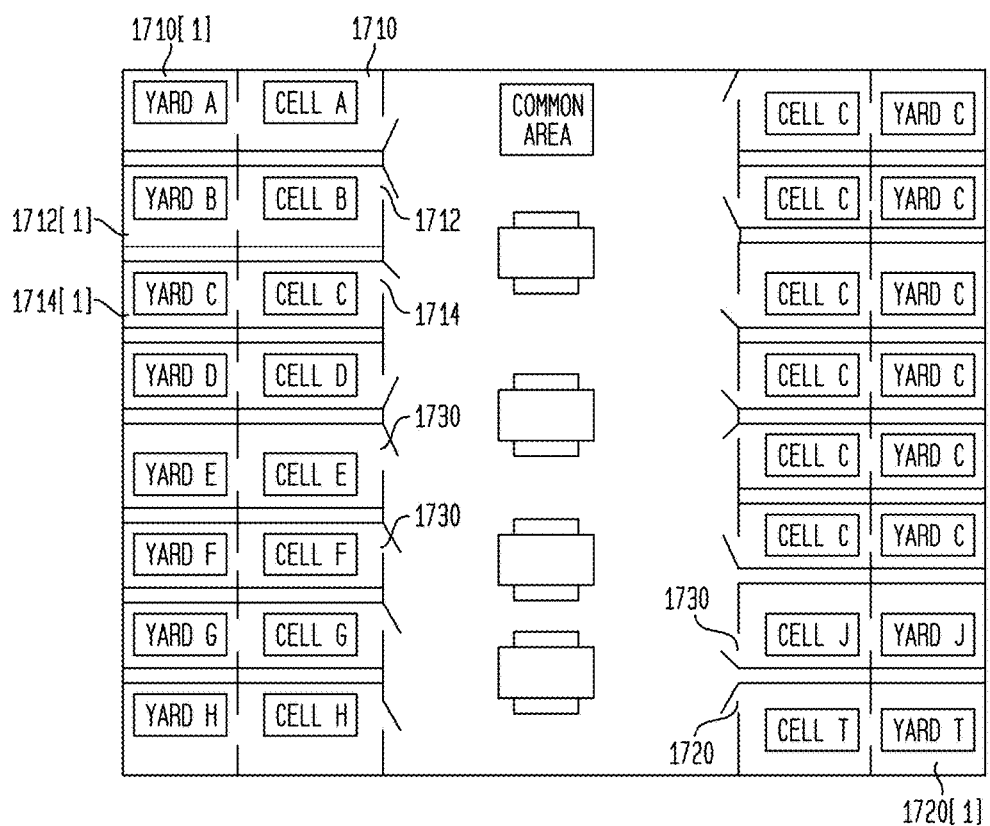
FIG. 17 Illustrates an exemplary corrections facility designed for automation.

FIG. 17 illustrates an embodiment, where it is the intention to run an automated prison to lower the necessary number of personnel and still the run a safe and secure facility.

In this embodiment, where there is limited, corrections personnel, all cells will be designed to allow outdoor access and unit access.

In this embodiment, for medical reasons all inmates will wear two transmission detection sensors.

In this embodiment, the wireless communication of the sensors will also carry education information and data to each of the inmate cells.

In this embodiment where inmate programs, services, commissary, inmate phones, medicine distribution, vending machines, GED education, needs to be inmate specific, positive identification is a critical must.

In other embodiment, the transmission facility is a cell phone, PDA or a Wi-Fi appliance, the education display system is an interactive display screen in a school telling the school supervisors that one or more students or personnel needs to turn off his cell phone, or a hospital advising a specific visitor by name, that cell phone even in standby may cause harm the medical devices being used to treat patients or the transmission facility provides information to the transmission facility detector of a unique identifier of the transmission facility via an interactive screen on the road side to tell a user to slow down as he is speeding. These are just examples of uses of the system illustrated. In addition, the system illustrated may be connected to any data mining database (not shown) to provide customized information to any transmission facility and specific information to a uniquely identified transmission facility.

In an embodiment where the classification of inmates is such where many inmates can co-exist in an inside and outside (minimum security, non-violent, criminals and the like) the use of CCTV, facial recognition and laser microphone, and inmate tracking and a database driven set of rules and parameters, coupled with the combine technologies mentioned this application provides the solutions to reduce the number of employees while maintaining a high level of safety and security.

In another embodiment, positive identification is critical to public safety within a correctional environment, understanding an inmate's relationship with other inmates, staff and their prior acts, impacts the safety and security of the institution. Outside a correctional facility authenticated positive identification and the system's ability to cross reference that person's positive identification through fingerprints, facial and voice recognition, retina scan technology, and DNA with his personal data and data set identify his family, his friends. His acquaintances, associations, and their relationship to criminal act and the ability cross reference the subject's information with criminal records, prior bad acts, and local unsolved crimes, place of residence, place of work, habits, trends, and mode of operations, court records, and prior incidents. When investigating a crime, a subject's favorite bar, hangouts, friends, relatives, associations, travel patterns, home address, places where they spend money, work address, family and friend, home address and work address and the like, become critical to investigate whether they are involved with or have committed a crime. In one embodiment of the wireless transmission tracking and identification system, the data key will be the unique identifier of the known person and all transmission facilities associated with that person will be mined and tied to that person. In an analysis, data key is determining positive identification of the transmission facility and positive identification of the person carrying the transmission facility. The data key is the unique identifier when a known person of interest is identified. In an embodiment an overlay of all criminal activity within an area, all known locations of all known, criminals and criminal associates, is overlaid with all transmission facilities, within the area and crossed reference with time and location looking for matches and time and location intersection points. All objects entering and/or leaving the area in the time of interest will be identified and cataloged in reference to the incident.

In a preferred embodiment of the invention, the program develops the flow of how the data is compiled and dissected, the DNA is sorted, the suspects' DNA is compared to the crime scene and know all of the partial matches, determining who their relatives are the program uses all the data and cross references of all people in the area and drills down on all people at the scene within a prescribed window of time; the program searches their phone records to determine who they have called, texted, then checks their criminal records, and their associates criminal records. The programs categorizes their criminal behavior learns behavior and patterns of like incidents. The program gathers from the devices and sensors identification information on victim, witnesses and suspects, their voice, facial, fingerprints, wireless communication. The program drills down for database matches, Identifies all parties present and identifies all wireless communications, DNA, video, voice identification from crime scene and the like. The program correlates the identity of the victim, the perpetrator(s), and co-perpetrators, to identify co-victims, identify witnesses and cross references for positive identification of all parties present. The tracking of the cellular devices and the overlay of the incident are tied together on a timeline by the program. If positive, identification of perpetrator(s) may be sufficient to make an arrest. If lack of information on participants remains, the program expands time around criminal act until information is more useful. The program reverse tracks the movements of the victim(s) and looks for intersection section with perpetrator(s). The program expands the search prior and post of the incident including all wireless communications movement and movement in and around that area, cars pedestrians each time cross-referencing the relationship of victim, witnesses and potential perpetrators. The program exams each victim, parses all known data on said victim, criminal records, place of work, relationship to perpetrator (phone calls, common address, common acquaintances, hangouts). The iterative process program cross references datasets of causal connections, relationships to the relationship of the perpetrator. Using the DNA records of all known criminals, the programs then looks at the relatives of suspects and the like, until a cross reference of the victim, and the suspects can be positively identified.

In another embodiment and application where positive identification of the transmission facility 202 and positive identification of the users of the transmission facility 202 is important, in school safety where of all students' locations and a perpetrator who preys on school students, the tagging of visitors, (see wristband technology) student, the visitors and their employees is critical. In this application, digital camera, CCTV facial and voice recognition, provides for a positive identification of all wears and users of wireless communication and the like. Verifying all people and all movement being tracked is the first step, verifying that all people who are being tracked are positively being identified; verifying all positively identified people are not a danger to the students. In this embodiment full motion/motion activated cameras with voice and facial recognition software and a database of all known persons capability. Where tracking cameras have full coverage of all school and/or area of concern, when movement is detected, CCTV units verifies identity, sensors identify transmission facilities database and data mining verifies information and the like. As an example when a person triggers a camera identification trap, the following occurs; 1) the signal detection sensors monitor and the system stimulate all wireless communications for unique identifiers; 2) if wristband/ID matches facial recognition software and a database of all known persons database (positive facial recognition and positive tracking intact; 3) if no wristband, is wireless communication present; a) if yes, does wireless communication and facial recognition match; b) if yes, when database lookup, of person equal danger; c) if yes, or unknown, sound alarm; d) if no, communicate via wireless communication device and request they return to front office to receive badge.

The embodiment includes an allowance unit which determines who is allowed within the facility and/or area and who is suspect and who is a known danger. Tracking all transmission facilities and making positive identification of all communications and the holder of those communication devices. Once positive identification is obtained, data mining may include, RMV, NCIC, W3, CORI and SORI, student databases, historical student and visitor databases and the like.

In embodiments, a method of detecting, identifying and tracking the movements of a specific transmission facility 202 in standby requires provoking and/or requiring the transmission facility to transmit a signal and to detect and identify its unique identification. As discussed and explained earlier, a hand-held detection units 408 with an integrated identification detector/decoding module (and or identification chipset module) and/or a hand-held detection units 408 which functions in conjunction base station and/or wireless access point technology, in which the base station unit (and or pseudo-base station) increases and/or decreases its output power to provoke a wireless transmission to acquire and/or re-acquire a new base station, during the handshake the unique identifier of the wireless communication can be intercepted and/or read/obtained. In other embodiments blocking and/or jamming a wireless communications signal with an access point/base station and/or tower, forces the wireless communication device to acquire and/or reacquire a base station and/or access point. In a roadside bomb embodiment, calculating the actual tower's power, then increasing the pseudo-base station's signal power to a X factor greater than the actual tower will manipulate the cell phone to reacquire the detection systems pseudo-base station. At the same time increasing the jamming signal to an a X factor greater than the actual tower, will force the cell phone off line and will cause the cell phone to trigger the IED, if the IED is set to explode when jamming is occurred, then if the phone is a connection to triggered IED, allowing the cell phone to acquire the pseudo-base station whose signal power has been increases to a X factor greater than the actual tower's provides for a capture of the triggering cell phone and an ability to go after the trigger man as described in this application. Other methods include the base station requesting the wireless transmission facility to reacquire and provide a handshake methodology or a control line request, or a stimulating signal, having at least one similar characteristic of the network base station, which requires a wireless communication device in standby to acquire/re-acquire an access point and/or base station. This methodology in concert of the identification function provides the tools to detect the transmission facility, track its location, and to detect its unique identification. As discussed above the detector units may include an antenna(s) 104 and a controlling unit, that are externally integrated with the transmission detection, controlling, identification, and reporting system 1500, where matching the transmission facilities 202 with its unique identifier is critical for proper identification, tracking and location matching of the transmission facility 202 unique identifier with the proper transmission facility 202 maybe accomplished through the time of signal arrival, phone type, transmission frequency, time division separation, time sync, channel frequency, cell tower identifier, (cell phone) transmission facility identifier or a combination of one or more methodologies depending on complexity and transmission facility 202 environment and the like. In an embodiment in which the unique identifier is encoded the tracking principle works the same, each unique identifier whether encode or decoded will be tracked.

In an earlier application, we described methods to positively identify and track and control cell phones and other transmission facilities, it is also known in the art how to utilize voice and facial recognition technology. Here we will describe methodologies to positively identify and track people and their vehicles through their transmission facilities. In an embodiment, each time a transmission is located, its position, and identification will be confirmed. As in a prison facility, each location of the transmission facility will be monitored by a CCTV camera and this information and data will be stored, each digital frame will be analyzed to determine whether positive identification can be determined. All data will be stored in a depositary where the key to the data set is the transmission facility unique identifier. The person and/or vehicle associated with the transmission facility unique identifier will be cross referenced by disparate database, for example Department of Motor Vehicles (DMV) records and Criminal History Record System (CHRS), transmission facility purchasing information records (most stores in which disposable cell phones are purchased have cameras) and the like.

In an embodiment, at each egress point of the facility, distinct areas within a facility, for example, a prison, or a bank, each transmission facility is identified and each egress point has CCTV and facial recognition and if located, its position, and its identification will be confirmed. A set of processes are developed to determine the positive identification of the carrier of the transmission facility and link the wireless transmission to the person's identification. In an embodiment to properly identify all people carrying the tracked wireless communications, the use of facial recognition, voice recognition, biometric detection, is deployed to positively identify the persons and/or person carrying the wireless communications. In an embodiment the camera system focuses on all faces and provides a positive facial recognition, wherein the information is cataloged with the wireless transmission information. In an embodiment the camera identification system can be one of many types, for example digital, pan and tilt, w/180 degree focus and the like.

In an embodiment, to combat high crime districts, curb gang violence, a cell phone (wireless transmission) detection, location and tracking system can be deployed throughout a large city. Each wireless device can be stimulated and tracked throughout the city. This information can be overlaid with criminal history records, Department of Motor Vehicles, parole and probation information, including where each known person of interest lives and works, where their associates live and work, and an overlay of all current and previous crime activity. In another embodiment the camera system identifies all not moving objects within its coverage area and catalogs the area identifying all fixed objects; the camera is equipped with several tools; laser finder, a microphone, motion detection software and infra-red analysis capability. The laser finder assists the camera system to positively identify height, width and depth of objects. Any movement entering/exiting or moving through the space is cataloged. Color, shape, size, temperature, parameters are setup within the system to detect nuisances within the object to determine unique identifiers. For example, a car identified is classified as a light blue 1997 Cadillac; however this Cadillac has a broken light on the left back fender. The system is loaded with all known product specifications to be used as reference material. The system also classifies and categories unknown objects.

In an embodiment of the invention, the system determines and cross-references all possible intersections of known persons of interest, their propensity to commit criminal act, their motives and habits, to known criminal acts, parole data, probation data, DNA cross reference matching, to known movement of all wireless communication and their movements. Through this embodiment, the system can determine what criminal acts have been committed upon whom, the movements of the parties to the criminal act prior to the act, movements after the act, other player, witness, their movement and transmissions. The program analysis the biometric data and the data is correlated with time, cameras, egress points, correlates passing and suspect cars, GPS w/phone information, WIFI Database correlation, wireless information, and other known transmission facility, such as on star communications and the like.

In the embodiment of FIG. 15, an interface with existing communication devices, such as a wireless cell phone provider or WI-FI access provider, may be provided. The interface which is in communication with the $3^{rd}$ party or other communication devices will provide the correct information (unique identifier) to the access provider which control and/or is connected to the transmission facility and will then allow and/or deny access to and/or prevent communication with the wireless provider or third party triggering device. According, the embodiments shown may also include an interface to the third party controlling unit. For example, the system shown in FIG. 15 may include a system interface with a commercial satellite cell phone provider and control of the cell phones passed between the carrier and the transmission detection, identification, control and reporting system.

In the embodiment, of FIG. 15 in a situation where there is a large number of transmission facilities 202 (in this example, cell phones) on a congested highway being able to find all the transmission facility(s) and their accurate location is critical.

Knowing the frequency and time of the transmission facility 202 transmissions provides the ability to tighten the bandwidth of the detection sensors, which increases sensitivity, and thus provides greater distance of detection. It also provides an intercept, in time and frequency providing for faster processing of signals.

In an embodiment, in a corrections complex, such as Angola State Prison, or a arbitrarily defined area where transmission facilities 202 are prohibited except for authorized transmission devices, the transmission detection, controlling, identification, and reporting system 100 whether internal or external to the facility may control, identify and prohibit transmissions from transmission facility 202 depending on the location or approximate location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art. In one aspect of the invention, the location may be determined using a method of non-iterative linear equations.

In an embodiment of the transmission detection, controlling, identification, and reporting system 1500 whether to control the transmission facility 202, may be determined by location of the transmission facility 202, type of transmission facility 202, identification of transmission facility 202, time of transmission of the transmission facility 202, frequency of the transmission facility 202, based on type of base station technology and/or location of base station technology and the like.

In an embodiment of the transmission detection, controlling, identification, and reporting system 1500 where the system is in synchronization with base station technology and techniques correlate the wireless signals, wherein the unique identifier is supplied by the base station when the transmission facility is stimulated by the jammer and/or base stations unit. Then the transmission facility is tracked and its interest is related to its location to the road, other variables include whether it is alone or it is in the hands of an individual and the like. The unique identifier is provided by the signal detection sensor or the base station unit and is used in synchronization with the base station identification and the location of the transmission facility. Another method to triangulate the location of the transmission facility utilizing with the assistance of the base station and/or satellite base station is to have the tower request the cell phone and/or cell phones of interest to re-acquire the tower, or increase its power. Here the tower knows it unique identifier and has required the phone to retransmit to triangulate the location of the wireless communication device. This method is also valuable in situations where the tower may have only an approximate location of the wireless transmission facility, but not an exact, or in such situations, such as in a building or an obstruction rich environment. Requesting the base station and/or access point to request the transmission facility to transmit a signal which can then be triangulated with the signal detection sensors improves the location determination.

In an embodiment of FIG. 15, the transmission detection, controlling, identification, and reporting system 1500 may also transmit the type, time, frequency of the wireless transmission facility of interest to a base station. The base station may then provide the system with the unique identifier of the detected transmission facility or the base station may detect a transmission facility at a specific frequency and the transmission detection, controlling, identification, and reporting system 100 tunes to that frequency to determine the location and unique identifying information of the transmission device. The system 100 may then compare the unique identifying information to a data base (not shown), the information and the parameters obtained from the data base may then be used decide how to treat the transmission facility; what to do with the transmission facility depending on where the transmission facility is considered friend or foe (i.e., allowed or disallowed).

In an embodiment of the transmission detection, controlling, identification, and reporting system 1500 where the transmission detection units includes a transmission decoding unit the system determines the location and the allowability of the transmission unit by comparing the transmission found with allowable or non-allowable transmission facility lists.

In an embodiment shown in FIG. 15 of the transmission detection, controlling, identification, and reporting system 1500, the base station indicates there is a transmission facility within the area covered by the transmission detection, controlling, identification, and reporting system 1500. The base station provides at least one unique identifier to the transmission detection, controlling, identification, and reporting system 1500. For example, the base station may provide at least one of: a frequency, a type of transmission facility, a time of arrival (TOA), an IMEI and other similar identifiers (e.g., encoded IMEI). The transmission detection, controlling, identification, and reporting system 1500 determines the location of the transmission facility, depending on the provided parameters, directs the base station and/or recorder, jammer, CCTV to perform a set of actions. Some of the actions to be performed are jam the signal specific to the cell phone, deny service (Denial of Service (DoS)) to the cell phone, allow the continued receiving and allow transmission of the detected transmission, record the content of the transmission, provide an indication that the transmission is allowable. In addition, the provided parameters may change depending on location, and other variables depending on application parameter and the like.

In an embodiment shown in FIG. 15 of the transmission detection, controlling, identification, and reporting system 1500 where detection system is separate from the discriminator unit, the discriminator unit may also include the controlling unit (base station technology and the like). In this case, when a unique set characteristics (parameters) are received by the detecting unit, and/or system 1500, which then provides information to the discriminator unit and/or controlling unit, which then passes back the correlated transmission facilities (the controlling unit, software radio, and the like) this information is processed. For example, a cell phone on the side of the road, with a person talking on it may not need to be disabled, in contrast to a cell phone in standby located within a zone of danger (60 meters of the road) may need to be controlled and disabled.

In an embodiment, the system 1500 will allow an authorized transmission facility to continue and/or provide the ability for the wireless transmission, (i.e., to talk and/or to receive calls) depending on the configuration and application. In an embodiment of the transmission detection, controlling, identification, and reporting system 1500 where detection system is separate from the discriminator unit, in this case the discriminator unit may also the controlling unit (base station technology and the like,) the system 1500 may further provide instruction to the controlling unit to allow or disallow transmission facilities, determined by their location.

In an embodiment of the transmission detection, controlling, identification, and reporting system 1500 the system compares the obtained information and depending on whether the detected transmission facility is determined to be a potential danger, the system may take the incoming transmission facility and determine its position prior to disallowing further transmission. This process is accomplished by knowing an identification of the transmission facility and using the information obtained by the controlling facility (frequency, time, type, channel, etc.) and searching for the incoming call signal. For example, in an improvised explosive detection (IED) situation, finding the trigger man may require the detection, identification and location determination in real-time. The array antennas will utilize large front end gain for the greatest distance. As discussed previously, jamming the area, to gain control of the transmission facility is one method of capturing the transmission facility. The ability exists to then track the trigger man from his current location and where he goes for investigative reasons.

In an embodiment shown in FIG. 15 of the transmission detection, controlling, identification, and reporting system 1500 where transmission facility retrieved data may be used to locate threats to personnel, and/or prevent an escape. Recovered transmission facility data may be used to track co-conspirators location and/or identify an unauthorized transmission facility.

In an embodiment where tracking and identifying a wireless communication device(s) in an environment where many wireless communication devices are present, such as a conference center and/or city street environment, some in conversation, some in-standby, some in the process of being turned-on, some in the process of being turned off, the ability to detect and positively identify the movement of a non-transmitting transmission facility in an orderly fashion becomes difficult. Cell phones, for example, in standby, the rate in which wireless communication re-communicates varies, e.g., 10 sec to minutes. In some cases, they passively listen and do not transmit in-standby at all.

In an embodiment, where the interest is to detect, locate and identify cell phones in standby, every 10 seconds, a prescribed interval of positively identifying and tracking is required, setting the transceiver communication period, for each wireless transmissions in a dense environment is important. There are several methodologies by which to make a cell phone in-standby to transmit its unique identifier, for example, triggered by the base station as described earlier in this application. A second methodology is to block the transmission and have the cell phone re-acquire the tower. A third method is to transmit a signal to induce the cell phone to reacquire the tower, switch frequencies channels, or if the cell phone loses communications it will automatically look for a connection. Orr if the wireless communication device detects a larger power-ed tower signal, the cell phone will connect to the perceived closer signal. Each one of these methods will force a cell phone in standby to re-connect with the tower.

In this embodiment, we will discuss, a methodology to provide for the orderly transmission identification, location and tracking of a set of wireless transmissions. In this example the wireless transmission facility, will be the tracking of a set of cell phones in a densely populated area. The phones will be stimulated/manipulated to provide their unique identifier, their response will be determined by their location within the coverage area, their phone type and their transceiver channel, the signal strength of the transceiver, modifying the transceiver phone type, transceiver frequency ban, modifying their transmission band, modifying their transceiver channel, for example, if the coverage area contains 5000 phones to be tracked, stimulating 1/16th or 22.5 degrees (see FIG. 19B) of the designated area, of a particular type and then multiplexing the transmission transceiver channel, in this example, channels 1-24 in a specific order. The first detection of the first slice and channel will result in detecting identifying a single phone type of a known number of cell phones. In this embodiment, the development of a methodology to determine which stimulating pattern, channel pattern, type and repetition rate will provide the best coverage of movement given the density of wireless transmission devices, versus the number of sensor within the coverage area, their variable sensitivity, and transceiver strength is discussed. As discussed earlier, in an embodiment in which, roaming base station technology is used to stimulate the cell phone, the power strength ratio of the Telco (network) tower versus the power strength of the pseudo-base station, will determine the range and depth of the area coverage by which the number of phone recycled is determined. Adding a backhaul capability as discussed earlier, will provide a greater manipulation of the cell phone.

In an embodiment where tracking and identifying a wireless communication device(s) which utilizes, for example, multiplexing technology such as for example, Code division multiple access (CDMA) phones, which is a channel access method utilized by various radio communication technologies. One of the basic concepts in data communication is the idea of allowing several transmitters to send information simultaneously over a single communication channel. This allows several users to share a bandwidth of different frequencies. This concept is called multiplexing. CDMA employs spread-spectrum technology and a special coding scheme (where each transmitter is assigned a code) to allow multiple users to be multiplexed over a same physical channel. In an environment where there are several wireless communication devices co-exist which utilize multiplexing and/or spread spectrum transmission technology, to get an accurate location, as discussed in earlier applications, an embodiment utilizes a directional transmission facility which provides a specific transmission to stimulate a wireless communication device, causing the wireless communication device to communicate with the access point. In this case a receiving and/or transceiver unit attempts a handshake communication. The wireless communication device, such as a cell phone, provides a unique identifier to the access point, in this case a base station transceiver. In an environment where many wireless communication devices are present, such as a conference center, where many cell phones and/or transmission facilities co-exist, the ability to distinguish one CDMA phone from another becomes a challenge, depending on the transmission mode of the CDMA signal. Some of the unique identifier are distinguishing TOA method, signal pattern distinction, phase prediction method.

In an embodiment in which the TOA method is deployed to determine the location of a set of transmission facilities, as discussed previously, we discussed the ability to determine the exact location of the transmission by detecting the TOA (time of arrival) of the initial signal from the transmission facility (in nanoseconds). In the case of detecting multiple CDMA spread spectrum transmission devices, in handshake acquisition, each CDMA wave form is categorized by detecting the actual time of arrival of each transmission facility within the interweaving of other spread spectrum transmissions. The transmissions are distinguished by the TOA raise time differential coupled with the amplitude change of the signal strength. Additionally, where the predictability of a new TOA is determined, validation of the TOA is confirmed. These characteristics are coupled with the predicted location of the transmission facility, amplitude of the signal, unique identifier of the wireless transmissions, phase and angle of the signal and the like. Additionally, utilizing, directional antennas with gridding pattern and a variable transmission signal to predict and determine the area of response coupled with the unique identifier with TOA method provide for complete and accurate tracking and location of CDMA phones in standby.

In an embodiment, a transmission from a transmission facility provides a unique identifier which activates a function in an action facility such as a display, specifically targeted to the unique identifier, it may provide information and the like, or an indicator the wireless transmission facilities are prohibited within a certain area or while driving or information about the location where the wireless transmission facility is currently located and/or danger (display unit). The database is developed to focus information associated with the unique identifier, to meet the mission of the display.

FIG. 17 illustrates an embodiment, where it is the intention to run an automated prison to lower the necessary number of personnel and still run a safe and secure facility. This automated facility is controlled by a centralized command and control center and/or a decentralize compartmental command and control center for all functions of the facility including movement of the persons within the facility. In this type of a facility, where complete and accurate identification and location of all personnel is critical, the tracking of individuals, their wireless transmission devices, cell phones, identification units, Walkie-Talkies, and verifying their access to authorized areas, integrating their movement with CCTV and positive facial identification, biometric identification, preventing movement into unauthorized area, developing inclusion zones, creating exclusion zones, ensuring proper count, providing an ability to restrict and/or authorized movement a specific design of the facility and convergence of technology is essential. The technologies discussed herein integrated to the central control provide the backbone and framework to operate such an automated facility, wherein each staff member and inmate transmission facility will allow specific movement throughout the facility. All movement throughout the facility may be monitored through CCTV and facial recognition. At each egress point, movement will be restricted to individual movement through one area to another area of the facility. For example, daily functions include, meals, medical, programs, court visits, and recreation, may be functions that may be monitored and controlled. As an example of the facility of the needs within the automation and the parameters and rules; Inmate Movement: need a creation of a Movement list and movement schedule, scheduling resources, allocation seating in particular program area classrooms, access to computers, access to the Law library, time allocation in program and use facility assets, enemy exclusion, (predator sheep-wolf exclusion) conflicts in scheduling GED, adult education, culinary arts, anger management developing waiting list, ability for inmates to signup, morning schedule and movement, afternoon schedule and movement, Pre-trial and religious services scheduling. Data mining database techniques and methodologies may be executed to provide for inmate scheduling movement and allocation of assets for the inmate relying on transmission facility authorization. The transmission facility will control access to all movement, asset resources, doors and egress, facility recourses and the time allocation on facility assets and in which movement takes place. Because of minimum human interaction, display kiosks displays schedule and informs the inmate where it is scheduled. The facility structure, may need to be modified to allow inmate access to the outdoor area, this design modification eliminates the need for outside movement and still provides greater freedom for the inmates with less need for direct supervision. Each sensor will monitor biometric signs including heart rate, temperature, and the like. With two wristbands, echo cardiogram can be generated with provide for health monitoring and for positive identification. The Cell Phone Detection, Control and Position Identification system 1500 (FIG. 15) will include a detector and decoder for all transmission facilities, which will provide positive identification for all transmission facilities, including cell phone and other hand held communication devices, and the specific individual in position of the transmission facility. All CCTV units will integrate with facial recognition software, all egress points will require biometric checks, such as fingerprint and renal eye scan devices, and this combined with the transmission facility positive identification. The design of the facility is important to provide adequate exercise movement and limited interaction with staff and other inmates. Therefore a redesign of the facility, to provide services such as decentralized education is important.

In this embodiment, the wireless communication of the sensors (see FIG. 10 and FIG. 16) will also carry education information and data to each of the inmate cells. Each inmate is equipped with a wireless tablet to take interactive education. In FIG. 10 the 802.15.4 will provide a dual role of sensor sync and education communication. In embodiment of a fully automated wireless communications and personnel and asset tracking, the communication to the sensors will be transmitted via cat 5 cables, which will be placed to communicate with the microprocessor and the 802.11. In this configuration the 802.11 will carry the interactive education and monitoring capability. The microprocessor in that configuration will act as a throughput conduit to isolate high-speed interactive communications between the cat 5 and the 802.11. In this configuration, audio and video, live interaction is capable to perform parole hearings, live interactive education, video visitations, suicide watch, video attorney visits and video court appearances. In this configuration a video server and interactive video switching system will be deployed to handle the interactive communication. As earlier described, the ideal location of sensors maybe the water chases to prevent tampering. This also provides the opportunity to have wireless communication with education units within the cells. This wireless communication also provides the ability to as wireless surveillance devices such as cell monitoring into the mix.

In this embodiment where inmate programs, services, commissary, inmate phones, medicine distribution, vending machines, GED education, needs to be inmate specific, positive identification is a critical must. To ensure this outcome, the positive identification of each transmission facility is paramount. An example of this embodiment, when an inmate approaches an education display system, the unique identifier of the inmate's transmission facility, provides information to the transmission facility detector of the unique identifier of the transmission facility. A database controls and provides all the applicable information to provide the correct information for each transmission facility. In this case, the transmission facility is a wristband ID bracelet.

In other embodiments, the wireless transmission facility such as a cell phone, PDA or a WI-FI appliance, can trigger an action, for customized actions, positive identification and unique identifier is established. One embodiment is when an inmate's wristband comes in proximity to the interactive education display system within his cell, it positively identifies him/her and logs the inmate into the system; this is accomplished via short range communications via the 802.xx technology in the wrist band and the education device. In another embodiment the interaction is callused by the RFID chip (active, passive and/or semi-active). In a school environment, when wireless communication device is detected, positive identification is established and the system transmits an action for the interactive display screen in a school informing the school supervisors that one or more students or personnel needs to turn off his cell phone. The action facility, first enables the allowability database and verifies the transmission facility is not authorized and/or the wireless communication device is in an unauthorized area or a hospital advising a specific visitor by name, that a cell phone, even in standby, may cause harm to the medical devices being used to treat patients or the transmission facility provides information to the transmission facility detector of a unique identifier of the transmission facility via an interactive screen on the road side to tell a user to slow down as he is speeding or informing the driver he is not allowed to use a cell phone or wireless communication devise while driving. In this embodiment, utilizing femto/Pico and/or transceiver technology action facilities is necessary to intersect and detect transmissions from the wireless device. These are just examples of uses of the system illustrated.

In an embodiment, where there is a large number of transmission facilities 202 (in this example, many cell phones) on a congested highway being able to find all the transmission facility(s) and their accurate location is critical. In addition being able to continuously track and positively identify each transmission is also critical wherein controlling a significant number of transmission facilities (cell phones) may be necessary. Therefore specific techniques need to be developed to regulate the frequency band the wireless devices occupy, when and in what order they are processed, the rate and the density and rate in which they are monitored. Techniques discussed earlier describe how to have a cell phone provide their identification. Here we will discuss some of the techniques to regulate the detection, frequency, volume and period of those transmissions.

Knowing the frequency and time of the transmission facility 202 transmissions provides the ability to tighten the bandwidth of the detection sensors, which increases sensitivity, and thus provides greater distance of detection. It also provides an intercept, in time and frequency, providing for faster processing of signals. One technique is for the transmission detection sensor to tell the base station and/or enabling technology when to transmit and also indicate the desired response frequency and/or channel. Another methodology is to regulate and/or schedule the transmission time of the base station(s) and/or enabling technologies within geographical areas and set parameter on the direction, radiation pattern, zone, and strength of the signal being transmitted to enable/regulate a number of transmission facility(s) contacted and/or regulating the number of responding transmission facilities.

Figure 18:
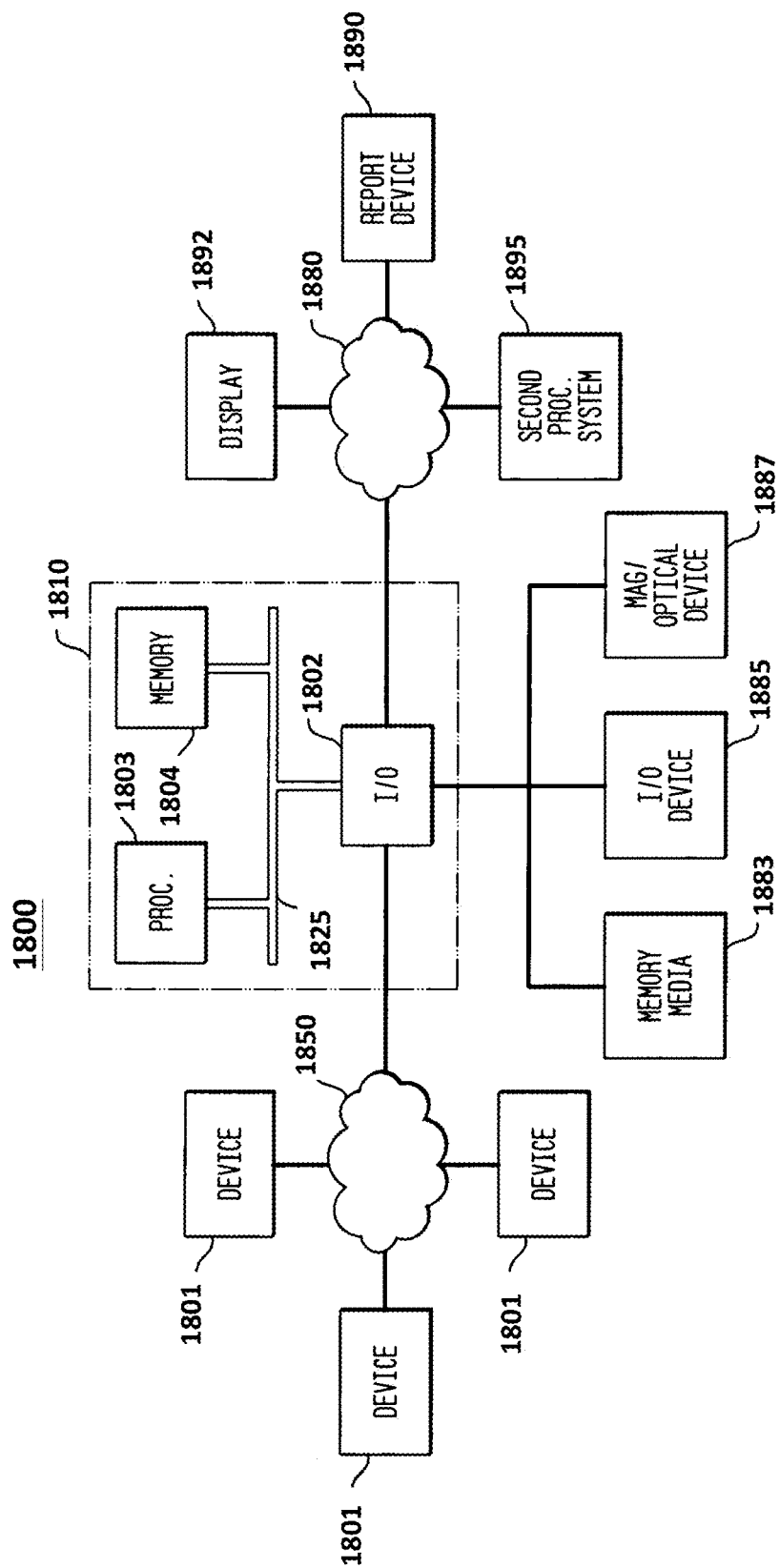
FIG. 18 illustrates a system for implementing the processing described herein.

FIG. 18 illustrates a system 1800 for implementing the principles of the invention shown herein. In this exemplary system embodiment 1800, input data is received from sources 1801 over network 1850 and is processed in accordance with one or more programs, either software or firmware, executed by processing system 1810. The results of processing system 1810 may then be transmitted over network 1880 for viewing on display 1892, reporting device 1890 and/or a second processing system 1895.

Processing system 1810 includes one or more input/output devices 1802 that receive data from the illustrated sources or devices 1801 over network 1850. The received data is then applied to processor 1803, which is in communication with input/output device 1802 and memory 1804. Input/output devices 1802, processor 1803 and memory 1804 may communicate over a communication medium 1825. Communication medium 1825 may represent a communication network, e.g., ISA, PCI, PCMCIA bus, one or more internal connections of a circuit, circuit card or other device, as well as portions and combinations of these and other communication media.

Processing system 1810 and/or processor 1803 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 1803 may be a central processing unit (CPU) or a special purpose processing unit or dedicated hardware/software, such as a PAL, ASIC, FGPA, operable to execute computer instruction code or a combination of code and logical operations. In one embodiment, processor 1803 may include, or access, code which, when executed by the processor, performs the operations illustrated herein. As would be understood by those skilled in the art when a general purpose computer (e.g., a CPU) loaded with or accesses code to implement the processing shown herein, the execution of the code transforms the general purpose computer into a special purpose computer. The code may be contained in memory 1804, may be read or downloaded from a memory medium such as a CD-ROM or floppy disk, represented as 1883, may be provided by a manual input device 1885, such as a keyboard or a keypad entry, or may be read from a magnetic or optical medium (not shown) or via a second I/O device 1887 when needed. Information items provided by devices 1883, 1885, 1887 may be accessible to processor 1803 through input/output device 1802, as shown. Further, the data received by input/output device 1802 may be immediately accessible by processor 1803 or may be stored in memory 1804. Processor 1803 may further provide the results of the processing to display 1892, recording device 1890 or a second processing unit 1895.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 1810 may also be in two-way communication with each of the sources 1801. Processing system 1810 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1850 and 1880 may also be internal networks or one or more internal connections of a circuit, circuit card or other device, as well as portions and combinations of these and other communication media or an external network, e.g., the Internet and Intranet.

Figure 19:
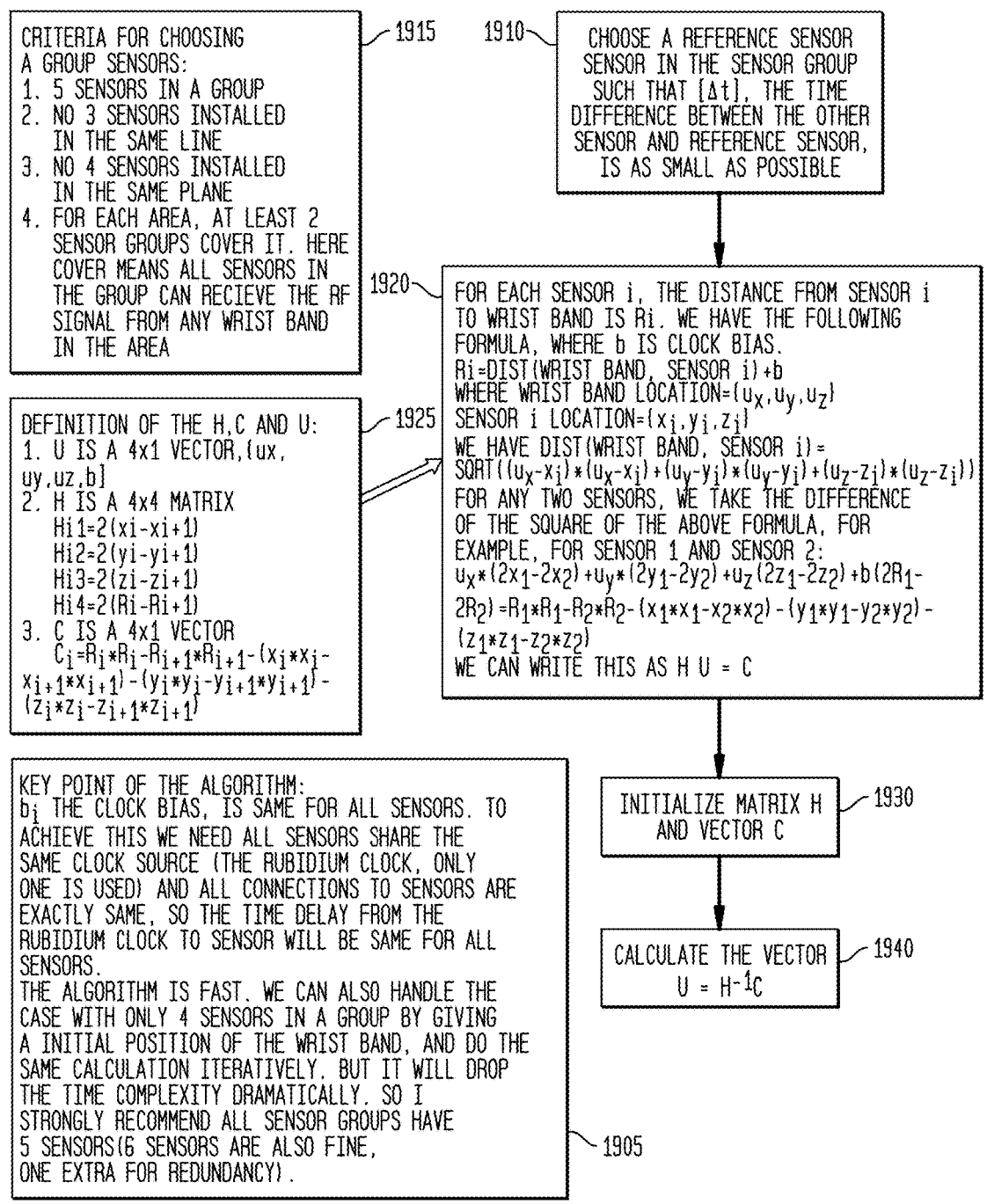
FIG. 19 illustrates an exemplary process for determining location in accordance with the principles of the invention.

FIG. 19 illustrates an exemplary process for determining a location using a non-iterative linear algebra algorithm. In this illustrated process, the criteria for determining a location of a device (i.e., a cell phone, a transmission device, such as a wrist band transmitter) is dependent upon the selection of a plurality of sensors that have detected a wireless transmission 1910. Exemplary criteria for selecting sensors are shown in block 1915. For example, in one aspect of the invention, at least five (5) sensors are to be utilized in the process shown. Further, the sensors must be selected such that no three sensors are installed within a same line and no four sensors are installed in a same plane. In addition, at block 1910, a reference sensor is determined as that sensor having the smallest time difference of a received signal among the selected sensors.

At block 1920, for each of the selected sensors, i, a range $R_i$ is determined between the sensor and the transmission device and the difference in distance between two sensors is then determined. Block 1925 discloses definitions of the terms used in describing the exemplary process. At block 1930, the matrix H and the vector C are initialized and at block 1940, the location vector of the transmission device is determined.

While the processing shown in FIG. 19 relates to a wrist band transmission device, as disclosed in related co-pending U.S. patent application Ser. No. 12/231,437, entitled "Wrist Band Transmitter," it would be recognized by those skilled in the art that the processing shown is applicable to other types of wireless transmission devices, such a cellular telephone, and wireless personal digital assistants and other similar type devices, whether being special purpose (i.e., wrist bands) or general purpose (i.e., cell phones).

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, while the device described herein is referred to as a transmitting device, it would be recognized by those skilled in the art that the device may incorporate a receiving unit, designed to operate in one or more frequency bands over a wide frequency range. For example, the receiving system may represent a crystal receiving system that may detect one or more signals within a frequency range, or may represent a super-hetrodyne receiver that may detect and determine the frequency of operation of received signals.

In an embodiment, in a corrections complex, such as Angola State Prison, or a arbitrarily defined area where transmission facilities 202 are prohibited except for authorized transmission devices, the transmission detection, controlling, identification, and reporting system 100 whether internal or external the facility may control, identify and prohibit transmissions from transmission facility 202 depending on the location or approximate location of the transmission facility 202.

Figure 19B:
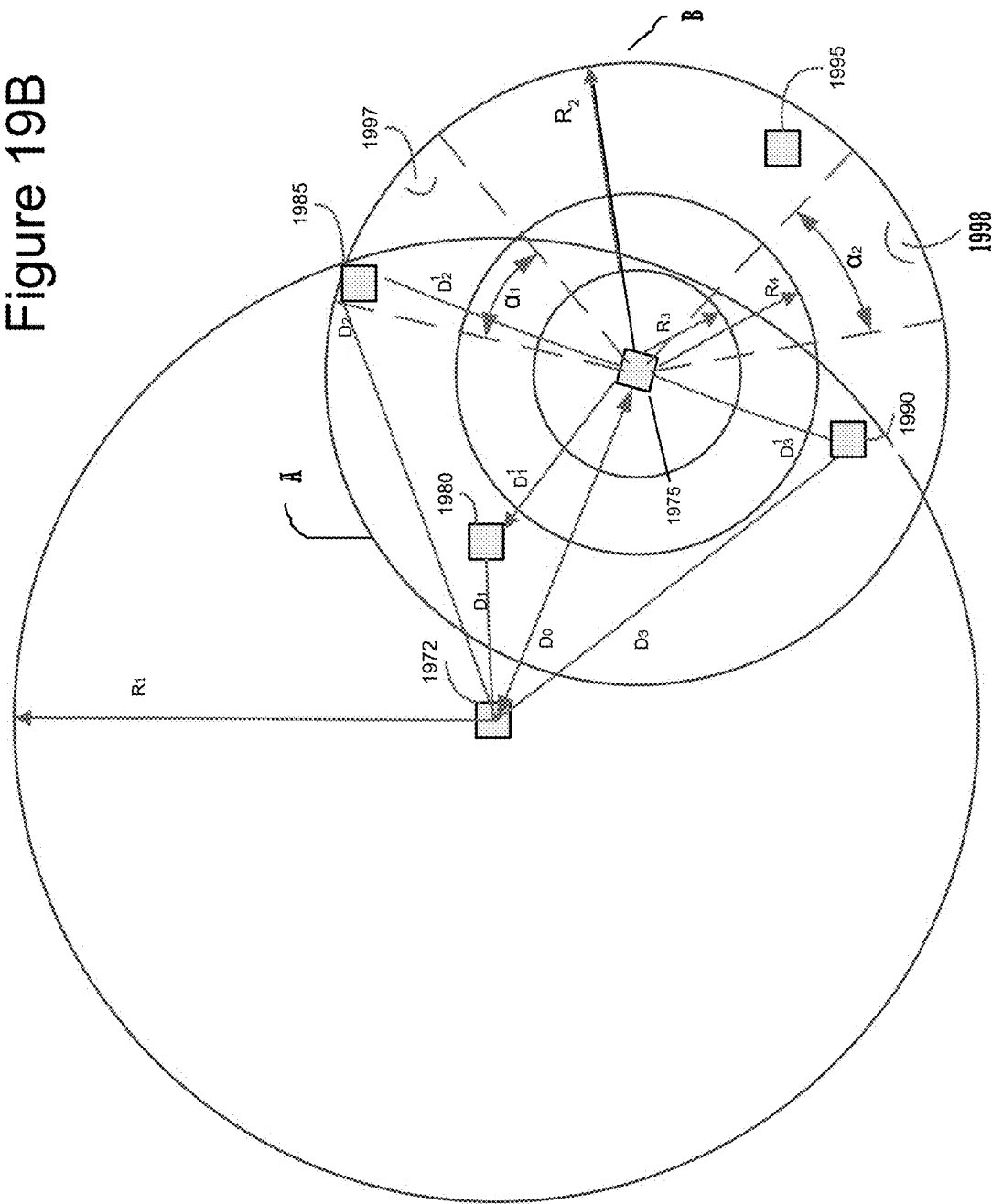

FIG. 19A illustrates an exemplary process 1902 for capturing a wireless transmission in accordance with the principles of the invention and FIG. 19B illustrates an exemplary geographic configuration for explaining the processing shown in FIG. 19A. Referring now to FIG. 19A, at block 1912, a reference signal transmitted by a transmitter (1972, FIG. 19B) is received at a transcribing system (1975). The transmitter 1972 has a transmitting range represented by a distance $R_1$. An estimated distance ($D_0$) between the transceiving system 1975 and transmitter 1972 of the reference signal is determined based on a received power at the transceiving system. At block 1922, a determination is made regarding an expected power of the reference signal to be received at wireless transmission facilities a known distance ($R_2$) from the transceiving system 1975. In one aspect of the invention, an expected received power may be determined without regard to the positions of the reference signal transmitter 1972 and the transceiving system 1975. That is, an expected received power may be determined a known distance ($R_2$) about the transceiving system 1975 based solely on the received power at the transceiving system 1975 and, thus, the expected received power at point A is the same as that received at point B. In another aspect of the invention, a position of the reference signal transmitter 1972 may be determined or provided to the transceiving system 1975. For example, a direction of the reference signal transmitter 1972 may be determined, using directional receiving antennas (or multiple receiving antennas separated by a known angular measure, such as four antenna spatially oriented 90 degrees to each other, such that the 3 dB antenna gain points intersect at 45 degrees from the antenna maximum gain) at the transceiving system 1975, and a position relative to the transceiving system 1975 may be determined based on the determined direction and estimated distance ($D_0$). In another aspect, a direction of the reference signal transmitter 1972 may be determined using a received signal strength of the reference signal on at least one receiving antenna. In another aspect, the position or location of the reference signal transmitter 1972 may be known and, thus, available to the transceiving system 1975. For example, the position of the transmitter 1972 may be known through a mapping of such transmitters and/or the location is known based on conventional surveying methods or from a global positioning satellite system (GPS). With the position of the reference signal transmitter 1972 known, the expected power of the reference signal may then be determined more accurately. For example, the expected received power of the reference signal a known distance from the transceiving system 1975 in line with, and between, the transmitter 1972 and the transceiving system 1975 is greater than the expected received power of the reference signal a known distance from the transceiving system in line with but on an opposite side of the transceiving system 1975.

With reference to FIG. 19B, the received signal strength at wireless transmission facility 1980 is greater than that of wireless transmission facility 1990. The expected received power may be determined continuously along the known distance (R2) about the transceiving system 1975 or may be determined at designated angles about the transceiving system 1975 (e.g., every 10 degrees). Interpolation between two designated angles may be used to determine an expected received power at an intermediate point. At block 1930, a signal is transmitted from the transceiving system 1975 within a general area, as represented by $R_2$. The area may include wireless transmission facilities 1980, 1985, 1990, capable of receiving the reference signal and wireless transmission facility 1995 that may not be capable of receiving the reference signal. In one aspect, the signal may be transmitted in an omni-directional manner wherein the general area represents an area circling the transceiving system 1975, assuming the system and corresponding antenna(s) are co-located. In another aspect of the invention, the signal may be transmitted in a directional manner wherein the general area represents a pie-shape area, 1997, 1998, having an apex at the transceiving system 1975 (a sector); assuming the antenna(s) and the system 1975 are co-located. The angular spread of the pie-shared area $\alpha_1$, $\alpha_2$ may be determined based on the directivity of the transmitting antenna. The signal transmitted by the transceiving system 1975, which is similar in at least one characteristic of the reference signal, is transmitted with sufficient power to interfere with communications between the reference signal and wireless transmission facilities within an area in which wireless transmission facilities may receive the reference signal. The transmitted signal may be a continuous wave type signal (i.e., a jamming signal) or may be a discrete signal that commands the wireless transmission facilities to reestablish communication with the reference signal transmitter 1972. At block 1940, a simulated reference signal, which is similar in at least one characteristic of the reference signal, is transmitted by the transceiving system 1975. The simulated reference signal is transmitted at a power level such that the received power of the simulated reference signal at the known distance ($R_2$) from the transceiving system 1975 is greater than the received power of the reference signal. At block 1952, signal(s) received by the transceiving system 1975 from wireless transmission facilities 1980, 1985, 1990, 1995 in response to the interfering signal are analyzed and processed.

In one aspect of the invention, a distance $D_1'$, $D_2'$, $D_3'$, to each of the wireless transmission facilities 1980, 1985, 1990, respectively may be estimated based on a received power, at block 1962. In another aspect of the invention, a direction of the wireless transmission facilities may be determined using, for example, directional antennas and/or an amplitude-based angle of arrival method. In one aspect of the invention, the signals received by the transceiving system 1975 may be analyzed to determine if they are allowed to send and/or receive communication as previously disclosed at block 1973. As discussed previously, allowability may be determined based on a known set of wireless transmission facility characteristics that are allowed within an area. All others are not allowed and, thus, communication is prohibited. If the signals are determined to be allowable, then control of the signal is "handed-off" to the reference signal transmitter 1972. Otherwise, the received signals may be further processed.

In one aspect of the invention, allowability of a wireless transmission facility may be determined based on a position of the wireless transmission facility with respect to the transceiving system 1975. For example, if the wireless transmission facility is determined to be within a predetermined distance, $R_3$, from the transceiving system 1975, then communication to and from the wireless transmission facility may not be allowed, even though the transmission would normally be allowed. In one aspect, the area defined by $R_3$ may be limited using directional information of the received signal associated with the wireless facility and the transceiving system 1975. Thus, if the transceiving system 1975 is moving towards the wireless transmission facility, then communication may not be allowed, while communication may be allowed if the transceiving system 1975 is moving away from the wireless transmission facility, even though the wireless transmission facility is within the area defined by $R_3$. In another aspect of the invention, transceiving system 1975 may attempt to determine other wireless transmission facilities within a region, $R_4$, attempting to communicate with the not-allowed transmission facility.

Figure 20A:
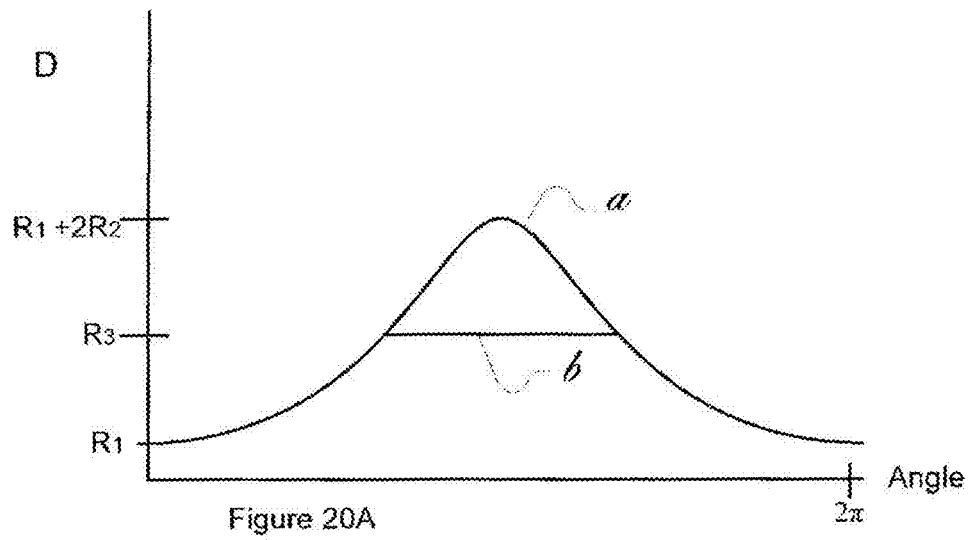
FIGS. 20A and 20B illustrates exemplary distance and power graphs associated with the network configuration shown in FIG. 19B.

FIG. 20A illustrates a graph of exemplary distances between the operating ranges of base stations 1975 and device 1972 as a function of angle, wherein the angle is normalized with respect to a line between base station 1975 and device 1972. Thus, a minimum distance between base station 1975 and device 1972 is represented as R1, at an angle of zero degrees between base station 1975 and device 1972 and extends to a maximum distance of R1+2R2, at an angle of 180 degrees (see curve a).

However, as the operating range of device 1972 exceeds the operating range of base station 112 at 180 degrees, the distance may thus be represented as R3 (see curve b).

Thus, as the angle between base station 1975 and device 1972 increases, the distance between base station 1975 and device 1972, at distance R2 from device 1972, increases and becomes limited to a distance of R3 for an angular period around 180 degrees. The distance then decreases to R1_as the angle increases.

Figure 20B:
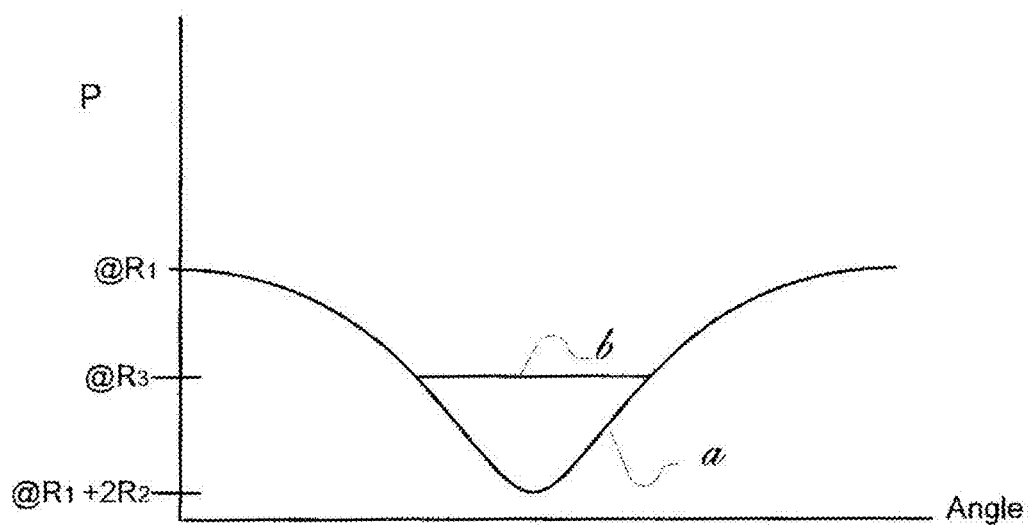

FIG. 20B illustrates an exemplary power received at the operating range R2 of device 152. In this case, the power received by a wireless device is a maximum at distance R1 and is a minimum at distance R1+2R2. (see curve a). However, as the distance R1+2R2 exceeds the operating range of base station 112, the power at distance R3 is limited to the power at the edge of the operating range of base station 1975. (see curve b). Thus, to capture any devices within the local area of device 1972, device 1972 must transmit at a power between that received at R1 and that received at R3. Further the power transmitted varies as a function of the angle between base station 1975 and device 1972.

Figure 21:
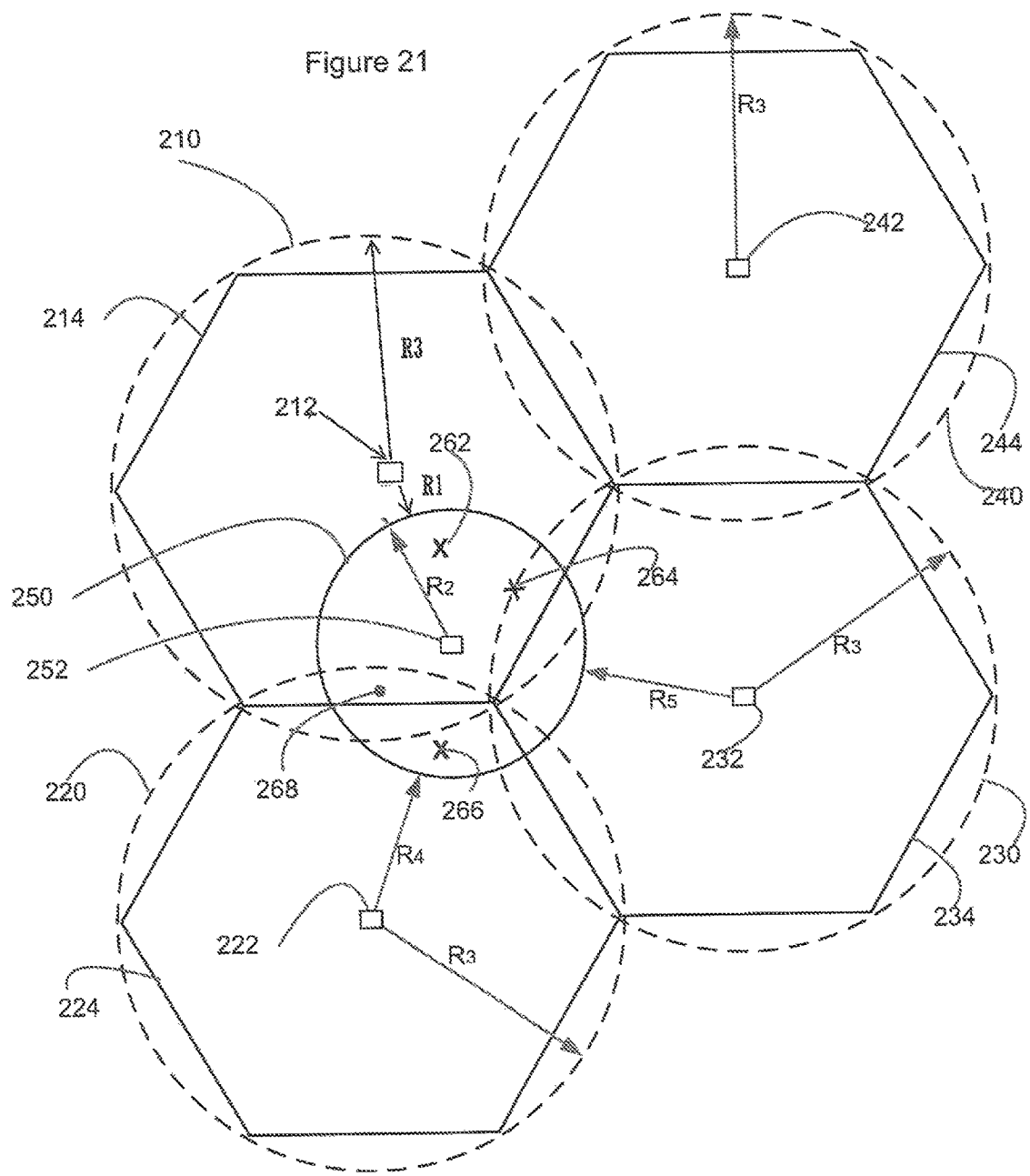
FIG. 21 illustrates a second example of an exemplary cellular network configuration.

FIG. 21 illustrates a second exemplary network configuration in accordance with the principles of the invention. In this exemplary configuration overlapping regions 210, 220, 230, 240 provide continuous coverage of one or more devices within their respective regions. In this case, each of the regions 210, 220, 230, 240 are represented as having a coverage area defined as R3 with respect to corresponding base stations 212, 222, 232, and 242. As illustrated, a hexagon represents each of the coverage areas 214, 224, 234 and 244. The hexagon representations are provided solely to illustrate the interlocking coverage of the overlapping coverage regions 210, 220, 230, 240.

Also illustrates is a transceiving station (device) 252, (which is equivalent to device 1972 of FIG. 19B). Also illustrated are wireless devices 262, 264, 266, and 268. Devices 262 and 268 are well within the coverage region of base station 212, while device 264 is within an overlapping zone between areas 210 and 230. Device 266 is outside the coverage area of base station 212 and within coverage of base station 222. Each of the wireless devices is within a local area represented by distance R2 centered on transceiving device 252.

Figure 22:
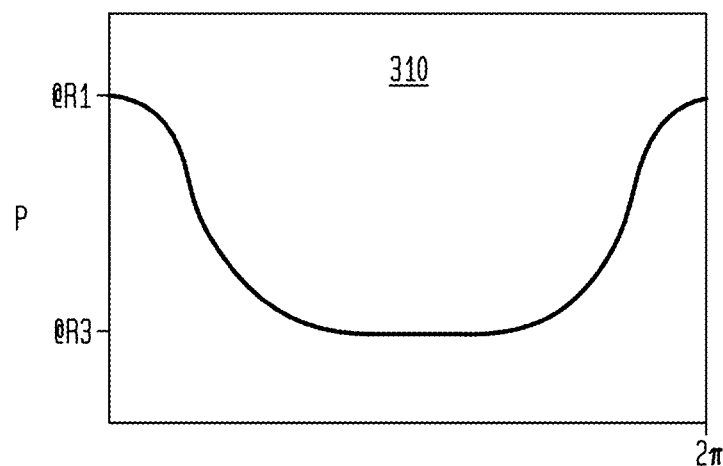
FIGS. 22, 23, and 24 illustrate exemplary power graphs associated with the network configuration shown in FIG. 21.
Figure 23:
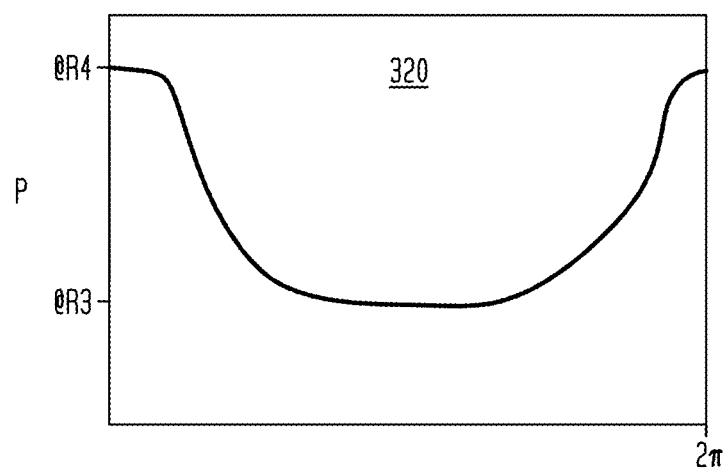
Figure 24:
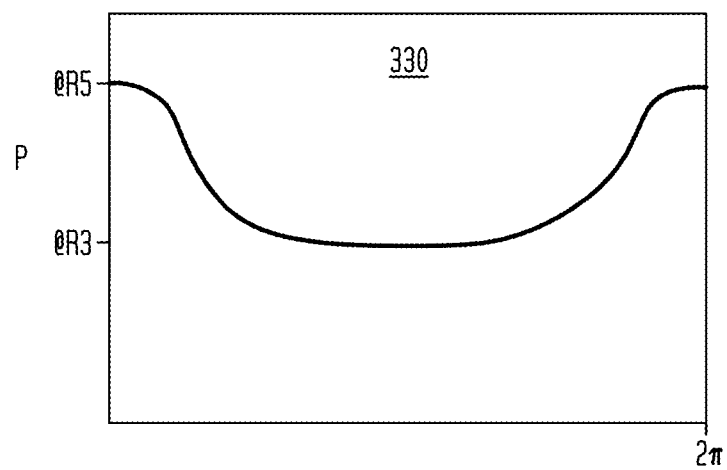

In addition, R1 represents the closest distance between base station 212 and transceiving system 252. R4 represents the closest distance between base station 222 and transceiving system 252 and R5 represents the closest distance between base station 232 and transceiving system 252. FIGS. 22-24 represent graphs of power at R2 for each of base stations 212, 222 and 232, respectively, in a manner similar to that shown in FIG. 20B. In this illustrated example, the power of each base station is assumed to be substantially equal so that the coverage areas, represented by R3, are substantially the same. However, it would be recognized that the power of each base station may be altered to provide greater or lesser coverage areas. In this case, the power received at R2 may be greater or lesser and is a function of the output transmission power and the distance (e.g., R1, R4 and R5, respectively).

In one aspect of the invention, the transceiving system 252 may select one of the base stations as a primary cell. The primary cell may be selected based on the base station being determined to be closest, in distance, to the transceiving device 252. The transceiving system 252 may normalize the received power based on distance and transmission power of each of the base stations. In addition, the transceiving system 252 may normalize the location of each of the base stations with respect to the location of the base station of the primary cell. That is, in the illustrated network configuration shown in FIG. 21, base station 212 may be selected as the primary cell and base stations 222 and 232 may be determined as angularly separated with respect to the line between the primary cell base station and the transceiving station 252. Thus, base station 232 is slightly greater than 90 degrees offset from the line between base station 212 and transceiving station 252. Similarly, base station 222 is slightly greater than 180 degrees offset from the line between base station 212 and transceiving station 252.

Figure 25:
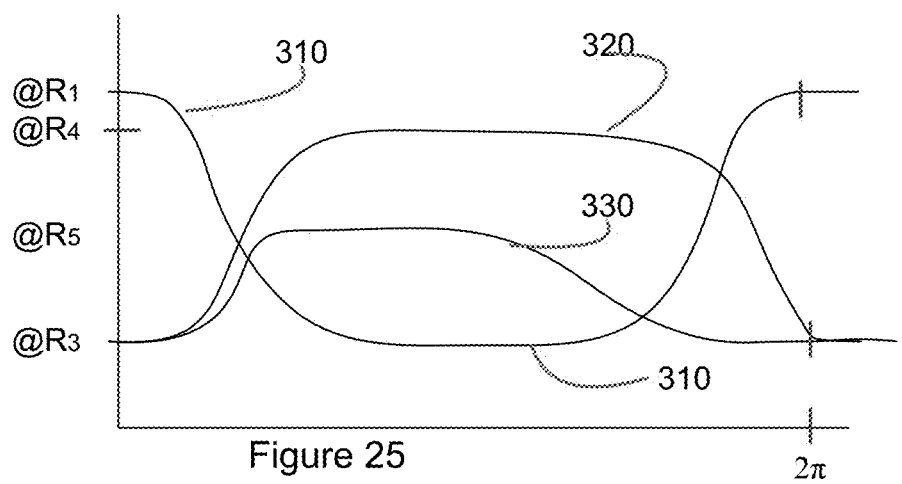
FIG. 25 illustrates a superposition of the graphs shown in FIGS. 22, 23, and 24.

Referring to FIG. 25, the received power at R2 may then represent offset based on the angular difference between the primary cell base station and the other base stations.

Figure 26:
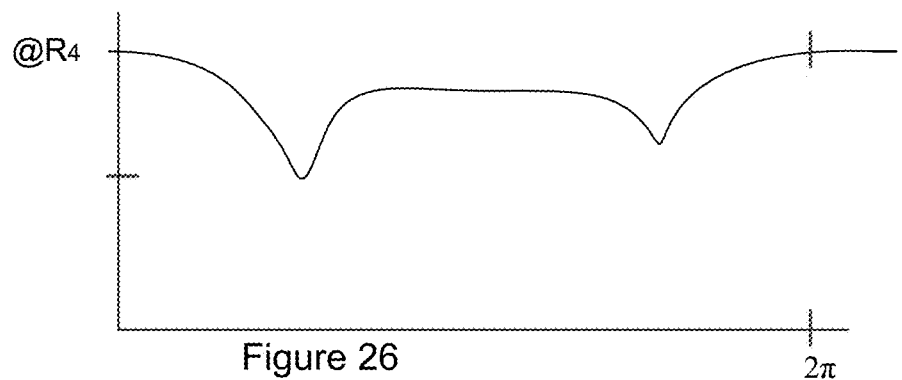
FIG. 26 illustrates an exemplary power transmission in accordance with the principles of the invention.

FIG. 26, which represents a superposition of the powers of the three power curves, and further illustrates the power to be transmitted by transceiving station 252, as a function of an angle around the transceiver to maintain control of each of the wireless devices within a local area 250. As would be understood, the illustrated power is taken with respect to a known angle about the transceiving system (device) 1975.

Figure 27:
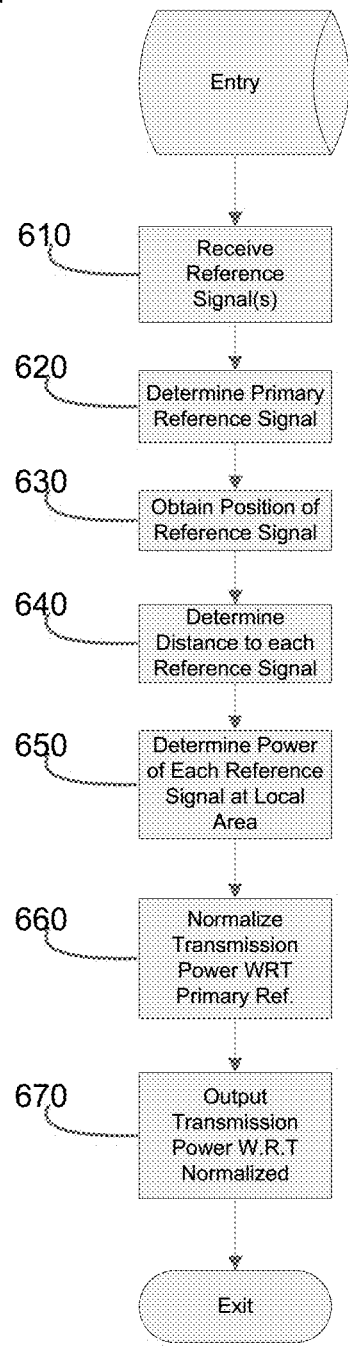
FIG. 27 illustrates a flow chart of an exemplary process for determining power transmission in accordance with the principles of the invention.

FIG. 27 illustrates a flow chart of an exemplary process in accordance with the principles of the invention. In this illustrated process, transceiving system 252 receives the reference signal of each of a plurality of base stations. Although transceiving system 252 is outside the coverage area of base station 222, transceiving system 252 is still able to receive the reference signal from base station 222 but does not communicate with this base station.

At block 620 a determination is made regarding the primary cell based on the received power of the reference signals. At block 630, a position of each of the sources (base stations) of each of the reference signals may be obtained or determined. For example, a base station position may be determined based on a received power and an angle of arrival of the received signal. Or the base station position may be provided using Global Positioning Satellite system information. Or the base station position may be preloaded within general area.

At block 640 a distance is determined to each reference signal based on the position of the source of the reference signal. At block 650, an expected received power from each of the base stations is determined along a radius defining the local area with respect to transceiving system 252. A graph of received power from each of the base stations along the local area is determined. At block 660, positions of the base stations are normalized, angularly, with respect to a line between the primary cell base station and the transceiving system 252 and the receiving power graphs are oriented with respect to the primary cell base station. A resultant power graph is determined based on the superposition of received power graphs and at block 670, the transceiving system outputs a power level slightly greater than the resultant power at a corresponding angle.

In one embodiment of the invention a repeat Jamming Module, provides repeat jamming capability and =jams specifically a targeted cell phones and/or wireless communication device. This repeat jamming techniques utilizes the outgoing signal of the cell phone and repeats the transmission 100 ns after the initial signal with matching power. The effect of the overlapping communication on the receiving transceiver provides a confusion in the receiving transceiver and makes communication impossible and the call and/or wireless communication is dropped. In one embodiment of the invention the jamming module include a duel repeating circuit which a programmable delay line built in to allow the same communication to be delayed by the programmed delay amount. In another embodiment of the invention the repeat jammers are placed in each section of the facility. When the signal detection array detects an unauthorized cell phone the repeat jammer takes that cell phone and only that cell phone off line. When the phone tries to acquire the tower the cell phone's identification is re-verified.

In one embodiment of the invention, a Base Station Controlling Module, which identifies and controls cell phones interfaces with Cell Phone Detection system to determine authorized and unauthorized phones, provides phone type, the time of arrival and the cell phones frequency and seamlessly provides backhaul and Denial of Service (DoS) capabilities. The Base Station Controlling Module, which identifies and/or controls cell phones, interfaces with Cell phone detection system to determine whether a cell phone is an authorized or unauthorized cell phone, the cell phone detection system provides phone type, the time of arrival and the cell phones frequency to the base station unit, the base station unit matches the cell phone detected signal with the base station controlled and/or required cell phones and verifies the cell phone of interest is within the unauthorized areas. It also verifies in one embodiment of the invention whether the cell phone is an authorized cell phone for use within the facility, wherein the data matrix determines authorized vs. unauthorized cell phone and authorized area vs. unauthorized areas and, seamlessly interfaces either providing backhaul and/or DoS capabilities.

In one aspect of the invention, a cell phone identification module which identifies cell phone identifications (IDs), determines whether an authorized or unauthorized phone exists, and provides the phone type, the time of arrival and the cell phones frequency and seamlessly interfaces with the repeater jammer module, to disable the unauthorized phone in either the unauthorized area and/or an unauthorized phone in any area of interest. The repeat jamming unit jams all unauthorized cell phones within the facility and allows authorized cell phones.

In one embodiment of the invention, the signal detection sensors are placed throughout the facility to provide full coverage of the facility. Any cell phone within the facility will be detected and displayed on the centralized console interface. This information will be sent to the software radio Identification module to verify if this is an authorized or unauthorized cell phone. If the cell phone is unauthorized the repeat Jammer module will disable the cell phone or the Software Radio Identification Module will deny service. The software radio identification module is designed to receive a signal being transmitted from a cell phone and decode the IMEI number. The IMEI number is compared against a database of authorized IMEI authorized cell phones. In one aspect of the invention, to prevent cell phone from entering a facility undetected, Low Noise Jammers will be installed at all egress (entrance) points within the facility. So that all cell phones coming into the facility are verified by the Software Radio Identification Module. An ancillary benefit is anyone mistakenly or unknowingly bringing a cell phone into the facility will be picked-up at the entrance point. In another embodiment, the Software Radio Identification Module (SRIM) identifies all cell phone within the coverage area. Any cell phone that is in an on state within the coverage area (area in light blue) will be Identified. The International Mobile Equipment Identity number or IMEI (Cell phone ID) will be compared with the facility's "authorized cell phone list". An authorized cell phone is allowed to make and receive calls. All unauthorized cell phones are prevented from making or receiving incoming and outgoing calls. The software radio Identification module can be expanded to provide cell phone call monitoring.

In one aspect of the invention, the base station acquires new cell phone, the base station provides, time code, band, and type to the cell phone detection sensor array. The cell phone detection sensor array determines whether the cell phone is within exclusion zone, if the cell phone detected outside "Cell phone control area", then the cell phones released back to Network Cell Tower and/or the calls are allowed where the Cell Phone is backhauled to the network. If the cell phone is found within the "control area", and the base station determines whether cell phone is an "Authorized Cell Phone" (VIA HLR Database interface), the console displays a location of the cell phone, the (IMEI), and "Authorized cell phone status". Alternatively, if the cell phone is determined to be an "Unauthorized Cell Phone" (VIA HLR Database interface) the base station prevents incoming and outgoing calls and the console displays the IMEI, the cell phone and "Unauthorized phone status." Or the Repeat Jammer Module jams the cell phone signal and the console displays the IMEI, the cell phone location and "Unauthorized phone status", depending on the system configuration. In another embodiment, the base station identifies all cell phones within the coverage area. Any cell phone on within the coverage area (area in light blue) will be identified. The International Mobile Equipment Identity number or IMEI (Cell phone ID) will be compared with the facility's "authorized cell phone list". Authorized cell phones allowed making and receiving calls. All unauthorized cell phones are prevented from making or receiving incoming and outgoing calls. The base station module can also be expanded to provide cell phone call monitoring.

In another embodiment the signal detection sensor array is used to provide Real-time tracking of inmates utilizing the BINJ Signal Sensor Array with wristband tracking technology on each inmate. (See patent application Ser. No. 12/231, 437). The system is expanded to include a Staff Safety Alert & Tracking System (SSAT) utilizing the Signal Sensor array with built-in real-time wristband and/or security tags for the tracking of correction officers. In this embodiment of the system, the system, reports real-time time and position of every inmate and officer in the facility. The database collects every movement of a wristband up to 1000 times per second and provides this data into a data mining and historical playback capability. In another embodiment of the system the wristband has a signal detection module which detects a cell phone within a specific area and the wrist band determines the user of the cell phone and reports the information back to the console. Some of the advantages in tracking Officer and Inmates include: increased Staff Safety; inmate escape prevention tool; inmate and staff out of position tool; continuous and accurate count of inmates; group/gangs interaction monitoring; accurate work scheduling and monitoring tool; on post/off post position of all security personnel; escape alarm; last known position; immediate alarm and the like. The data mining capabilities enable the data base and data mining to; accurately location of inmates in relationship to other inmate/staff at all times and ability to accurately, investigate assault/rape and assist in prosecution tool; and ability to physically contact detection system for incident/rape investigation and prevention tool; inmate tracking/data mining which provides for the identification of predators and predatory behaviors, create exclusion zones and alerting system to notify security of a boundary violation; inmate tracking and data mining: for assessing staff and inmates' vulnerabilities; provides for decreased agency liability by providing accurate forensic information for court; the system also provides for audio and alarm capability (incident/rape prevention tool).

In another embodiment of the invention, the Cell Phone Detection system is integrated with a Base Station(s) Module, wherein this base station(s) may also have back haul capability wherein the system utilizes a Pico/Nano base station technology and cell phone detection system. The base station registers the cell phone(s) and has the cell phone detection system verify the location of cell phone. The allowability module determines whether the cell phone is authorized and/or unauthorized. The system verifies who the cell phone belongs to if known IMEI (via database). The base stations directed to the system to back-haul all authorized phones and display the authorized phones within the interested area, not display cell phones in non-interested areas. Then the base station(s) is directed to deny services to all non-registered/unauthorized within the restricted area and display these restricted phones and notify staff of their location and presence.

In another embodiment of the invention, the Cell Phone Detection system works in conjunction with an integrated Base Station Module without back haul capability in which the base station(s) register the phone and have the Cell Phone Detection system verify the location of cell phone. The allowability module determines whether the detected phone is inside the restricted area. The system verifies who the phone belongs to by a known IMEI (via database). The base station is directed to release authorized cell phones and cell phones which are not in the restricted areas back to the local tower and display the authorized phones within the interested area and not display phones in non-interested areas. The base station is directed to Hold onto unauthorized cell phones and displays the unauthorized phones. All non-registered cell phones will have Denial of Service (DoS), by being held onto by the base station unit and the like.

In another embodiment of the invention, the Cell Phone Detection and Identification Module in which the Cell Phone Detection system is the controlling unit. The system utilizes a sniffer and/or embedded IMEI decoders within each sensor and cell phone detection sensor determine the location and identification of all cell phones within a specific area. The signal detection sensors find and positively locate the phone. In a configuration in which each sensor does not possess a decoder IMEI module, the sensor provides the following information to the sniffer (TOA, frequency, type, and channel). The sniffer scans for the phone, and then reports back the identification information. The system verifies who the phone belongs to and whether the cell phone is authorized or not authorized. In a configuration in which each sensor has a decoder module, the system displaysgreen for authorized phone, red for unauthorized phones and the like. In another embodiment, the Sniffer module finds and positively identifies the cell phones. The sniffer provides information to the cell phone detection and location system (TOA, ID, frequency, type, channel . . . ). The cell phone detection and location system then scan for the cell phone, verifies who the phone belongs to and whether the cell phone is authorized and/or not authorized in that location. Then the systemdisplays green for authorized phone red for unauthorized phones and the like.

In one aspect of the invention, the Cell Phone Detection and Identification Module works in conjunction with 3rd party Telco Support. In this aspect the sniffer module (IMEI decoder and identified) positively identify the phones, gives information to the cell phone detection and location system (TOA, ID, frequency, type, channel . . . ). The Cell phone detection system scans and identifies a location of interested cell phone, verifies who the phone belongs and whether the cell phone is authorized and/or not authorized and displays green for authorized phone, red for unauthorized phones]. The system alerts the appropriate cell phone provider of an unauthorized call phone to have the cell phone provider deny service on the cell phone and has Staff confiscate cell phone and the like.

In another aspect of the invention, the Cell Phone Detection system works in conjunction with a repeat Jamming system and an Identification Module and/or embedded decoding module in which the sensors find and positively locate the phones In this case in which there is external identification of the IMEI, the system gives information to the sniffer (TOA, frequency, type, channel . . . ), scans for the phone and reports back the identification of the cell phone. The system compares the identification with the database of an authorized phone and verifies whether the phone belongs is authorized or not authorized user. The system displays green for authorized phone, and red for unauthorized phones. The facility may pick up that specific phone. The repeat jammer disrupts the specific phone with a set repeat delay to take the cell phone off line. Pinpoint jamming disrupts all phones within the channel and area A Broadband jammer disrupts all phones within area and frequency coverage and the like.

although not shown, it would be recognized that the receiving and/or the transmitting antennas and/or the processing systems may be co-located or may be geographically distributed. When a plurality of receiving antennas are employed and geographically distributed, it would be recognized that correlation of the information obtained from each antenna is necessary. In one aspect of the invention, a plurality of antennas having a known angular receiving pattern may be co-located, see FIG. 7, and remotely located from the processing system, to receive signals at substantially the same time. It would be recognized that when the antenna system is remotely located from the processing system, the areas shown in FIG. 19B are oriented with respect to the antenna system.

In another embodiment of the invention, the wristband as described in patent application Ser. No. 12/231,437, includes a signal detection module as described in FIG. 6 and/or alternatively in another embodiment, FIG. 11, the signal detection module detects cell phone signals, its use, and unique identifier information of the cell phone being used by the inmate. The wristband module may also include a voice recognition module. A Cell Phone Use, and Authorization Database module (CPU-ADM), interfaces with the cell phone detection system and the base station control system and controls when an inmate may make a phone call and/or receive a call. This module holds the allowed or dis-allowed (unauthorized) cell phone information for each inmate, what cell phone(s) he is allowed to use, the areas and times in which an inmate may use his cell phone, the authorized places and phone numbers which the inmate may call and/or receive phone call from. The CPU-ADM system in cooperation with the base station unit and cell phone detection units inputs, controls and monitor how long an inmate may stay on the phone, the cost incurred for each phone call, records the inmates conversations, correlated voice pattern with each inmate to insure each is the inmate is prescribed to use the cell phone, and that one inmate is not talking on another inmate's cell phone; correlates voice pattern of all calls made by the inmate and their recipient(s). The CPU-ADM system analyzes all calls received and all calls made in conjunction with all person(s) contacted and analyzes for threat group, and security concerns and trends. The system monitors threat alerts analysis and on keys words. The CPU-ADM system interfaces with the canteen/inmate trust fund to debit inmate's account for each call made. The CPU-ADM system interface allows for inmates to input their desired call numbers, system allows for security personnel monitoring.

Figure 28:
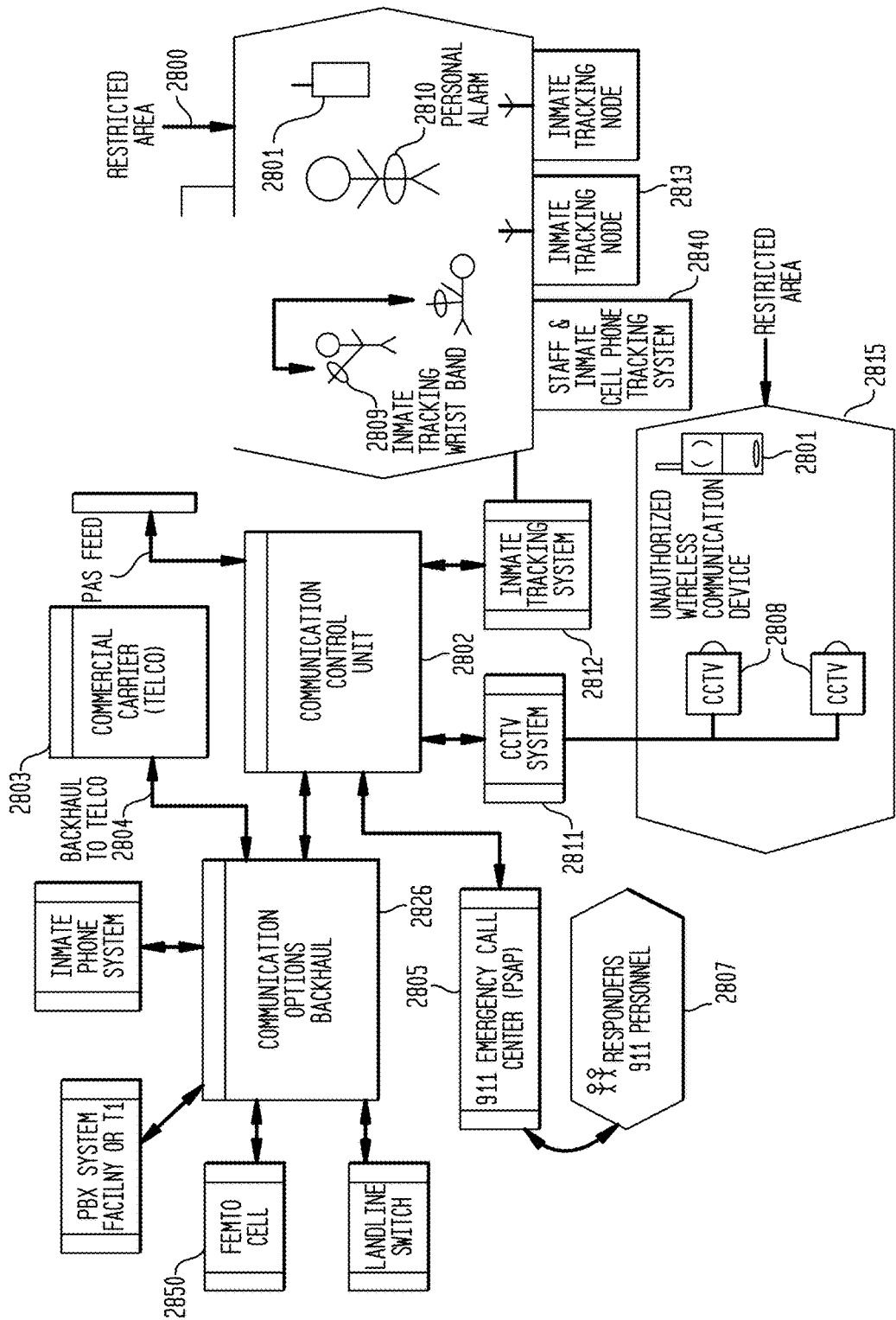
FIG. 28 illustrates an exemplary process and options for controlling wireless transmission within an area in accordance with the principles of the invention.

FIG. 28 illustrates one embodiment of the invention, where a restricted cell phone (2801) is being controlled by a communication control unit (2802) when a wireless communications device (2801) is detected within a restricted area (2800), and this phone tries to make a 911 call. There are several ways to make this possible and to insure security and restriction on the use of that cell phone. The first embodiment of the invention is to backhaul (2806) the call to a 911 emergency response staff (2807) specifically designed to handle this restricted coverage area (2800). This methodology will provide for quicker response and the personnel (2807) handling the call center will be specially trained to respond to the emergency and this will eliminate wasting personnel outside the restricted area to respond to someone trying to defeat the "no cell phone security system." Additionally, the law enforcement personnel within the jurisdiction of the secure facility responding to the 911 call may monitor the situation and record the call and provide a quicker response. To assist in the response, integrating the communication control unit with the CCTV system (2811), officer alarm system (2814) and inmate tracking system (2812) will provide the responding personnel the ability to see who is making the call, which inmate(s) (2809)(2815) and/or staff (2810) are around the caller. To accomplish the connection to the 911 call center (2805), the backhaul can be accomplished through a wire line connection (2806) to the emergency call center. However, there are other methods of backhauling discussed in the patent that are also applicable. This same methodology can be used when transmitting authorized calls.

Figure 28A:
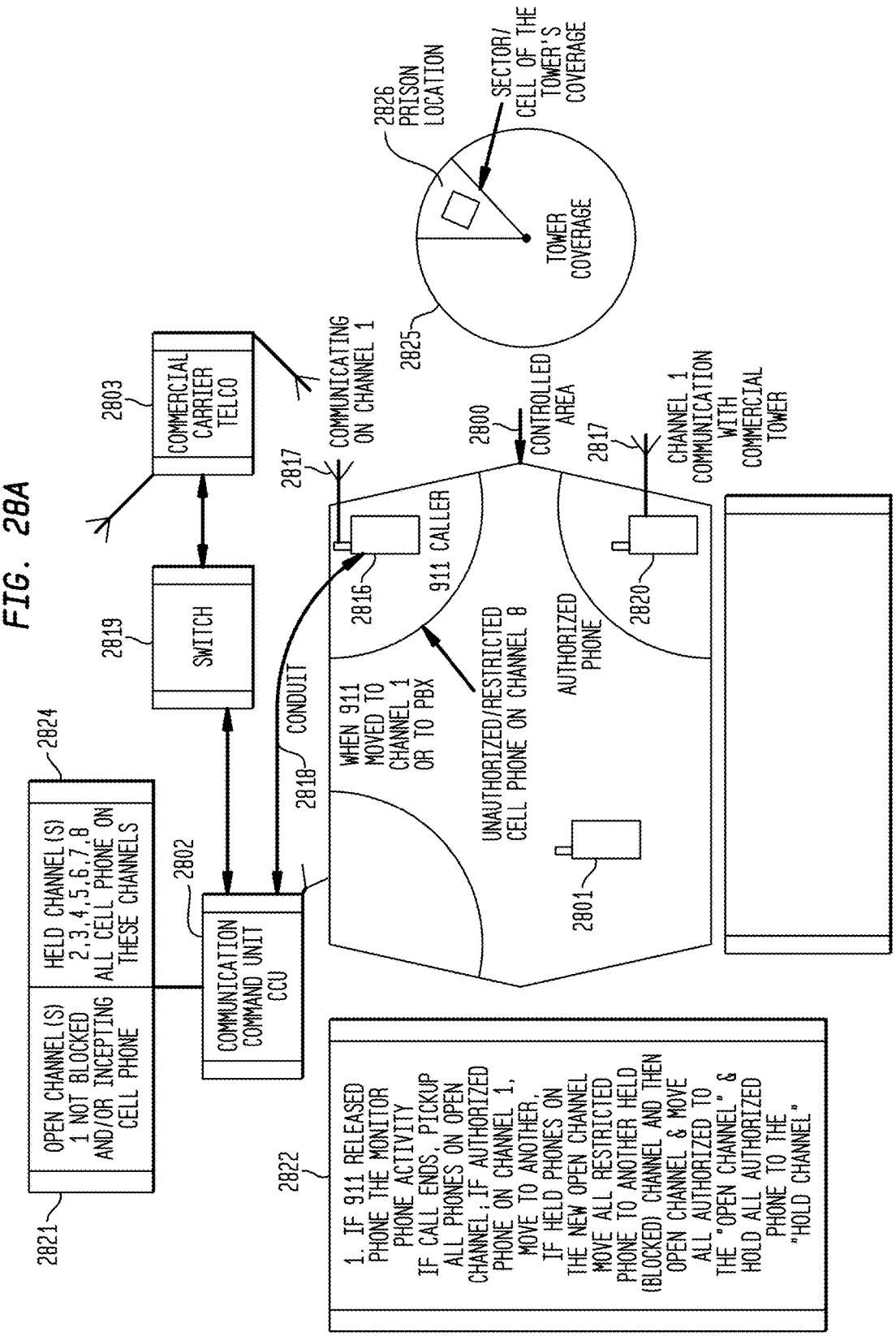
FIG. 28A illustrates an alternative exemplary process and options for controlling wireless transmission within an area in accordance with the principles of the invention.

FIG. 28A illustrates the second methodology to allow the 911 call to be released to the commercial carrier. This can happen through several methodologies. Several processes however need to be in place, to insure the inmate does not use the 911 call to get around the "no call phone restriction system". In this embodiment of the invention, the call connection needs to be seamlessly released to the carrier, to provide a quick response to 911 authorities. However where the initial goal is to prevent unauthorized calls, it is important that the commercial control unit (2802) has control of the "911 released" wireless communication device (2816), after the caller ends their 911 call. There is an opportunity for the caller to the place another call through the commercial carrier. One methodology is to monitor the call and to verify it is still connected to the 911 system. Once the call is disconnected from the 911 system, the communication control unit sweeps the channels of the commercial provider to which channel the phone was transferred to.

In this embodiment, a communication control unit (2802), is a transceiver communications system which communicates with a wireless communication device, such as a base station system, an access point, including such devices as a wireless access point, a femtocell, a picocell, a microcell and the like.

In this embodiment, illustrated on FIG. 28A, the communication control unit (2802) connects to all wireless communication devices (2801) within the restricted zone (2800). The communication control unit (2802) connects the cell phone (2801) through a common switch (2819) and/or Telco Switch with the commercial carrier (2803) and does a hand off with the commercial carrier (2803) as a commercial carrier would hand off a call from one tower to another tower, as when a caller is driving and talking on the phone. FIG. 28A also illustrates another embodiment in which the communication control unit (2802) first switches the channel of the phone from a blocked channel (in this example, channel 8) to an open carrier channel (in this example channel 1), then the communication control unit (2802) transfers the phone (2801) off the communication control unit's channel 8. This can be accomplished by disconnecting the cell phone from the communication control unit. The 911 calling cell phone (2816) will try to reconnect the communication control unit (2802) first because it is a higher power level, (the communication control unit (2802) has the option to lower its power to eliminate this from occurring), the communication control unit (2802) will not accept the reacquiring phone (2816) and the cell phone will go to the next closest accepting tower, in this case a commercial carrier (2803). The communication control unit may lower its power for a predetermined period of time so that the cell phone may acquire the closest accepting tower and then return its power level to a power greater than the accepting tower so as to capture any other cell phones attempting to connect to the accepting tower. The cell phone attached to the accepting tower remains connected to the accepting tower even through the power from the communication control unit is greater than that of the accepting tower.

In another embodiment the communication control unit (2802), controls channels 2-8 (2821) and does not control channel 1, all cell phones who come up on channel 1 will attach to the closest commercial carrier (2803). The communication control unit (2802) switches the channel of the cell phone (2820) from a blocked channel to the open carrier channel (2817), the cell phone will only find the carrier channel (2817).

FIG. 28A further illustrates the embodiment in which the communication control unit (2802), Channel Sweep Software Program (2822) initiates a protocol to capture and/or re-capture the phone (2816) which is on the open commercial channel (2817). This program can run periodically, and/or is initiated by a signal detection unit and/or the communication control unit and the like, which monitors the open channel (2817) specifically looking to recapture the 911 caller's cell phone and/or unknown cell phone(s) (2801). This methodology prevents the 911 transferred cell phone (2816) and/or an unauthorized cell phone(s) from making additional calls, send texts and the like. This methodology also picks up cell phones within the restricted area (2800) which are on an open commercial channel (2817). The Channel Sweep Software Program (2822) monitors the phone activity on 2817. In an embodiment of the invention, if authorized phone(s) are currently using channel 1, the Channel Sweep Software Program moves the authorized phone(s) to another Telco Channel, (now the new "open Channel (2821)" and moves the unauthorized cell found to "hold channel" (2824).

FIG. 28A furthers illustrates that there is a set of protocols (2823) between the communication control system (2802) and the commercial carrier (2803) and the like. When a 911 call is finished, the commercial carrier (2803) will change the channel (2817) of the 911 caller (2816) from the open channel (2817) to a held channel (2824). The commercial carrier (2803) will terminate the connection (2817) to the 911 caller (2816) and the caller will then re-attach to the communication control unit (2802) on a held channel (2824).

In another embodiment the protocol (2823) setup between the commercial carrier and the communication control unit will have a timed program running and the commercial carrier (2803) will terminate the connection(s) to all cell phones in the commercial carrier cell sector (2826) of the restricted area. A variation of this embodiment, commercial carrier (2803) will change all phones in standby to a communication control system's (2802) held channel (2824).

In another embodiment the communication control unit system (2802) analyzes the current configuration of the commercial carrier and chooses a new "to be opened" channel which is used by the commercial carrier (2803), if that new channel is currently being used by the communication control unit (2802) as a "captured and hold channel" (2824) the communication control unit (2802) will move all "captured and held" cell phone(s) on that channel to another "captured and hold channel". Once the new channel is established, the communication control unit system will close the open channel (2817) used by the 911 caller, and all other phones, will be acquired and held by the communication control unit (2802), the communication control unit will then determine which of these phones are "authorized" and which phone are "unauthorized". All authorized phone will be switched to the new "Open "authorized" Channel, all unauthorized phone(s) including the 911 called will be switched to a "captured and hold channel" (2824).

This methodology can also be used to find "unauthorized" phones which turn-on in the current Open "authorized" Channel. For example, the communication control unit releases an authorized phone to an open specific channel to allow authorized cell phones to make and receive calls, (this is in a configuration in which the facility allows specific authorized cell phone(s) in a restricted area), the authorized phone is in standby on a commercial channel, an inmate turns on an unauthorized phone, the channel happens to be the Open "authorized" channel, therefore the inmate gets the ability to make a call on the open channel. The control system is interested in capturing the "new unauthorized cell phone" on the Open "authorized" channel. The method described previously can be implemented on a set schedule, or when a phone is detected in the restricted area and/or when the communication control system fails to capture.

In this embodiment the communication control system (2802) and/or a signal detection unit passively listens to the Open "authorized" channel looking for a connection by a cell phone originating from the restricted/controlled area.

In an alternative embodiment, the commercial carrier (2803) can change the channel of the 911 caller to one of the communication control unit's capture channels (2824) and then terminate the connection to the 911 caller. The cell phone will try to reacquire the commercial carrier (2803), however the communication control unit's (2802) signal power level is set to attract the 911 caller and the communication control unit (2802) will take control and then move the "911 cell phone to a "captured and hold channel".

In an embodiment of the invention, where the user wants to continuously control and monitor all authorized call actions including a 911 call either by an authorized and/or unauthorized caller and may choose not to allow an Open "authorized" Channel, the communication control unit (2802) may connect a 911 call and/or an authorized call via a wireless communication protocol (802.xx,), an IP backhaul, a VOIP backhaul, and/or utilizing a Femtocell and/or Pico base station communications portal backhaul, (IP protocol connection), internet and the like (2826) via to the commercial provider (2803) and/or the Telco switch (2819), or in a situation in which the secure facility has a telecommunication system designed to handle landlines, the call can be routed to the landline system such as an inmate phone system and/or a PBX system. In this embodiment, the communication control unit (2802) still maintains control of the cell phone and its functionality.

Figure 29:
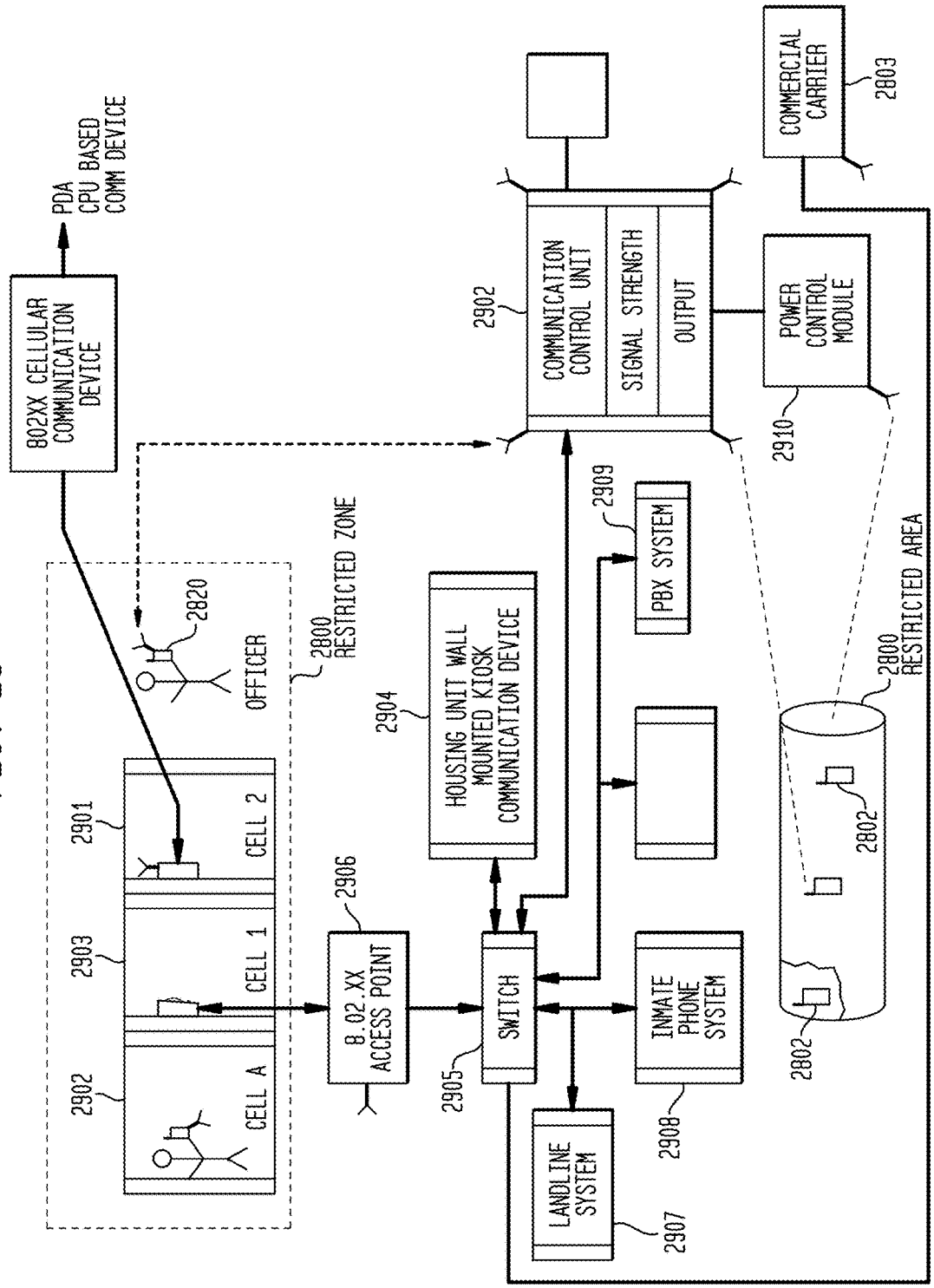
FIG. 29 illustrates an exemplary methodology of allowing communications via a wireless communication device within a controlled area and options for controlling wireless transmission within the area in accordance with the principles of the invention.

FIG. 29 illustrates an embodiment of the invention where it is important to allow an inmate(s) to communicate with their family and friends in a secure, safe and monitored manner, all of the inmate(s) can use any of the above communication portals and utilize cell phone (2802) and/or utilize 802 protocol communication devices (2901) and be routed to any of the above mentioned communication systems. The 802.xx communication devices can be mounted on a wall (2904) or in the inmate's cell area (2901). For inmates in segregation units, where calling is restricted, the calling can be done through a two way intercom system (2903), cell phone (2820) or hand set (2902) to a switch (2905) then to the landline system (2907) and/or any of the above, and or through an inmate phone system (2908) and/or a PBX system (2909) and the like. These connections can work directly through a CCU (2902). In an embodiment of the system, in which an authorized phone is being connected to the commercial carrier (2803), there are several methodologies. In one embodiment as discussed in FIG. 28, the authorized cell is detected and connected to the communication control unit (CCU) (2802), the CCU, verifies the cell phone is authorized, then the CCU directs the cell phone to the channel of the Femtocell, (2850), wherein the Femtocell then verifies the authorized cell phone is also on its authorized list. In an embodiment of the invention, the CCU (2802) sends the authorized information to the Femtocell (2850), as the cell phone is being directed to the Femtocell, this way each authorized phone information is simultaneously sent to the Femtocell. In another embodiment of the system, as shown in FIG. 29A, when the CCU (2902) detects an authorized cell phone (2802), the CCU (2902) instructs the Power Control Module (2910) to lower the power of the control channel signal for the channel which the authorized cell phone (2802) is being sent to make an authorized call. The power is lowered for a set period of time to allow the authorized cell phone to attach to the Telco (telephone service provider). The CCU then raises the control channel signal above the Macro signal of the Telco so as to acquire all cell phones that may be initiating a call. In a preferred embodiment, the CCU lowers the power of the control channel for a predetermined period of time. In one embodiment of the system the power raising and lowering methodology can be performed in the radio head. In another embodiment, the methodology is accomplished by a programmable adjustable gain circuit, depending on the power of the Macro signal provided by the Telco, wherein the power up and power down cycle is adjusted to accommodate the Telconetwork characteristics. In an embodiment the communication control unit (2802) can be used as a monitoring, scheduling, routing and control for inmate communications with family and friends.

In an embodiment of the invention, when the cell phone inside the restricted area (2800) is controlled by the communication control unit CCU, the CCU holds on the cell phone continuously as long as the phone is in the restricted area. In an embodiment of the invention, to maintain complete control of a restricted and authorized phone, a direct communication bridge is created between the communication control unit and the commercial Telco (3001). The embodiment of the invention, whether the cell phone is authorized and/or unauthorized, is to control the cell phone, its functionality, abilities, capabilities and features of the cell phone(s) while allowing the cell phone to make and/or receive a call and/or restricting the cell phone by not allowing calls or limiting the ability of the call allowed to be made. The communication bridge maybe cellular, wire line, microwave, wireless, switch sets and the like. In an embodiment, the CCU sends an update to the controlled phone and modifies its ability to send and receive email, by disabling its ability to send and receive data packets. In an embodiment of the invention, the CCU modifies the cell phone MIN/IMSI, thereby, if the cell phone finds an opening in the restricted zone, it cannot establish a connection to the Macro (Telco), and the like. Through the methodologies described, the cell phone in the restricted area can send and receive calls, only if the cell phone is determined to be authorized to send and receive such calls.

Figure 30:
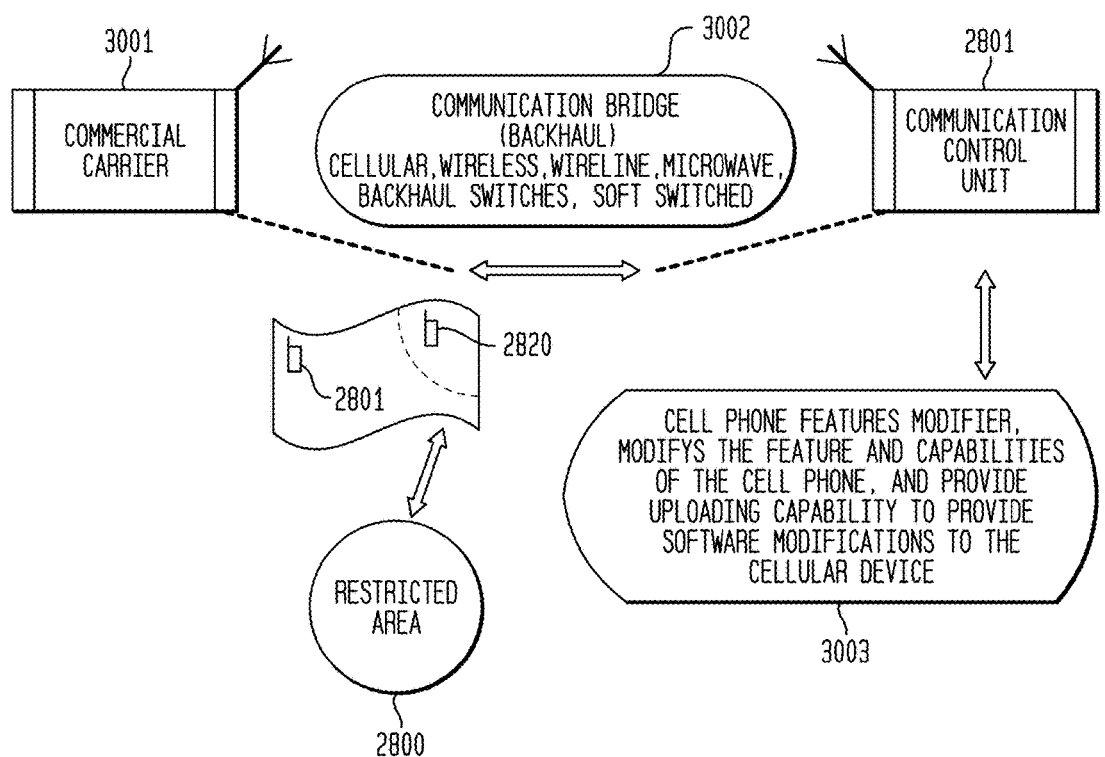
FIG. 30 illustrates an alternative exemplary methodology for communicating when controlling wireless transmission within an area in accordance with the principles of the invention.

FIG. 30 illustrates a further preferred embodiment where the communication control unit (2802) restricts the capabilities of restricted area cell phone(s) (2801, 2820) by changing and/or modifying the feature and capabilities of the cell phone, and/or uploading software modifications (3003) to the cell phone(s) (2801, 2820) to change their feature and capabilities. Another methodology is to disable the features of the controlled wireless communication device (2801), by reprogramming the capabilities and functionality of the cell phones and limit their ability to communicate (3003). The communication control unit provides limited conductivity and prevents any alternative communications methodology; these functions will be disabled in the communication control unit (2801) by the system software when it establishes the connection to connect the 911 call and/or alternately by the commercial Telco (3001) when it receives a 911 call via the communication protocol. This solution can also be implemented in regard to authorized phones (2820) to limit their capability within a restricted area (2800).

FIG. 30 illustrates an embodiment wherein a direct communication bridge (3002) can be in the form of a cellular connection, wireless conduit, or wire line connections, switch set, straight backhaul to the switch and the like. When the 911 call is initiated by the unauthorized phone (2801) (or unauthorized or restricted communications device and the like), the communication control unit connects the controlled wireless communication device to the communications bridge (3002) so the call goes through and the communication control unit (2801) can monitor the call, if necessary, and also any attempt by the controlled wireless communication device (2801) to defeat the system, such as dialing a second number or executing an email, accessing the web, IP chat, and the like. The communication control unit (2802) can prevent such actions.

Figure 31:
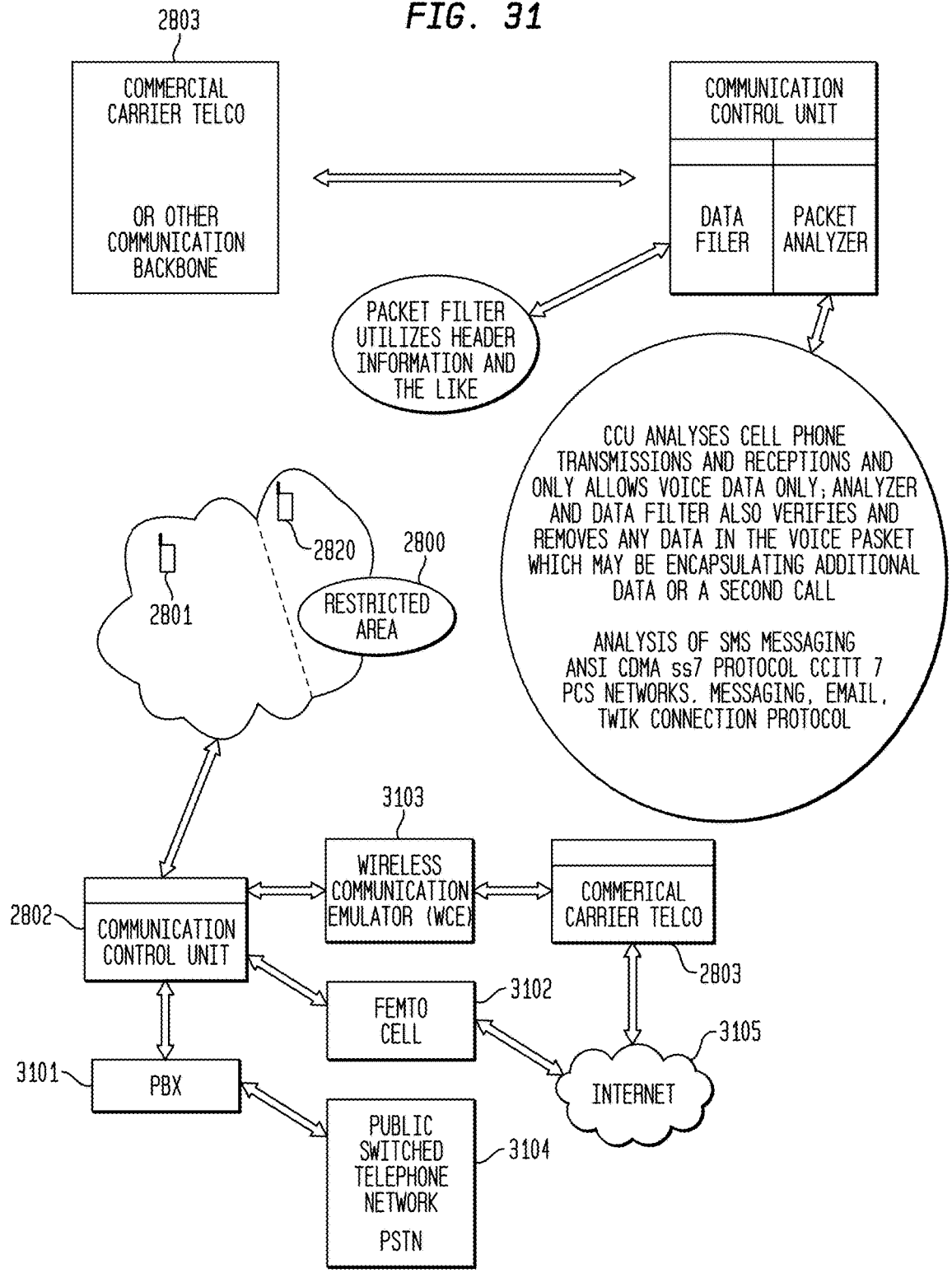
FIG. 31 illustrates an exemplary process for controlling and processing a wireless transmission in accordance with the principles of the invention.

FIG. 31 Illustrates a preferred embodiment of the system wherein controlling the output of the transmission of the cell phone and to the cell phone is critical. The Communication control system (2802) is programmed to allow only specific data packets to and from the cell phone (2801). The communication control unit (2802) restricts all data except voice data packet(s) and/or packet-switched data sets and/or the like. This function is performed by analyzing each packet set and only allowing the packet set containing voice data and the like. The goal of this embodiment is to disable cell phone features such as email, instant messaging, video streaming, an ability to make a second call upon an existing call, three way calling and the like, such as twit, and limit access to voice only. The system will also analyze the voice packet to make sure nothing else in encapsulated in the voice transmission, in that some restricted area have sensitive data and security documents which are not authorized to be transmitted.

One of the challenges of controlling wireless communication with third party systems is the reluctance of the commercial carrier to provide conductivity to the Telco network and infrastructure such as HLR/Encryption keys, and backbone services. A second challenge of controlling wireless communication is retaining complete control of the wireless device, while allowing the Macro network (or Telco) to send calls and data, messages to the controlled device. When under the control of the CCU the wireless device is invisible to the Macro network, therefore the Macro network does not have an ability to send a call to the wireless device (cell phone) within the controlled area (2800). FIG. 31 illustrates a preferred embodiment of the invention, wherein the CCU's wireless communication emulator (WCE) (3103) establishes a connections with the commercial carrier (2803) as the wireless device, using the cell phone's communication protocols and identity thereby establishing an over the air communication connection to the Commercial Carrier (2803). When someone tries to call the cell phone 2801/2820 the CCU's wireless communication emulator (WCE) (3103) receives the communication the CCU and controls the call.

The CCU then has the option to connect the outside caller with the restricted zone cell phone (2801/2820) or preventing the communication/data connections, depending on a set of established parameters. For example, if the phone is in a restricted area, the called party maybe played a message the called party cannot receive calls and is instructed to call back. Or if the phone is an authorized phone (2820), connecting the communications, however preventing data transfers because the phone is in a classified area and data transmissions violate security policy and the like. FIG. 31 also illustrates using a Femto cell (3102) (and the like, a device authorized by the commercial carriers) to be the bridge to the commercial carrier, the CCU (2802) establishes and communicates with the Femto cell, when a restricted phone attempts to make a call the CCU sends the phone to and/or connects the phone to the Femto cell. The Femto cell establishes the call via the commercial carrier network. When an incoming call for a restricted phone is requested of the commercial carrier network, the commercial carrier establishes the connection through the Femto cell. As discussed previously the CCU has the option to connect the incoming Femto call to the restricted cell phone. In another embodiment of the invention all authorized phones are re-directed and connected to the commercial carrier via the Femto cell. One of the challenges of allowing an air connection to the femtocell is preventing unauthorized users.

Currently, packet switching is a digital networking communications method that groups all transmitted data regardless of content, type, or structure into suitably sized blocks, called packets. Packet switching features delivery of variable-bit-rate data streams (sequences of packets) over a shared network. When traversing network adapters, switches, routers and other network nodes, packets are buffered and queued, resulting in variable delay and throughput depending on the traffic load in the network. Packet switching contrasts with another principal networking paradigm, circuit switching, a method which sets up a limited number of dedicated connections of constant bit rate and constant delay between nodes for exclusive use during the communication session. Currently two major packet switching modes exist; (1) connectionless packet switching, also known as datagram switching, and (2) connection-oriented packet switching, also known as virtual circuit switching. In the first case each packet includes complete addressing or routing information. The packets are routed individually, sometimes resulting in different paths and out-of-order delivery. In the second case a connection is defined and reallocated in each involved node during a connection phase before any packet is transferred. The packets include a connection identifier rather than address information, and are delivered in order.

Currently, packet mode communication may be utilized with or without intermediate forwarding nodes (packet switches or routers). In all packet mode communication, network resources are managed by statistical multiplexing or dynamic bandwidth allocation in which a communication channel is effectively divided into an arbitrary number of logical variable-bit-rate channels or data streams. Statistical multiplexing, packet switching and other store-and-forward buffering introduce varying latency and throughput in the transmission. Each logical stream consists of a sequence of packets, which normally are forwarded by the multiplexers and intermediate network nodes asynchronously using first-in, first-out buffering. Alternatively, the packets may be forwarded according to some scheduling discipline for fair queuing, traffic shaping or for differentiated or guaranteed quality of service, such as weighted fair queuing or leaky bucket. In case of a shared physical medium, the packets may be delivered according to some packet-mode multiple access schemes.

In this embodiment some voice data packet(s), binary data, circuit-switched wireless digital voice, and/or packet-switched data sets and the like include Short Message Service (SMS); SMS is a bidirectional service for short alphanumeric messages. Messages are transported in a store-and-forward fashion. For point-to-point SMS, a message can be sent to another subscriber to the service, and an acknowledgement of receipt is provided to the sender. SMS can also be used in a cell-broadcast mode, for sending messages such as traffic updates or news updates. Multimedia Messaging Service (MMS)—sometimes called Multimedia Messaging System—is a communications technology developed by 3GPP (Third Generation Partnership Project) that allows users to exchange multimedia communications between capable mobile phones and other devices. An extension to the Short Message Service (SMS) protocol, MMS defines a way to send and receive, almost instantaneously, wireless messages that include images, audio, and video clips in addition to text.

Currently, EMS (Enhanced Message Service) is the step between SMS and MMS it has some of the MMS function like sending formatted and colored TEXT, sample Graphics and Audio files which are simple like Ring tones. EMS is being used by some limited phones because it's being supported by old networks instead of MMS, which need (2G) or (3G) network. The (3G) network might support very large MMS size while the (2G) may limit the MMS size to 100 KB only.

Currently, SMS, MMS and EMS services are utilized within the larger wireless domains such as GSM, TDMA, GPRS, and CDMA, CDMA2000-1×, EDGE, UMTS, GPRS and the like.

FIG. 31 further illustrates a preferred embodiment wherein the communication control unit decodes the packet-switched wireless communications and blocks the restricted data services from the voice only service. The system includes Simple Mail Transport Protocol (SMTP) preventions; a de-encryption tool set for high-speed multi-media, SMS, EMS, and MMS enabled platforms, such as 3G and the like.

In an embodiment communication control unit includes the whole cellular connections conduit including the Cell Tower and Base Station and sub components such as the Base Station Controller (BSC), Mobile Switching Centre (MSC) and/or the Gateway GPRS and the like. In an embodiment a base station is the cellular relay station (or cell tower) that a cell phone talks to when initiating or receiving a wireless call.

In this embodiment, the Mobile Switching Center (MSC) is a computer-controlled switch for managing automated network operations. An MSC automatically coordinates and controls call setup and routing between mobile phones in a given service area. In this embodiment the MSC maintains individual subscriber records, current status of subscribers, and information on call routing and subscriber information. Traditionally, there are two subscriber databases called the Home Location Register (HLR) and the Visitor Location Register (VLR). The HLR contains subscriber profiles, while the VLR provides information relevant to roamers.

In an embodiment, a modified Home Location Register (HLR) and/or the Visitor Location Register (VLR) are modified to contain the unauthorized/authorized cell phone list and the like.

In this embodiment the SMS, EMS, WMA, and MMS and the like, utilizes the Short Message Service Center (SMSC), which acts as a store-and-forward system for relaying short messages. In a preferred embodiment the system will disable and/or manipulate the functionality of the Short Message Service Center to stop the reception of said data packet(s) (message, data file, data packet and the like) and reroute these data sets to a database for future analysis. Additionally, since messages are stored in the network until the destination cell phone becomes available, the communication control unit will collect the waiting packets/messages and the like and prevent them from reaching their destination and reroute the data for future analysis.

In an another embodiment and application, where the GMSC interrogates the Home Location Register (HLR) for subscriber routing information and delivers the short message to the home MSC or roaming MSC of the destination mobile unit the communication control unit, will reroute these SMS, EMS, MMS data packets into a database which will contain the sender's and receipt's unique identifier(s), time-stamp reporting, location of cell phone at the time of send, the receiving and transmitting cell phone number and the like.

In an embodiment in which the commercial carrier utilizes a basic point-to-point or broadcast-to-point subscriber services Mobile-terminated short messages (MT-SM) and/or a Mobile-originated short messages (MO-SM), in which MT-SMs are transmitted from the SMSC to the handset or from the SMSC to other sources, the communication control unit will intercept these messages as mentioned above and return a report to the SMSC, confirming that the message was delivered and/or informing the SMSC of the SMS failure. The answer will depend on the parameter set on the system within a specific application and goal the mission of the system.

In an embodiment the commercial carrier deploys the use of a short code, which is a carrier-specific (and therefore carrier-dependent) phone number for applications routed through an SMSC. Thus, it is intended that this embodiment to capture all transmitted and received on-voice communications. However it is also anticipated that a message will be encrypted within a voice packet, and API will be designed on smart phones to bypass the current data transport methodologies and this invention anticipates that inevitability and the like.

Additionally, in all of the interception of messages and/or data transmissions, a preferred embodiment will include the methodology to trigger the correct reply to the unauthorized transmission, that the message and/or data was received and open by the intended recipient.

In an embodiment, where the Subscriber Identity Modules (SIM) cards is used for activation, and subscriber-profile purposes, the communication control unit and/or system will modify the SIM information, such as the electronic serial number (ESN) and/or the mobile identification number (MIN) within the phone or on the SIM card or within the phone to pull a subscriber offline. By changing the SIM information, and/or the information identifying the phone, the cell phone is not able to interface with the commercial tower and/or the cell phone is denied access because the identification information and the like, is incorrect.

In an embodiment the communication control unit interfaces with the service-provider gateway(s) and/or commercial carrier gateway(s) and provides the gateways with the unique identifier of all restricted phones, and a set of parameters which indicate which features of said phones should be disabled, which phones should be controlled, maintained and the like. In another embodiment the communication control unit interfaces with a set of transmitters and/or transceivers through and/or by the service-provider gateway(s) and/or commercial carrier gateway(s) and the like.

In an embodiment in which the cell phone is a Smart phone and the like, and/or a phone which provides alternative communication capabilities and/or advanced features, (i.e., includes the capability to transmits information without utilizing FCC commercial carrier frequencies, utilized web enabled features such as twit and the like, for example the use of third-party platform, that acts as an operating-system layer between the Internet and wireless devices. This communication may be via Wi-Fi on Wi-Fi enabled cell phones (and the like), the communication control unit interfaces with, a or a set of, Wi-Fi access points (ex. 433 mhz, 912 mhz . . . 2.5 ghz, etc.) which attract wireless communications to the communication control unit. The communication control unit will simulate the transmissions and the intended results of a completed transmissions and/or send back a "received indication". The goal is to provide the environment, in which the restricted cell phone user believes they have an actual connection and communication pathway, and provides the ability to the communication control unit, to capture the date transmitted from the cell phone and provides a simulated "correct" response.

In another embodiment, the wireless communication access point, provides the intended recipient the belief the inmate send a message. However this message is a rogue put in place to assist law enforcement in the investigation and to thwart the continuing criminal enterprise and allow the law enforcement personnel the ability to catch the transmitter and receivers of restricted area communications.

As previously mentioned one of the goals is to identify the person who is attempting to contact the restricted area cell phone. In a preferred embodiment the communication control unit (2802) and/or the commercial carrier interrogates the person's cell phone attempting to contact the restricted cell phone and collects investigative data including but not limited to photos, text email, phone records, voicemail, call history and the like.

In the case of other wireless communications, such as a Wi-Fi access point being setup outside the restricted area to provide a wireless communication conduit to someone inside the restricted area, it is important to be able to detect that wireless communications node and/or access point. In an embodiment the signal detection system and/or the communication control unit (2802) will monitor the external area around the restricted area to detect for any wireless communications which may be pointed at or configured in such a way to provide wireless communication devices with in the restricted area to communicate outside the restricted area. In an embodiment, the communication control unit and/or the signal detection system will also look to detect wireless communications within the restricted area communicating with other wireless communications within the restricted area; for example, an inmate in administrative segregation (ADSEG) communicating to an inmate outside of ADSEG.

In the preferred embodiment, developing a commercial carrier survey, which includes the footprint of the restricted area, the settings, surrounding characteristics and a benchmark on the cellular activity within and/or around the restricted area is performed. Also benchmarking the characteristics of the commercial base stations, their components, and the cell towers to provide the ability to accurately and seamlessly simulate and/or clone the towers and all of their characteristics, capabilities, data hand shake protocols, unique identifies of each of the tower and channels, signal strengths and the like. This dataset and database of information is important to accurately place and to configure the functionality of a communication control unit, so that the communication control unit does in fact clone the commercial base station and its towers. Additionally, this information gathered provides the ability to catalog into a criminal justice database which can cross reference cell phone activity usage, cell phone purchases, gang activity and provider perimeter detection analysis capabilities, information on the capturing of contraband cell phone(s), assist in accurately detecting of a cell phone, provide critical information for contraband investigations, provide trends and analysis of preferred cell phone being used by inmates and their criminal enterprise.

Some of the important and relevant information and data to be gathered is: What tower cell(s) and/or sector is the restricted area located in? How many towers in the area? What transceiver frequencies does each tower provide? How many channels does each tower have? What are the parameters of the control and reverse control channels? What are the cell towers sectors and cell and related power levels? What protocols is the tower capable of communicating? What are the handshake protocols? What are the power levels at each frequency and protocol? What are the unique identifiers of each tower? How many cell phones are located inside the restricted area? How cell phone may is located adjacent? How many are transient cell phones? (example a corrections officer has a cell phone, he drives 5 miles to work each way, the cell phone is switched between three tower on his way to and from work, the phone spends 8 hours at night sitting in sector/cell 2 of Tower B; Tower B is a mile away from the corrections officer's home, the phone spends 8 hours 5 days a week, in sector/cell 6/8 of Tower A).

For each cell phone within the above questions it is important to know: What carrier each phone is connected to? What is the cell phone number? What is the IMEI information? What is the SIM information? What is the make and model of the cell phone? Who the cell phone belongs to? Where is the billing address? What type of billing on this phone? Is this phone paid for by check or credit card? Does this phone belong to a person who works at the facility? Does his phone belong to a friend and family member of an inmate? Does this person live next to the restricted area? Does this phone migrate from this location? If yes how often?

In a preferred embodiment where the desire is to shut down the communications of a cell phone and/or wireless communication device(s) and the protocol is encrypted to communicate with said device, several methods are available to detect and take said cell phone off line. In this embodiment, when the cell phone turns on, it may or may not try to connect with the communication control unit because the communication control unit does not have the protocol to talk to the cell phone, the cell phone cannot communicate with the communication control unit. Therefore, the cell phone attaches to the commercial carrier who can understand and communicate with the cell phone. This methodology of detection and control is applicable to any wireless communication device. The communication control unit and/or the signal detection unit(s) detects a cell phone which is in the restricted area, however the cell phone is encrypted and neither system can either connect to the cell phone and/or cannot determine the unique identifier. However both systems can determine the general and/or specific location, and/or the frequency and/or time stamp and/or the type for the cell phone, which was detected, however, did not attach to the communication control unit. The communication control unit and/or the signal detection system provides that information to the commercial provider by communication networks discussed earlier in this patent or by another real-time and/or other means and the like. Real-time is preferred; however, asynchronous communication will also get the desired results. The commercial carrier correlates the time stamp, frequency, type, location and determines the cell phone which has eluded the communication control unit. The commercial carrier provides the information above and the system determines, as discussed in another patent application, whether this is a contraband phone, an authorized phone, a transient phone and the like.

In a preferred embodiment the communication control unit and/or the signal detection system detects the encrypted identifying information and utilizes the encrypted information as a positive identification by sending the encrypted information to a location and/or machine, and/or system such as the commercial provider to decrypt the information and the like. Additionally, the communication control unit and/or the signal detection system utilize the unique encrypted data set to track and identify the wireless communication device and the like.

In a preferred embodiment, the interface between the communication control unit and/or the signal detection system and the carrier allows the "authorities" (the law enforcement agency controlling the restricted area) to shut down that cell phone rather than the carrier.

In a preferred embodiment, communication control unit and/or the signal detection system utilizes analysis algorithm(s) and dataset and parameters on location, payment type, location of the owner, transient properties of the cell phone, time of call, location of call and the like, using the data collected above and more and the like to determine, if the cell phone is actually a contraband phone as opposed to a visitor to the facility sitting in their car adjacent to the fence line, and/or the determined location assures that the cell phone in questions is actually a contraband phone.

In another preferred embodiment, where the desire is to shut down the communications of a cell phone and/or wireless communication device and the protocol and the available technology is a signal detection device with and/or without an IMEI/IMSI, electronic serial number (ESN) MIN discriminator and the like. In this embodiment, when the cell phone turns on, the signal detections system detects all and any wireless communication devices. When the signal detection system detects a cell phone(s) which is in the restricted area, the system determines the general and/or specific location, and/or the frequency and/or time stamp and/or the type for the cell phone, and in some case(s) the unique identifier. The signal detection system provides that information to the commercial provider by a communication network as discussed earlier in this patent or by other real-time methods and/or other means and the like. The Real-time method is preferred; however, asynchronous communications will also get the desired results. Currently, in cellular telecommunications, there are three cell phone identifiers; the cell phone (device) ID, for CDMA it is the MEID, and or GSM it is the IMEI; the subscriber ID, for CDMA it is the MIN, for GSM it is the IMSI; and the cell phone number to call out and the cell phone number to be called for CDMA it is the MDN and for GSM it is the MSISDN. Traditionally, each cellular telephone has an Electronic Serial Number (ESN) hardwired into the phone by the manufacturer. This number was uniquely and permanently associated as to identify each and every cellular phone. Also, when a cellular telephone is put into service, it is assigned a Mobile Identification Number (MIN) by the cellular service provider. This is the ten-digit area code and telephone number of the phone. The mobile equipment identifier (MEID) is a globally unique number identifying a physical piece of CDMA mobile station equipment. The commercial carrier correlates using the information received from the signal detection system to determine the cell phone(s) identification in the restricted area. For example if the signal detection system which provides the ESN, MIN, IMEI, MEID positive identification is automatically determined. Thus, if the signal detection system provides the frequency, location, time stamp and/or the type the commercial carrier can correlate the timestamp and frequency provided with the phone's IMEI and/or phone number. The signal detection system determines, as discussed herein and in the aforementioned related patent applications, whether this is a contraband phone, an authorized phone, an unauthorized phone, a restricted area phone, staff phone, transient phone and the like.

In an embodiment of the invention it is critical to configure communication control unit to work with the commercial carrier tower parameters such as frequency, protocols, cell/sector coverage, transceiver power, channel coverage, frequency priorities and the like. To cover all of the channels, protocols and frequencies of a carrier tower the communication control unit must know the tower parameters and when those parameters change. In an embodiment the communication control unit monitors all of the towers within the vicinity of the restricted area. The communication control system tower configuration database and algorithm utilizes the data parameters such as frequency, protocols, and cell/sector coverage, transceiver power, and channel coverage, frequency priorities, to optimize the communication control unit to effectively and completely control the cell phone usage within an area.

In a preferred embodiment the commercial carrier provides all the tower parameters such as frequency, protocols, control and reverse control channels, cell/sector coverage, transceiver power, channel coverage, frequency priorities and the like, as they change to the communication control system so that the communication control unit works proficiently. The communication control system tower configuration database and algorithm utilizes the data parameters such as frequency, protocols, cell/sector coverage, transceiver power, channel coverage, frequency priorities, to optimize the communication control unit to effectively control the cell phone usage within an area.

In another embodiment the communication control system sets up equipment which interfaces with the tower and/or monitors changes and/or to detect changes in the tower parameters.

In the preferred embodiment the data derived from the commercial carrier surveys on the cell phone usage in and around the footprint of the restricted area provides an ability to see and understand how contraband gets into prisons. Correlating who is bring in these phones, what call these contraband phones call, determining the relationship between prisons and who is the organized element providing contraband.

In the preferred embodiment the communication control unit, (also known as a base station denial of services system) is seamlessly integrated with a signal detection system. In an embodiment, this signal detection system is a time-domain based location and tracking system, which covers the frequency of all of the cell phone frequency channels as well as all of the Wi-Fi frequencies, walkie-talkie and rogue frequencies. Currently, 300 MHz to 3.5 g should be scanned; however this will change over time and will have to be expanded. The integrated detection and control system allows for the accurate determination of whether the cell phone is within the restricted area or is just on the other side of the fence. This ability to accurately determine the location is critical to make sure only restricted phone are denied service and commercial carrier customers.

In this embodiment, the base station technology is integrated with a time-domain location and tracking system, and/or an amplitude detection and location, identification and tracking system with more sensors for a more accurate location capability.

One of the challenges is preventing wireless communication device within a restricted area the ability to defeat the system by being able to choose and/or choosing a commercial tower and avoiding the control unit system. This embodiment solves that situation. When a phone is detected in the restricted area and is not under the control of the communication control unit, the system provides the unique identifier(s) (frequency, IMEI, time code, sector/cell and the like) to the commercial provider to disable that cell phone.

In the preferred embodiment, preventing the cell phone from ever being able to bypass the communication control unit is also the intention of this invention. Cell phone apps (applications), in the future, and is some cases, currently, will be able to pick and choose their wireless connections/ wireless conductivity and their commercial providers and or commercial providers' towers. To prevent the communication control unit from being intentionally and/or accidently bypassed, the communication control unit needs to simulate the characteristics (e.g., frequency, duty cycle, modulation, phases, etc.) of the signals provided by commercial provider's towers so that the unauthorized cell phone cannot distinguish between the tower(s) and communication control unit.

In the preferred embodiment when the cell phone chooses the commercial tower the cell phone will still attach to the communication control unit, if the cell phone is within the area of interest. This act is performed working in collaboration with the commercial carriers.

In the preferred embodiment the communication control system tower configuration database and algorithm utilizes the data parameters such as frequency, protocols, cell/sector coverage, control and reverse control channels, transceiver power, channel coverage, frequency priorities, cell tower(s) location(s), transceiver frequencies, channel parameters, sector parameters, channel distribution, cell towers sector frequencies, cell power levels, tower protocols handshake protocols, power levels at each frequency and protocol, tower, base station and the commercial provider's unique identifiers and identification identifiers, cell sector, and channel intersection information and their power levels at each location, and provider's encryption protocols and identifiers and the like, to clone and optimize the communication control unit to look like each commercial tower(s) in the area.

In an embodiment when a cell phone in the area of interest looks for an alternative cell tower to connect with, such as a commercial provider's tower(s), the cell phone only sees the communication control unit and/or the communication control system's other wireless communications options, such as Wi-Fi access points and the like.

In an preferred embodiment, the Wi-Fi access points provides the unauthorized cell phone with a connection which provides the user with a controlled portal experience, which the restricted user believes he has found a hole in the system. However, this portal is controlled. This connections provides the communication control system an ability to infiltrate the cell phone and gather information of the users, provides an ability to modify the features of the cell phone to the benefit of the secure facility. This embodiment is also applicable to all alternative communication transceiver(s), such as Wi-Fi, Wi-Max communications devices and the like and also applicable to all other wireless communication devices and the like.

In another preferred embodiment when the cell phone looks for an alternative cell tower to connect with the cell phone only sees clones/shadows of commercial tower(s) and when the cell phone tries to connect to the said clone(s)/ shadows of commercial tower(s), the phone actually attaches to the communication control unit. However, the phone is displayed that it has connected to the commercial and/or alternative tower. This embodiment is also applicable to all alternative communication transceiver(s), such as Wi-Fi, Wi-Max and the like and also applicable to all wireless communication devices and the like.

These preferred embodiments solve a known problem(s) and situation facing the corrections and law enforcement community, in which a restricted cell phone gets conductivity though a wireless 802.xx connection which is established outside the restriction zone (i.e., an inmate has friend place an Wi-Fi access point with commercial cellular conductivity in a parking lot which is not within the restricted area, therefore, the access point connects to the commercial tower and has unrestricted access to the outside world, then the inmate uses a 802.xx connection to reach that access point and now the inmate has a communication conduit which a managed access system alone would not detect. These embodiments in concert remove this threat completely.

In an embodiment of the invention, where the goal is to gather the unique identifier of the wireless communication device without using transceiver technology and the cell phone, for example, is in standby, and the system setup a set of repeater signals systems which will repeat the neighboring cell tower's channel and raise the power level of the neighboring cell tower's channel(s) great than the power of the cell tower which the cell phone is currently connected to. This will attract the cell phone to change towers and provide for a reconnection protocol.

One of the challenges of controlling a cell phone is knowing which cell phone is posing a danger and which cell phone does not pose a danger. In one embodiment of the invention, the system detects a wireless communication device and determines how that cell phone should be treated. In this embodiment a cell phone is detected by the Communication Control Unit. The unique identifier is determined and compared to a list of "authorized phones". If the phone is authorized to make a call, (authorization variables, include, time of call, person calling, person called, shift information, scheduling information, unit location, job position . . . ) the system then checks the location of where the phone is presently to determine whether the phone is authorized to make a call from that area.

In an embodiment of the invention, a signal detection system verifies the exact location of the wireless communication device; the zone database identifies and classifies each area of the facility, for example: (red) areas—may be housing units, inmate areas, inmates cells, programs and inmate population areas, inmate rec yards; (grey) areas— may represent perimeter areas which are susceptible to misidentification. e.g., fence lines, wall perimeters and (green) areas—may represent areas such as administration areas, staff dominated areas. The exact location of the phone is important to determine whether this phone is actually within one of those restricted areas and/or sectors.

In an embodiment, If the cell phone is not authorized, (cell phone is determined by the unique identifier not being on the authorized list), several scenarios need to be determined before the cell phone is denied making and/or receiving a call. Variables include: who is the caller trying to call, is this phone actually in a restricted area.

In an embodiment, the communication control unit (CCU), controls unauthorized and monitors the cell phone to determine what number and programs are being executed on the cell phone and determines what number is being called. Additionally, the Communication Control Unit is monitoring the cell phone activity (email, messaging, tried calls,) and all data is being stored for retrieval and analysis. If the cell phone calls an emergency number (e.g., 911) the program determines how to handle a 911 call, some option include: releasing the 911 call back to the commercial carrier to complete the 911 call, or redirecting the 911 call via a PBX connection routing the call to the facility security team or redirecting the call via a picocell and IP backhaul. The two latter options allow monitoring of the call automatically; the former solution, call still can be monitored. (see FIG. 27, for resolving 911 calls).

In an embodiment of the invention, the system looks at the number the "not authorized" cell phone is trying to call and the system compares the number with numbers in a database of inmate called phone numbers and known associates of inmates, their friends and relatives; this can be from the Inmate phone system and/or the inmate records and/or visitor records and/or the cell phone ID sensor in the lobby and/or the like. If the number being call is a known security risk, such as the database numbers or the like, the system "denies service" and notifies security, logs the incident, alerts administration, displays location of disabled phone on a GUI interface, notates the location, type and identification and service; the system also compiles this data for investigation, and the like.

In an embodiment of the invention, if the "not authorized" cell phone/wireless device is trying to place a call, email, and the like and the called/text/communicated with is unknown, and/or the wireless device is in standby, the system looks to the location of the phone to verify the phone is actually in the restricted zone. The Communication Control Unit (CCU) and/or the Cell Phone Detection System (CPDS) verifies which zone the cell phone is located (green, grey, red . . . ). Secondarily, the system looks to see if the cell phone has been denied access before. The system runs a weighted set of algorithms to determine whether the cell phone which was denied access, is actually an unauthorized phone or a phone which has, by accident, been picked up by the system. Some of the variables which make up the analysis of the weighted algorithm are, but not limited to, number of denials, number of locations, number of times, number called and the like. When the system, detects a phone which is not an authorized phone, but also is confirmed to not pose a threat the system adds it to a "Pose No Danger List". The agency decides how to deal with the pose no danger list. Some examples are neighbors who live next to the complex, people who work at the facility, frequent pedestrian who walk frequently near the complex and the like.

In an embodiment of the invention, the system uses different detections techniques such as phase angle cell phone detection, narrow band antenna signal detection, phase detection, amplitude detection, time-domain detection resolve the ambiguity and the precise location of the wireless devise. If it is determined the cell phone is most likely outside the restricted zone the system checks to see if the number dialing is a neighbors, visitor, staff/trusted persons. The system looks at databases which contains these numbers. The system also verifies whether this ID has been released before and verifies why. The systems also verifies whether the number being called on a known agency list, state agency, and/or known entity.

In an embodiment of the invention, if the phone belongs to a neighbor or staff member, the system allows the call/text and/or the incoming call, alert facility admin, (options register neighbor phone(s), register staff phone(s), verify location of call, develop a matrix of "zone violation misidentifications"

In an embodiment of the invention, if the device cannot be confirmed that it is outside the restricted area and/or cannot confirm previous history at the facility, the system runs additional tests. FIG. 26 illustrates utilizing Telco History data to make a determination whether the wireless communications device is: new to the area, arrived today migrates thru the area and the like and this data is also used for investigative, and documentation history.

The system downloads phone history from the commercial provider and uses the data to see whether the device has previous history. The data from the TELCO may include all data connections transfer, cell, locations connections (sector, cell) transmission history, data, transmissions, GPS information, tower information connections history, Telco cell sector(s)/wireless access nodes, device ownership, payment information, name of owner. The system looks for phone's usage, tower information, tower locations, channel and sector/cell locations; checks to see if cell phone arrived in the area today; whether the cell phone belongs to someone local; whether history shows consistency of local usage; whether the phone is registered to staff. With this analysis the system determines the likely hood that the cell phone is a legitimate cell phone and whether the call should be allowed.

Figure 32:
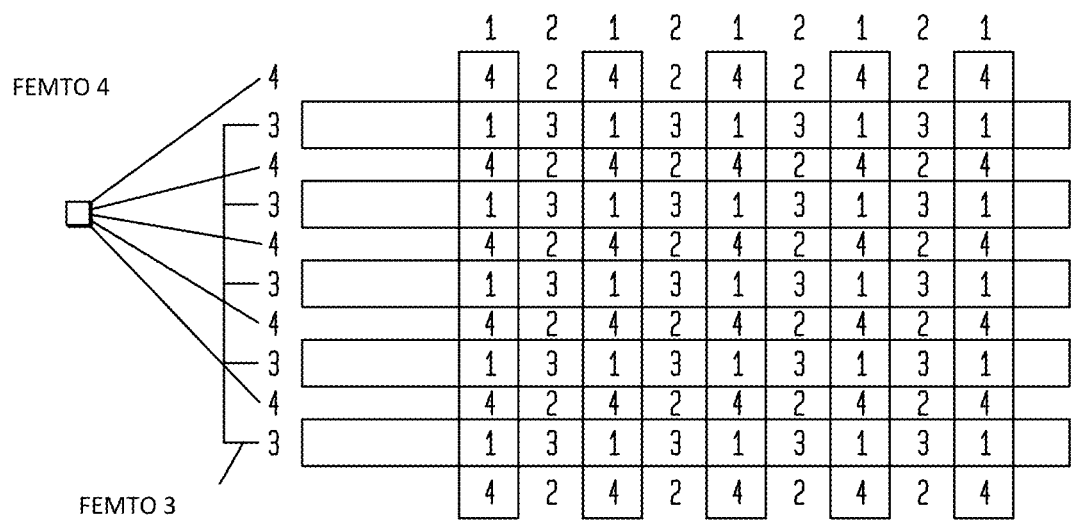
FIG. 32 illustrates an exemplary base station power grid matrix to stimulate cell phones in standby mode.

In an another embodiment where tracking and identifying a wireless communication device(s) in standby, in an environment where many wireless communication devices are present, or in an environment in which, the location of the person carrying the cell phone provides data and/or where the specific location of the cell phone and or wireless device is critical, having the wireless device transmit a signal and/or its identification is important. Such as a conference center, mall, secure facility and/or casino detecting the phone in standby is important. FIG. 32 illustrates a method of using base station technology to stimulate cell phone and/or other wireless communication which are in standby. In the FIG. 32, elements 1, 2, 3, and 4, represent four Femto/Pico base stations. Femtocells 1 and 2 have distributed antennas providing a network of spatially separated antenna nodes which provide cell coverage in a directional column fashion and Femto cell 3 and 4 have distributed antennas providing a network of spatially separated antenna nodes which provide cell coverage in a directional row fashion.

In this embodiment the power lever of Femto 4 is greater than Femto 1, Femto 1 is greater than Femto 3, and Femto 3 is greater than Femto 2. When a cell phone moves from one row to another or from one column to another row the cell phone detect a different power level, thereby requesting the cell tower to connect to the new greater powered tower. Additionally, in another embodiment where it is desirable to have cell phone which are stationary (not moving outside the prescribed column and/or row) to provide their location and identification, modulating the Femto cell transmission power at a set time and power level in coordination with the intersecting directional femtocell provides a method by which the cell phone in standby which has been stationary will also switch towers and provide its location and identification.

In another embodiment, other methodologies for detecting cell phone in standby also will produce the same results such as switching and/or setting intersecting and or adjacent column and row femtocells from low band to high band, or from one channel to another, one frequency to another or one protocol or another. In this embodiment, each femtocell is back hauled to provide continuous conductivity to the Telco. In another embodiment and methodology the femtocells are not backhauled and to not accept the hand off and the cell phones stay connected to the Telco, still producing a positive identification.

Figure 33:
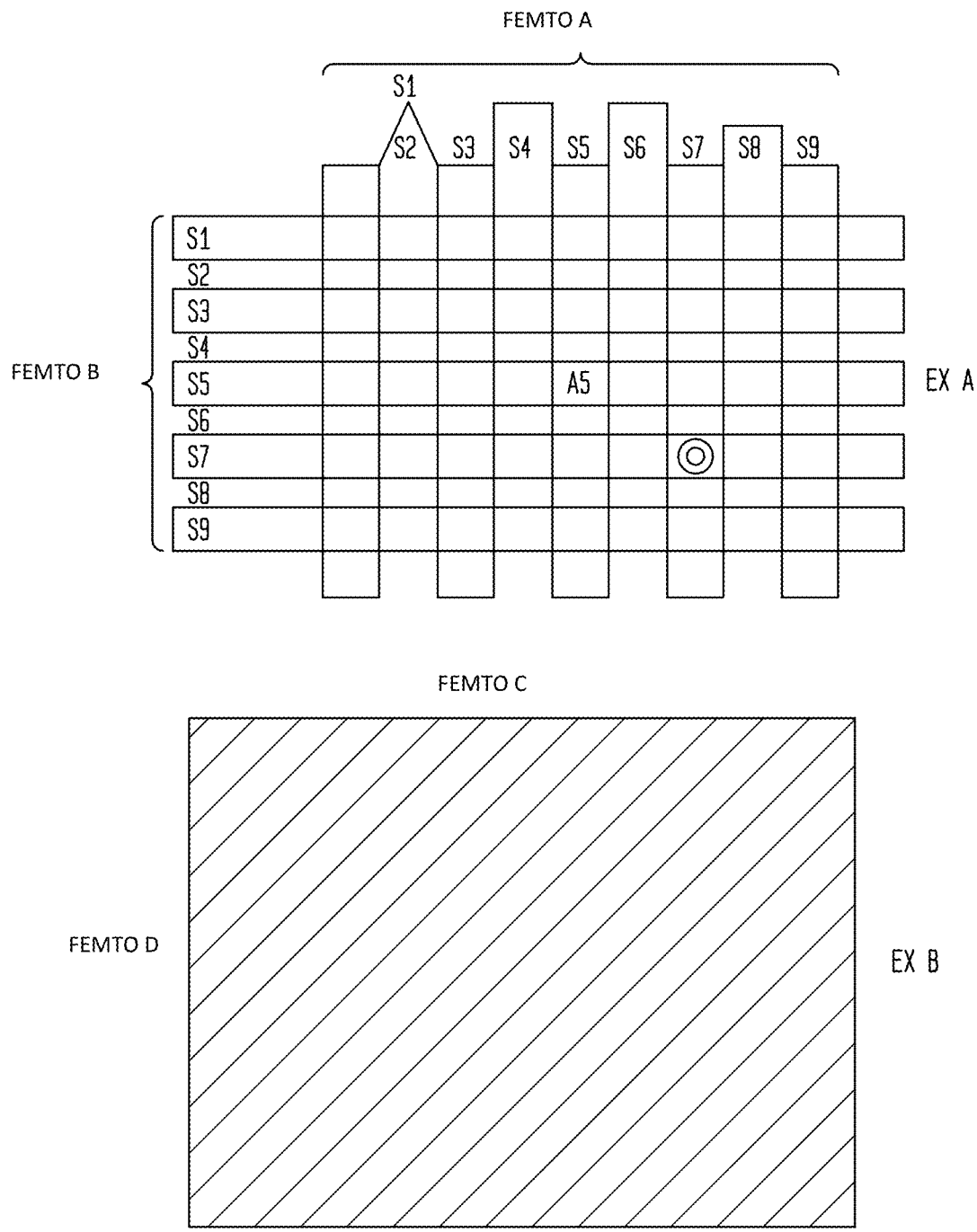
FIG. 33 illustrates a second exemplary base station power grid matrix to stimulate cell phones in standby mode.

In another embodiment, such as described in FIG. 33, a cell phone in an area is controlled by femtocell C (see example b) and at certain time interval femtocell D increases its power greater than femtocell C, the cell phone in the area re-acquires and attaches to femtocell D. At that set time all cell phones in the area transmit their handshake information, the femtocell D and the signal detection sensor isolate the location of all cell phones. Depending on the density of the cell phones within this area the power decrease is incremented to allow a percentage of the cell phones to reacquire at each incremental decrease in power.

In another embodiment the Pico/Femtocell (base station) which provides cell coverage within a complex, is configured to exert a coverage pattern as illustrated in FIG. 33. Example A, where femtocell A provides directional column coverage through 9 directional antenna arrays and where femtocell B provides directional row coverage through 9 directional antenna arrays. This configuration allows for each sector A5, for example, to be either a femtocell A controlled sector or a Femtocell B controller sector. This is important in situations where the resolution of cell phone in a sector can be determined down to a sector and in situations where one wants to identify one or more sectors sector at a time by switching on the switch and regulating the power down the directional antenna each sector is controllable.

In another embodiment, the signal detection sensors, are synchronized to the base station technology (femtocell) to provide positive identification of each cell phone within the area. In another embodiment the signal detection sensor include a cell phone decoder chip to positively identify any phone detected independent of the femtocell.

While the invention has been described in connection with certain preferred embodiments; other embodiments and/or modifications would be understood by one of ordinary skill in the art and are encompassed herein.

Methods may include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art. In one aspect of the invention, the location may be determined using a method of non-iterative linear equations as shown in FIG. 19. Furthermore, in an embodiment of the transmission detection, controlling, identification, and reporting system 1500, discussed earlier, being able to determine the location, the type, the identification, the unique identifier, the time, and the frequency of the transmission facility provides parameters within an algorithm and data mining program to determine the danger and/or importance of a transmission facility and how to react to said transmission facility. As discussed in this patent application and other related patent applications, the type of base station, the location of base station and the power of the base station, also contribute important information, whether to control a transmission facility 202, together and alone these contributing factors coupled with the following: location of the transmission facility 202, type of transmission facility 202, identification of transmission facility 202, time of transmission of the transmission facility 202 frequency of the transmission facility 202, based on type of base station technology and/or location of base station technology may determine the and the like.

FIG. 34 illustrates a flow chart 3400 of an exemplary process operable in a pseudo-base station for detecting and processing a wireless communication device or transmission facility in accordance with the principles of the invention.

As illustrate a signal transmission from a wireless communication device is detected at block 3410. At block 3420, a determination is made regarding a potential mode of operation of the detected wireless device. At block 3430, the detected signal mode of operation or operational protocol may be determined based on the frequency band and the bandwidth of the detected signal. At block 3440, an identification of a commercial carrier may be determined based on the determined operation protocol. For example, it is known that the commercial carrier AT&T utilizes a protocol referred to as GSM (Global System for Mobile Communication) which may operate in what is commonly referred to as 1G, 2G, 3G and 4G. 1G refers to a first generation wireless communication protocol; 2G refers to a second generation wireless communication protocol, etc. Each succeeding protocol generation provides greater capability of the wireless communication device. Similarly, the commercial carrier Verizon utilizes a protocol referred to a CDMA (Code Division Multiple) and LTE (Long Term Evolution). CMDA technology may operate is what is commonly referred to as 2G and 3G, similar to GSM. LTE is similar is capability to GSM 4G. Other commercial carriers such as Sprint and T-Mobile use either GSM or CDMA.

At block 3450, a determination is made regarding the commercial carrier associated with the wireless device and the general protocol under which the wireless device is operating. If it is determined the protocol is determined to be GSM (associated with AT&T, for example), then processing continues at block 3460. However, if the protocol is determined to be CDMA (associated with Verizon, for example) then processing continues at block 3470.

At block 3460, a determination is made, with regard to GSM processing which generation of GSM processing the wireless device is operating on. If 2G, then processing continues to block 3462, if 3G processing continues to block 3464 and if 4G processing continues to block 3466.

At block 3470, a determination is made, with regard to CDMA, which generation of CDMA processing the wireless device is operating on. If the mode is 2G/3G then processing continues to block 3472, if LTE processing continues to block 3474.

Figure 35A:
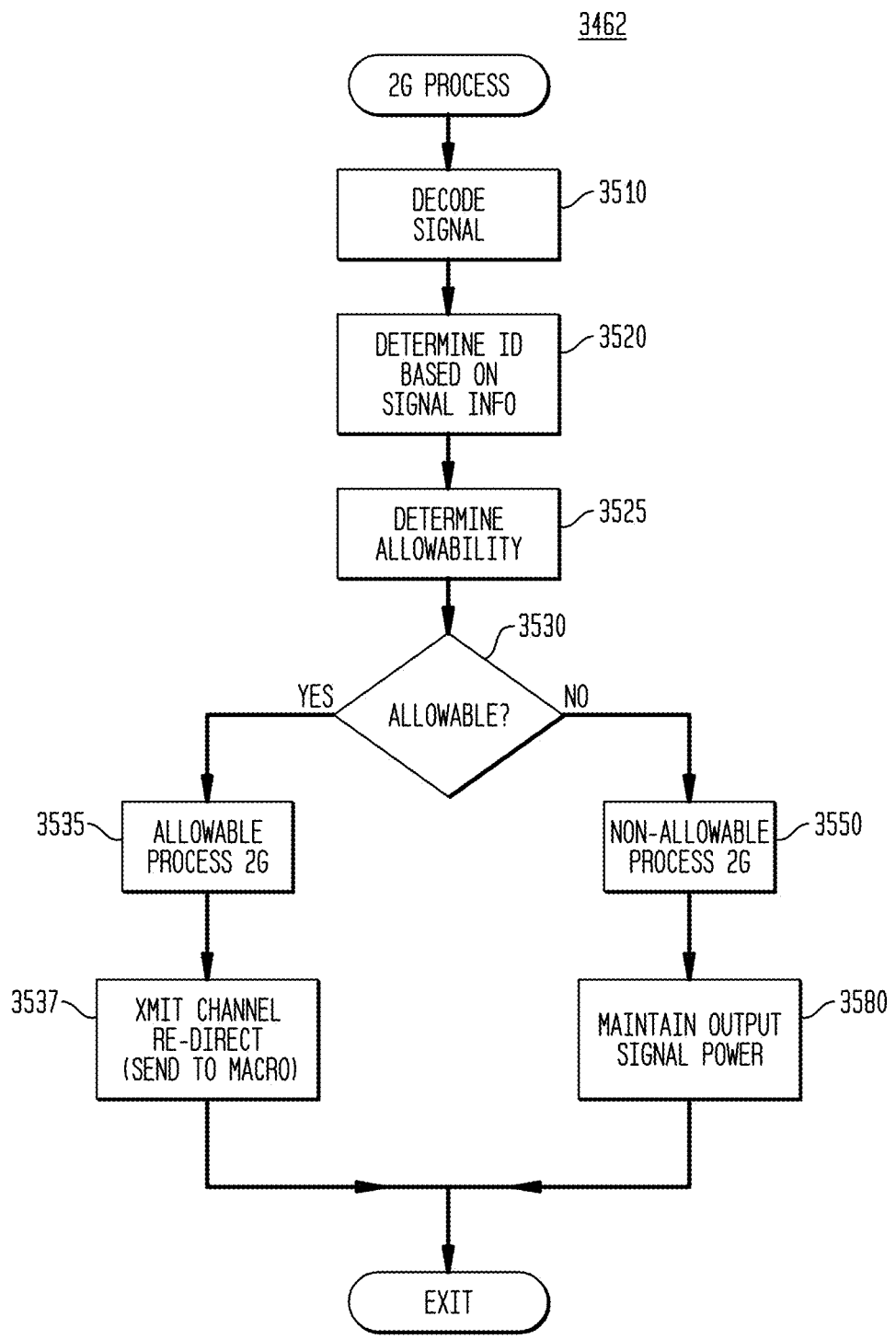
FIGS. 35A-35C illustrate flow charts of exemplary processes for managing wireless communication devices operating in a first aspect of a first mode in accordance with the principles of the invention.
Figure 35B:
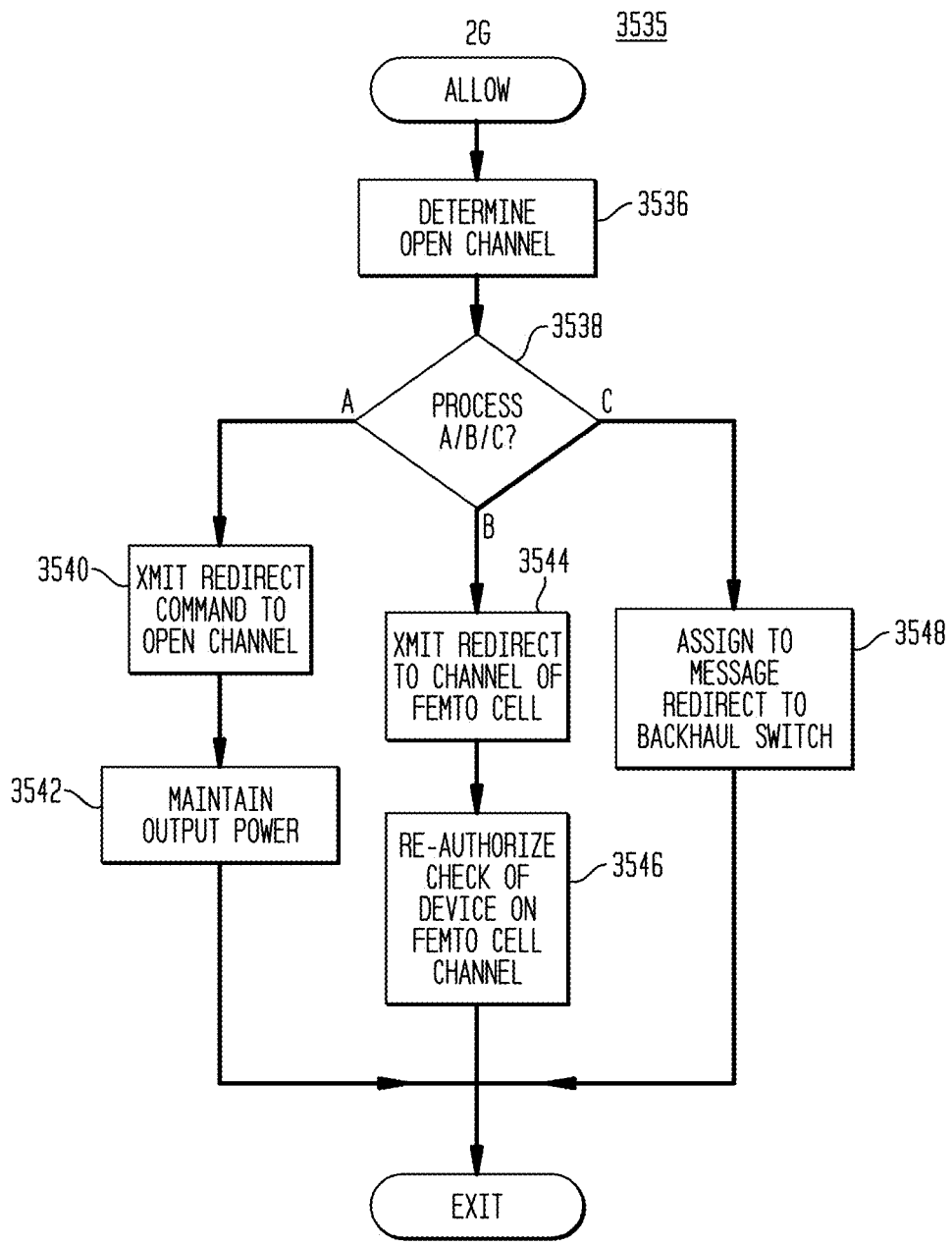
Figure 35C:
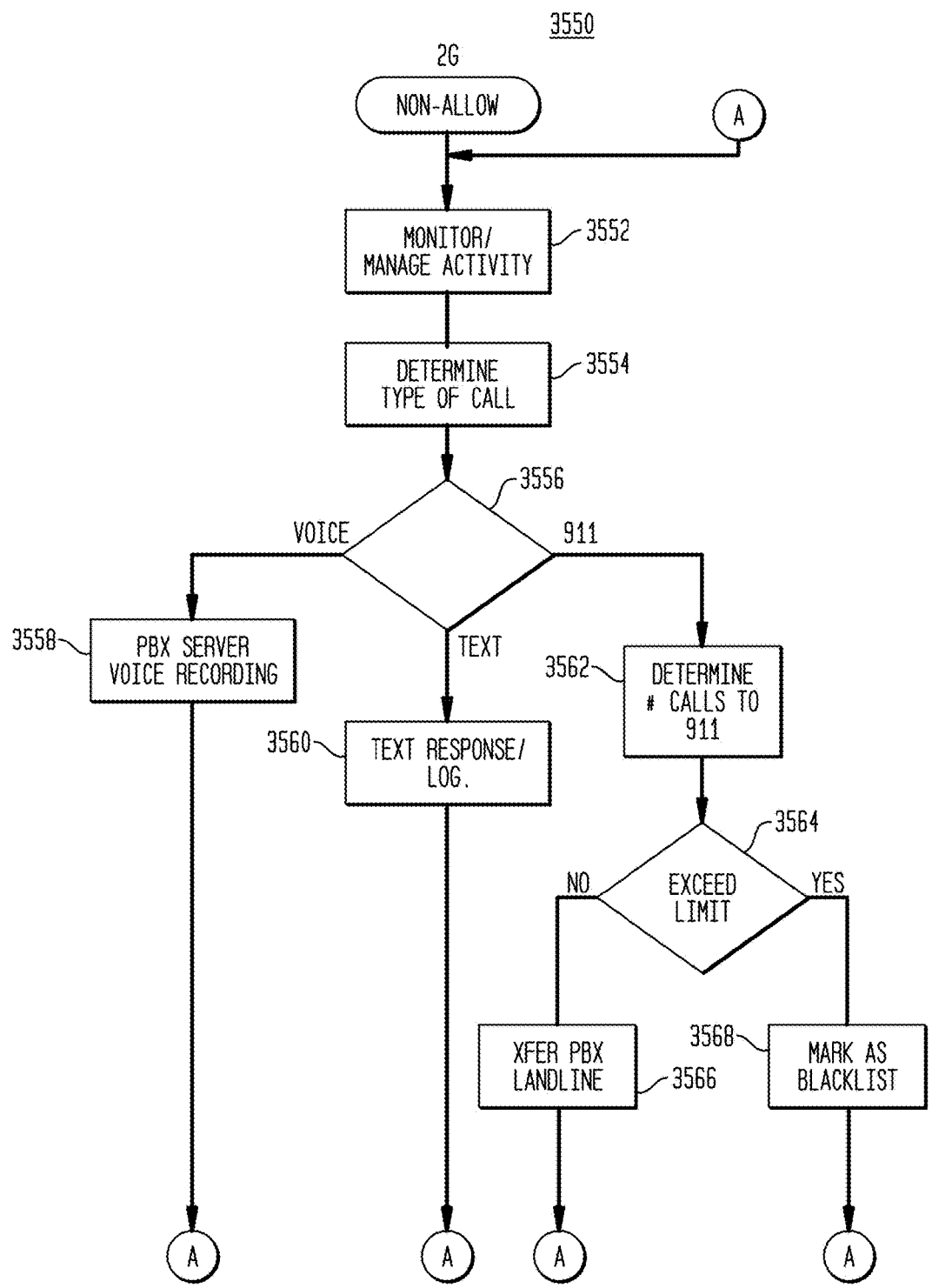

FIGS. 35A-35C illustrate flowcharts of exemplary processes associated with 2G GSM processing (block 3462) in accordance with the principles of the invention.

FIG. 35A illustrates an exemplary process wherein at block 3510 the detected signal is decoded and at block 3520 an identification of the detected signal is made based on information contained in or associated with the detected signal (as has been previously described). At block 3625 a determination of allowability is made. At block 3630 based on the determination of allowability, processing continues to block 3535, when the signal is determined to be allowed and to block 3550 when the signal is determined not to be allowed.

At block 3535, 2G allowable processing is performed and at block 3537 a channel output power of the pseudo base station is maintained. The base station seeing the wireless device on a different channel whichenables the wireless device to continue to transmit and receive messages (e.g., voice and/or text).

At block 3550, 2G non-allowable processing is performed and at block 3580, a current level of signal power is maintained in order to retain the wireless device attached to the pseudo-base station, as previously discussed.

FIG. 35B illustrates a flow chart of an exemplary process associated with 2G allowed processing (block 3535). As shown, an available or open channel is determined at block 3536. The open channel represents a channel that is associated with a base station, which contains sufficient capability to allow one or more wireless devices to operate on. At block 3538, a determination is made regarding the type of processing to be performed on the determined allowed wireless device. For example, in one aspect of the invention, a channel redirect command may be transmitted (block 3540) to the wireless device to command the wireless device to operate on the determined open channel. The pseudo base station continues to maintain its output power level to a current level so as to enable the detection and capture of other devices.

However, in another aspect of the invention, at block 3544, a command may be transmitted to the wireless device to operate on a channel associated with a Femtocell device. The Femto cell may be a device that is separate and independent of the base station and the pseudo base station. In this case the open channel is associated with a channel that has sufficient capability to handle one or more devices. At block 3546, a re-authorization process is initiated to insure that the device(s) allocated to the Femto cell are allowable devices. The allowed devices may continue to operate on Femto cell channel while unallowed devices are processed in accordance with 2G unallowed processing (block 3550).

In still a further aspect, referred to as C, block 3548 the wireless device may be assigned to the MCS (Message Control Station) associated with the base station. The MCS then directs the wireless device to a backhaul switch that connects the wireless device to a base station and/or landline.

FIG. 36C illustrates a flow chart of an exemplary process associated with 2G non-allowed processing (block 3550). As illustrated, activities of the determined non-allowed wireless device are monitored and managed at block 3552. At block 3554 a determination is made with regard to the type of call being made (i.e., voice text and emergency 911). At block 3556, processing is directed based on the determined type of call. If voice processing continues to block 3558, where the PBX server voice recording is initiated and processing continues at block 3552 to continue monitoring the voice communication until the call is completed. In this case the voice call has not been connected to the base station as the wireless device has remained on the channel that the wireless device was captured on. At block 3560, text processing logs the message and may provide a response message. Processing continues at block 3552 to continue monitoring the text messaging. If the processing is to an emergency number (e.g. 911) then a determination is made regarding a number of calls made to 911 by the wireless device at block 3662. If the number of calls made exceeds a predetermined limit then the wireless device is marked as blacklisted and prevented from connecting to the 911 emergency personnel at block 2568. However, if the number of calls has not exceeded the limit, then the wireless device is connected to a PBX landline at block 3566 in order to complete the emergency call. Processing continues at block 3552 for continued monitoring of the emergency call.

FIGS. 36A-36D illustrate flow charts of exemplary processes for 3G GSM processing.

FIG. 36 illustrates at block 3610 the detected signal is decoded. At block 3620, a determination is made whether the detected signal has been successfully decode. If not, then processing continues to block 3622, where re-direct 3G processing is performed. At block 3630, a control channel signal is transmitted to the wireless device to command the wireless device to operate in a lower protocol mode (e.g., 2G). At block 3632, the output power of the pseudo station is maintained in order to re-capture the wireless device using a lower protocol.

However, if the signal is decodable, then processing continues at block 3640, wherein an identification of the wireless device is made based on information of the signal or within the signal. At block 3462, a determination is made regarding allowability of the wireless device and at block 3644 processing is directed to 3G allowable processing (block 3660) for allowed signals and to 3G non-allowable processing (block 3670) for non-allowable signals.

Figure 36A:
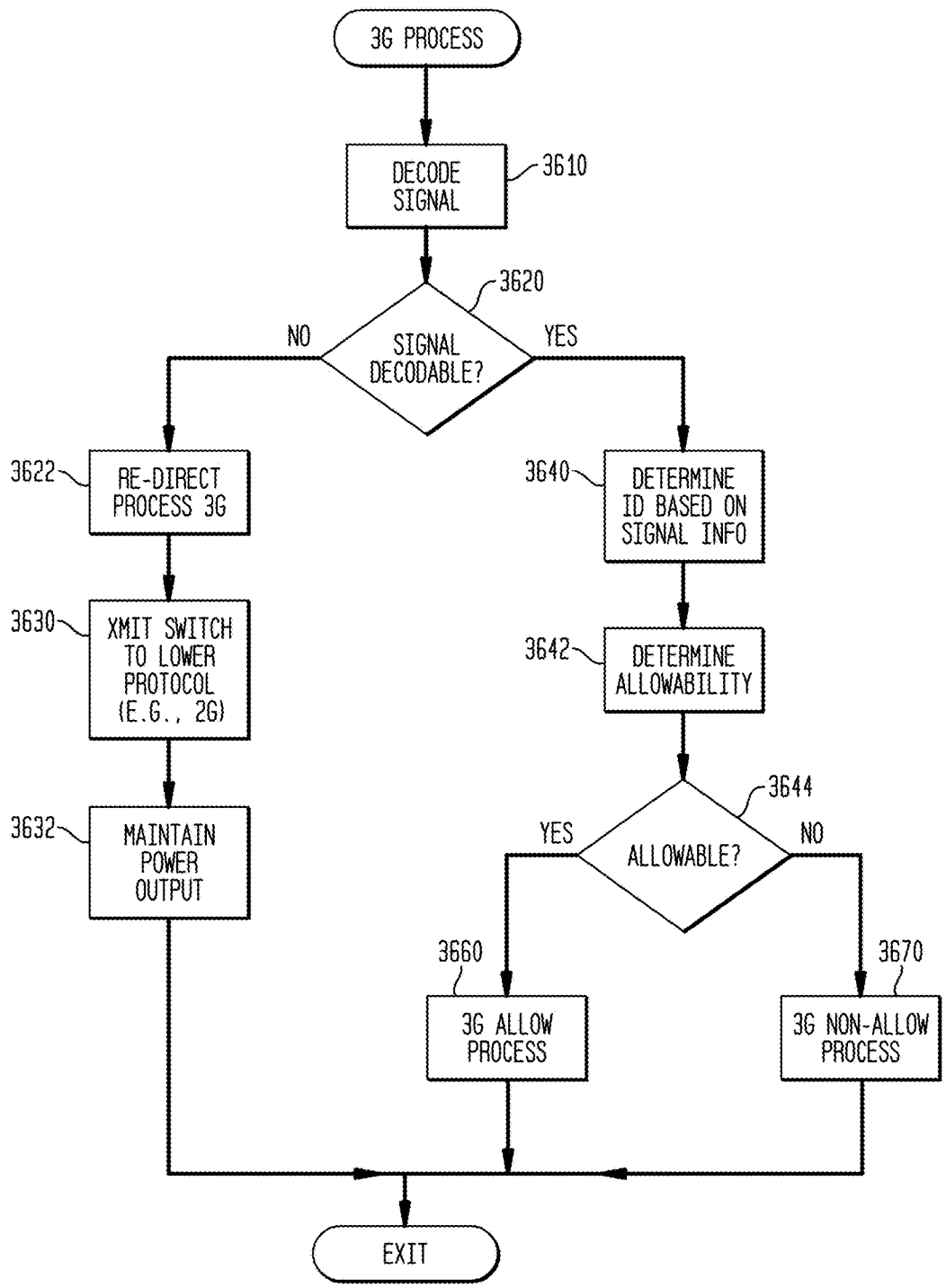
Figure 36B:
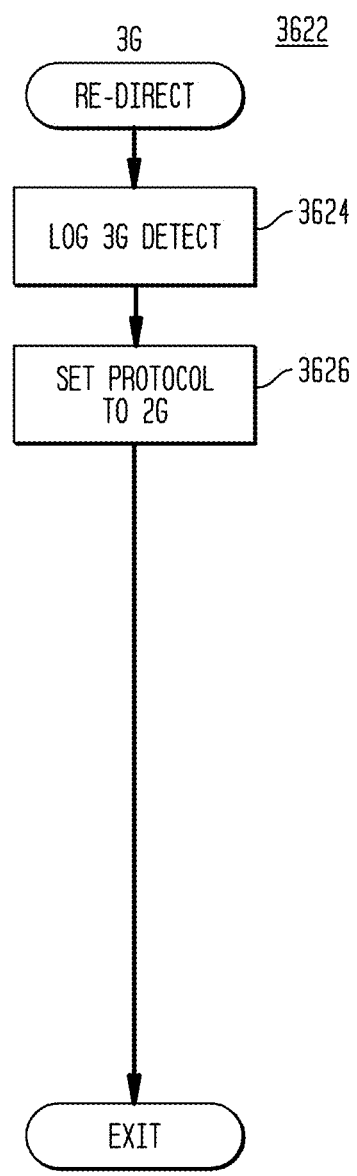

FIG. 36B illustrates a flow chart of an exemplary 3G re-direct processing (block 2622) wherein the detection of the 3G signal is logged at block 3624 and a protocol command is established which directs the wireless device to operate at a lower protocol (e.g., 2G) at block 3626.

FIG. 36C illustrates a flow chart of an exemplary 3G non-allowed processing (block 3670) wherein at block 3672, the wireless device is in one aspect of the invention, held on to the current channel and prevented from connecting to the base station. In another aspect of the invention, the wireless device is directed (i.e., re-directed) to a new hold channel. The new hold channel may be one that is not used by the base station. At block 3674, a current power output of the pseudo station is maintained in order to prevent the wireless device from accessing or connecting to the base station. At block 3676, 2G non-allowed processing (block 3550) is performed in order to monitor and manage the activity of the detected device.

Figure 36D:
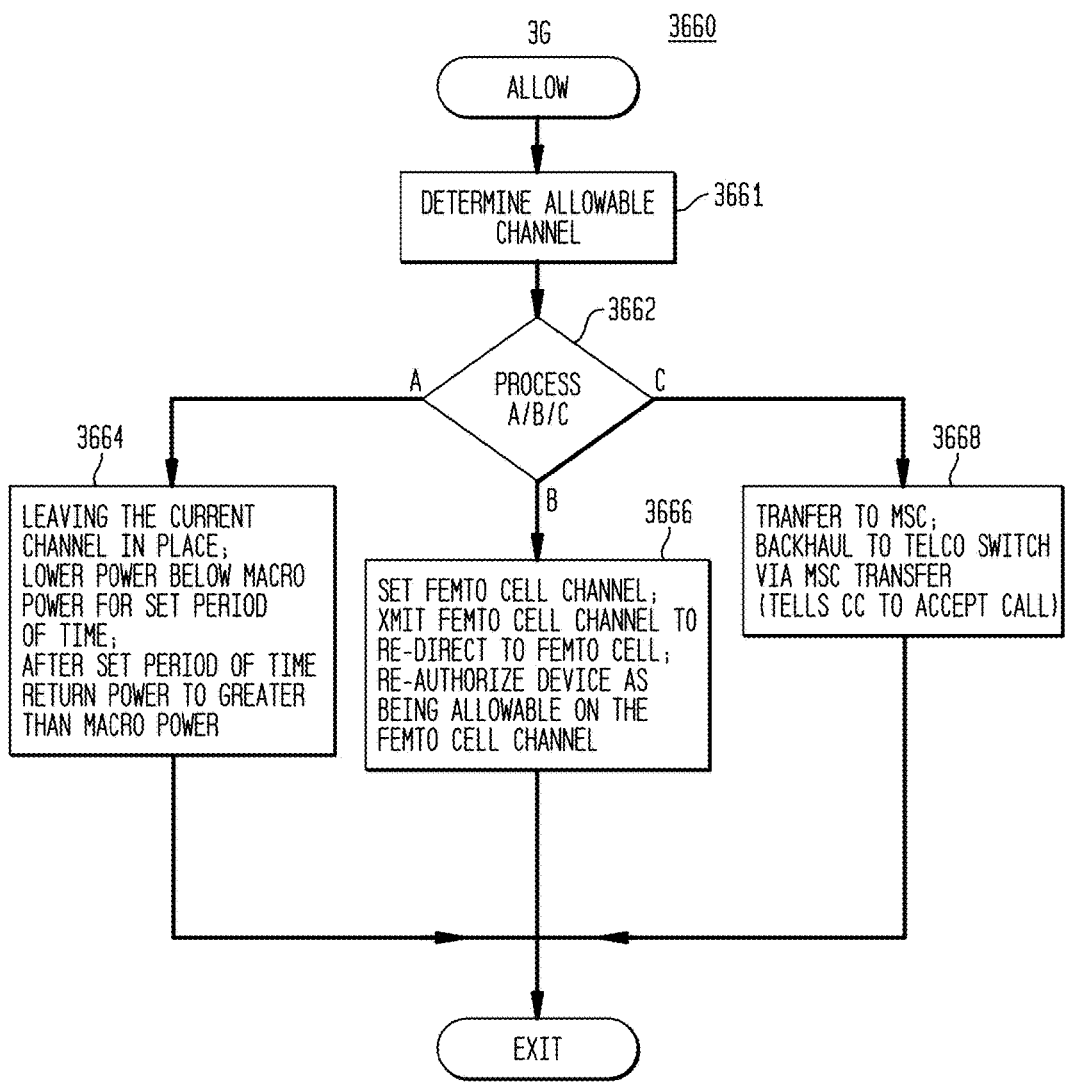

FIG. 36D illustrates a flow chart of an exemplary 3G allowed processing (block 3660). In this illustrated processing, allowed 3G processing determines an open or available channel at block 3661. At block 3662 a determination is made regarding a type of processing to be performed. In a first aspect, processing may continue to block 3664, where the wireless device is left on its current channel and the output power of the pseudo base station is lowered for a predetermined time. This causes the wireless device to lose contact with the pseudo base station and attempt to re-establish contact. In this case the wireless device detects the power of the base station as being the highest and connects directly to the base station. After the predetermined time has expired the output power of the pseudo base station is again raised to be greater than that of the base station in the area of interest.

Alternatively, the open channel may be associated with a Femto cell as previously discussed, and at block 3666, the wireless device receives a re-direct command to operate on the Femto cell open channel. A re-authorization of the devices on the Femto cell channel is again made to insure the devices on the Femto cell channel(s) are allowed devices.

In a further alternative aspect, the allowed wireless device may be transferred to a MSC, which backhauls the wireless device to an appropriate commercial carrier to accept the wireless device at block 3668.

Figure 37:
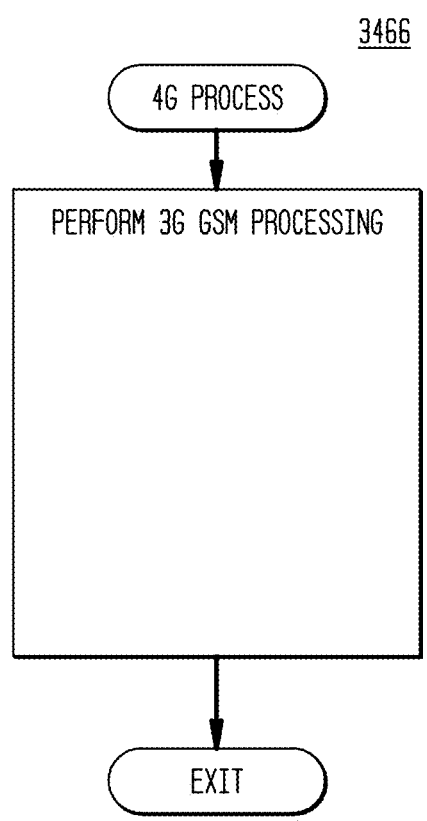
FIG. 37 illustrates a flow chart of an exemplary process for managing wireless communication device operating in a third aspect of a first mode in accordance with the principles of the invention.

FIG. 37 illustrates a flow chart of an exemplary process associated with 4G GSM processing (block 3466). As shown, 4G GSM processing is similar to 3G GSM processing and processing continues to block 3464.

Figure 38:
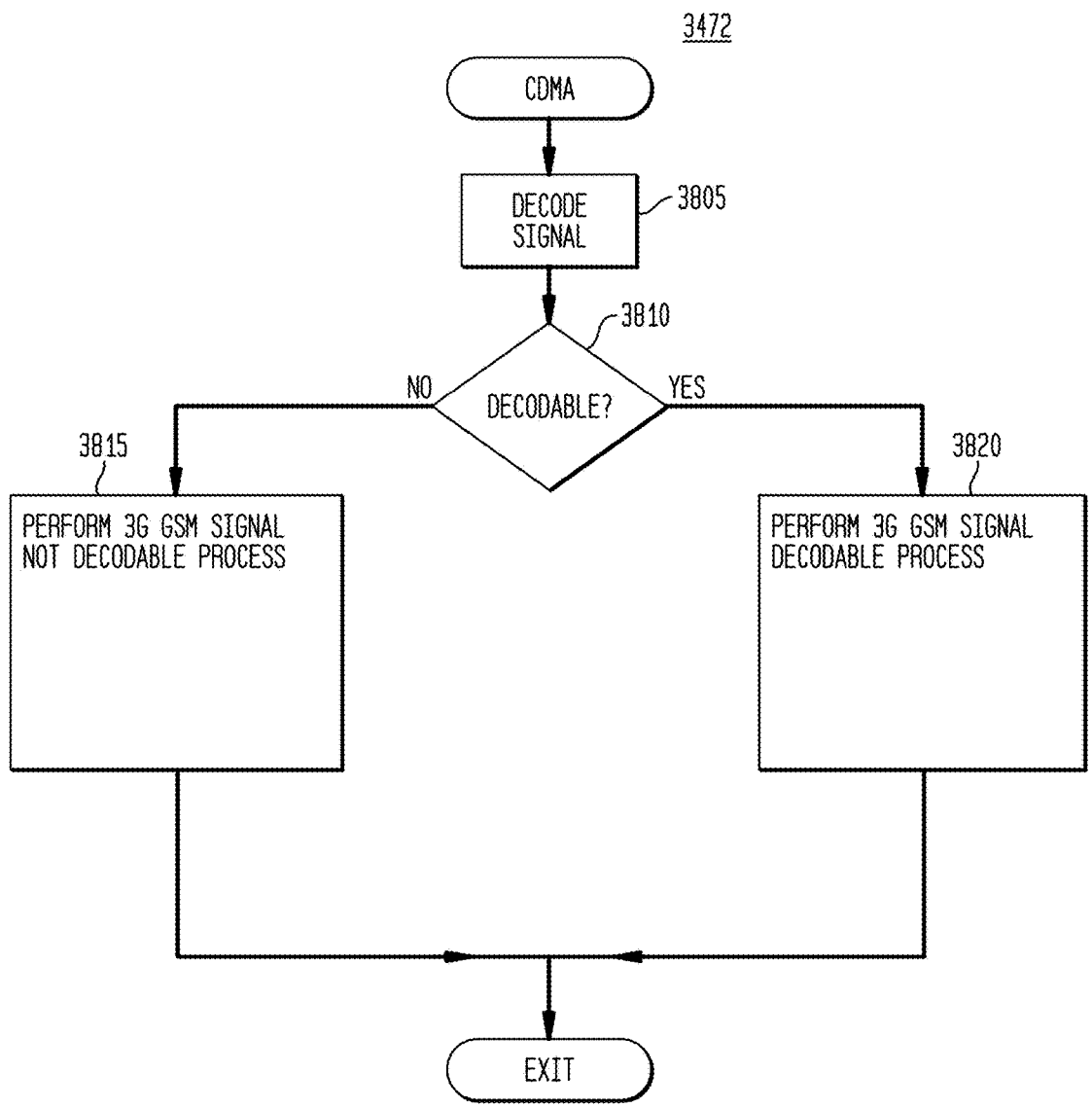
FIG. 38 illustrates a flow chart of an exemplary process for managing wireless communication device operating in a first aspect of a second mode in accordance with the principles of the invention.

FIG. 38 illustrates a flow chart of an exemplary process associated with CDMA (2G/3G) processing (block 3472). In this illustrated processing, the detected signal is decoded at block 3805. At block 3810 a determination is made whether the signal was decodable. If not then processing continues to block 3815, wherein processing similar to 3G GSM non-decodable signal processing is performed (i.e., NO branch at step 3620). However, if the signal is decodable, then processing continues to block 3820, wherein processing similar to 3G decodable signal processing (i.e., YES branch at step 3620) is performed.

Figure 39:
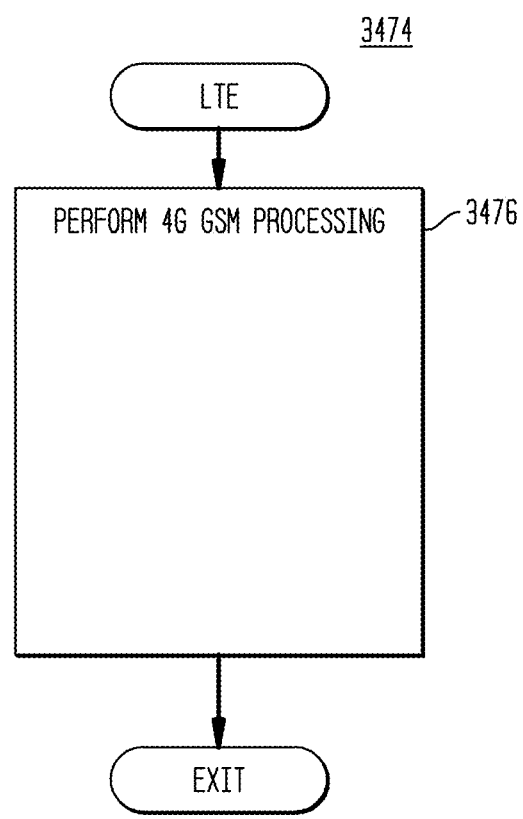
FIG. 39 illustrates a flow chart of an exemplary process for managing wireless communication device operating in a second aspect of a second mode in accordance with the principles of the invention.

FIG. 39 illustrates a flow chart of an exemplary process associated with LTE processing (block 3474) wherein LTE processing is similar to 4G GSM processing 3466.

In another embodiment of the invention, where the commercial carrier(s) does not provide non-encryption based carrier channels such as CDMA and/or GSM protocol, and the Managed Access system is required to provide an authorized cell phones capacity, there is presented several challenges: 1) determining whether the handset is authorized and/or unauthorized, choosing the methodology of providing the handset a connection to the carrier channel, 2) determining the methodology to verify and prevent unauthorized handset for getting on an authorized carrier channel; 3) preventing an unauthorized headset from dialing 911 and hopping on an authorized channel and the like.

In an embodiment of the invention available to connect the handset to the commercial carrier, (1) re-directing the authorized Handset to a Femtocell, where the encryption key process is performed by the commercial carrier system via the IP base connections to the MACRO switch.

In this embodiment of the invention to utilize the Femtocell solution requires providing an authorized list to the Femtocell, and where necessary, disabling the 911 feature so that an unauthorized phone doesn't inadvertently find the femto cell channel and utilize the femto channel to facilitate a call.

In an embodiment of the invention to verify authorized cell phone and to provide the ability to make a call and/or receive a call via 3G/4G technology with an encrypted base hand set, the methodology includes providing the encryption keys (K1) to the MAS system, by connecting the authorized handset to the commercial carrier via MAS MSC to Telco MSC and/or via a connection to carrier connection and the like.

In an embodiment of the invention, utilizing the commercial carrier's KI keys to authorize and authenticate the handset by, (transferring encryptions keys (Ki)) from the commercial carrier's network though the MAS network via a (MAS MSC, -TELCO MSC) and/or connecting to a specific commercial carrier channel, authenticating the handset, verifying the authorized functionality of the handset then utilized the mythologies such as sweeping the UMTS and/or LTE channel, Up/down signal methodology, transferring said handset to an open TELCO channel (UNDER the MAS) then at a set interval, raising the MAS power on that (authorized) Commercial channel with a MAS like Channel and then verifying all handsets on said channel are all authorized, if an unauthorized handset is found, move the unauthorized handset to the UMTS/LTE hold channel then release the channel back to the MACRO by lowering the power on the MAS channel covering the "Authorized channel" and then process the authorized handset accordingly and the like.

In an embodiment of the invention, setting parameter of the protocols provide a methodology to hold on to an unauthorized handset under the MAS, these include but are not limited to setting neighbor list or voiding out neighbor lists, setting GSM speech setting or not setting TCH and PDCH to dynamic mode, setting BTS for four dedicated TCH channels and three dynamic setting the TCH/PDCH channels, setting the LAC-RAC setting the BSIC, setting the RxLevMin level, setting the Penalty Time and setting the Cell Reselect Hysteresis setting and the like.

In an embodiment of the invention, to eliminate the issuance of KPI's and dropped call and Missing Neighbors, setting the commercial carrier parameters to a Roaming carrier and/or test carrier channel setting which is not on the commercial carrier channel and not a legitimate in call handoff will remove the issuance of KPI's and dropped call and Missing Neighbors alert and the like.

The challenge in capturing cell phones and/or other wireless communication devices, is covering all the channels of the TELCO (i.e., Telecommunication Company, Commercial Carrier, Mobile Communication Provider, etc.), on each of their broadcasting frequency bands and being able to communicate and attract each a cell phone to a Management Access System (i.e., MAS) in accordance with the principles of the invention.

Currently all handsets or mobile devices have the capability to communicate on a plurality of protocols; some requiring encryption keys and some which do not require encryption keys. For example one technology referred to as GSM (Global System for Mobile communications, is utilized by carriers such as ATT and T-mobile and a second technology, referred to as CDMA is utilized by carriers, such as Verizon, Sprint, US cellular and C-Spire. AT&T and T-Mobile cell phones have the ability to communicate as a 2G Phone using the GSM Protocol (2G), a 3G Phone using the UMTS protocol (3G) and also as a 4G phone using the LTE protocol (4G). Verizon, Sprint, Us Cellular and C-spire cell phones have the ability to communicate as a 2G/3G Phone using the CDMA Protocol and as a 4G phone using the LTE Protocol.

The challenge and this invention lays out a set of methodologies and processes which allows the MAS system to attract, capture, and control all cell phones within a specific geographical area on all frequency bands, covering all protocols on all carrier channels, with and without the use of encryption keys, while providing authorized and 911 calls and monitoring all unauthorized calls.

In an embodiment of the invention, for each given protocol/standard (e.g., second generation (2G), third generation (3G), fourth generation LTE and/or UMTS (4G)), utilized by the common or commercial carriers (e.g., Verizon, T-Mobile, Sprint, AT&T) depending on the preference of the client, a specific methodology is used to process and control a mobile device or handset.

Figures 1, 40:
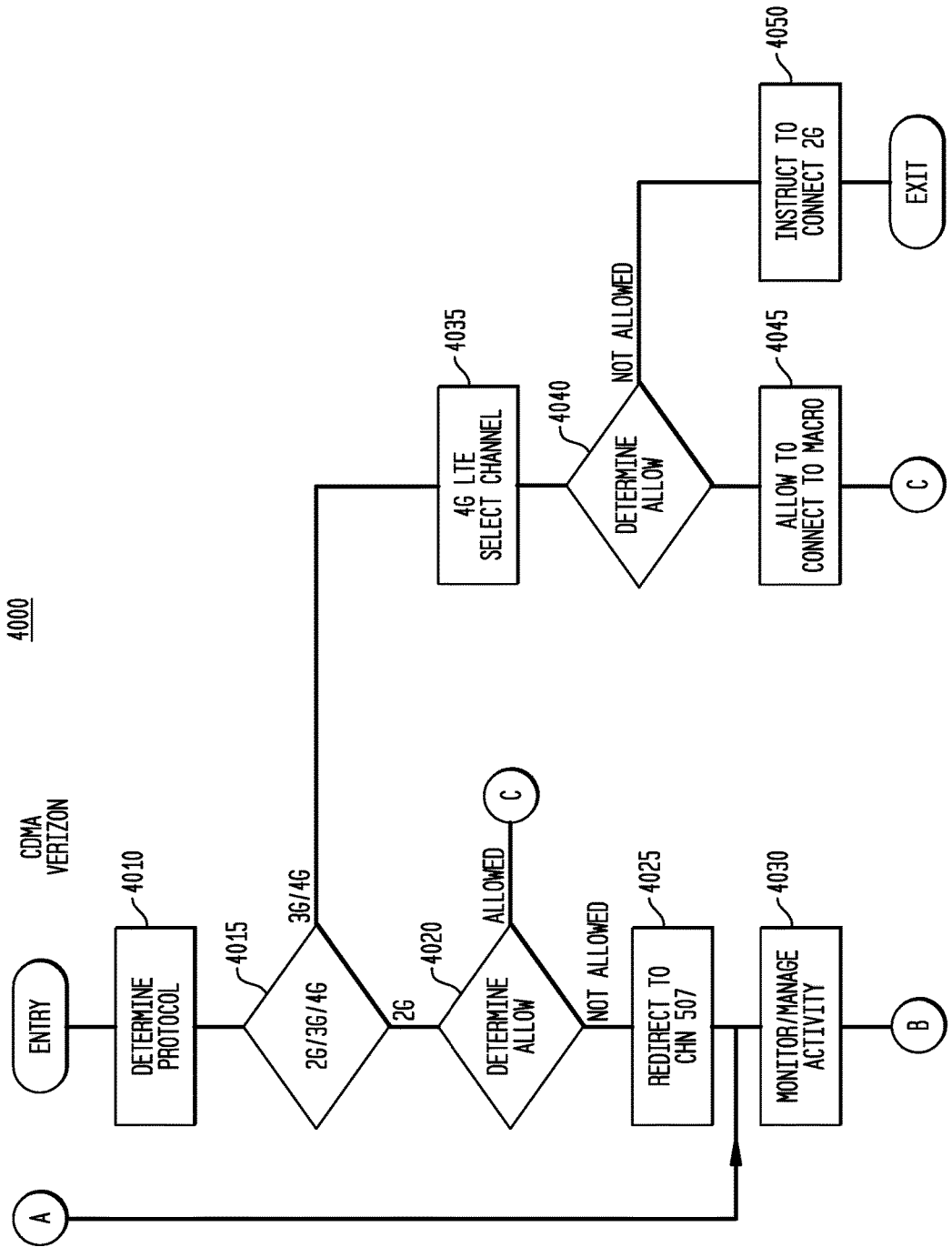
FIG. 40 illustrates a flow chart of an exemplary process for managing wireless communication device in accordance with the principles of the invention.
Figures 2, 40:
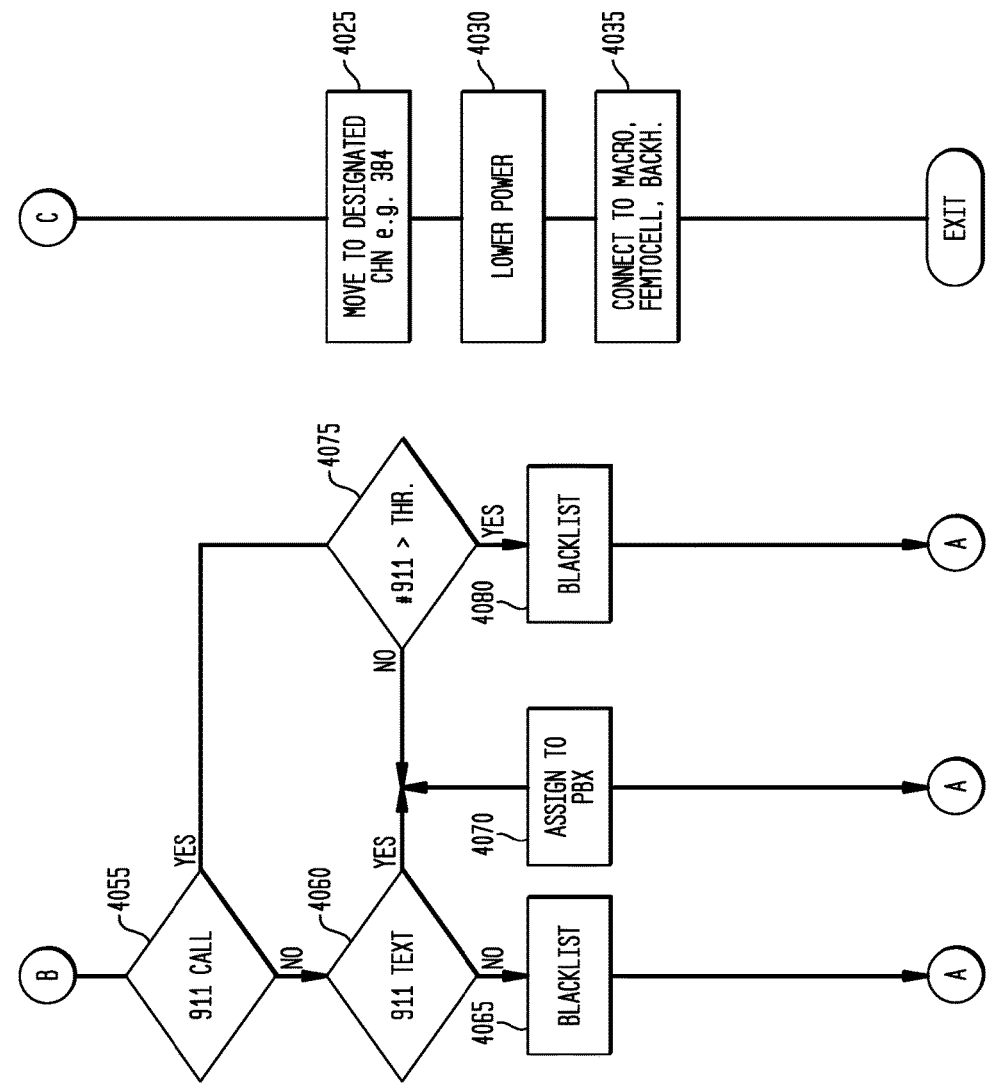
Figures 1, 41:
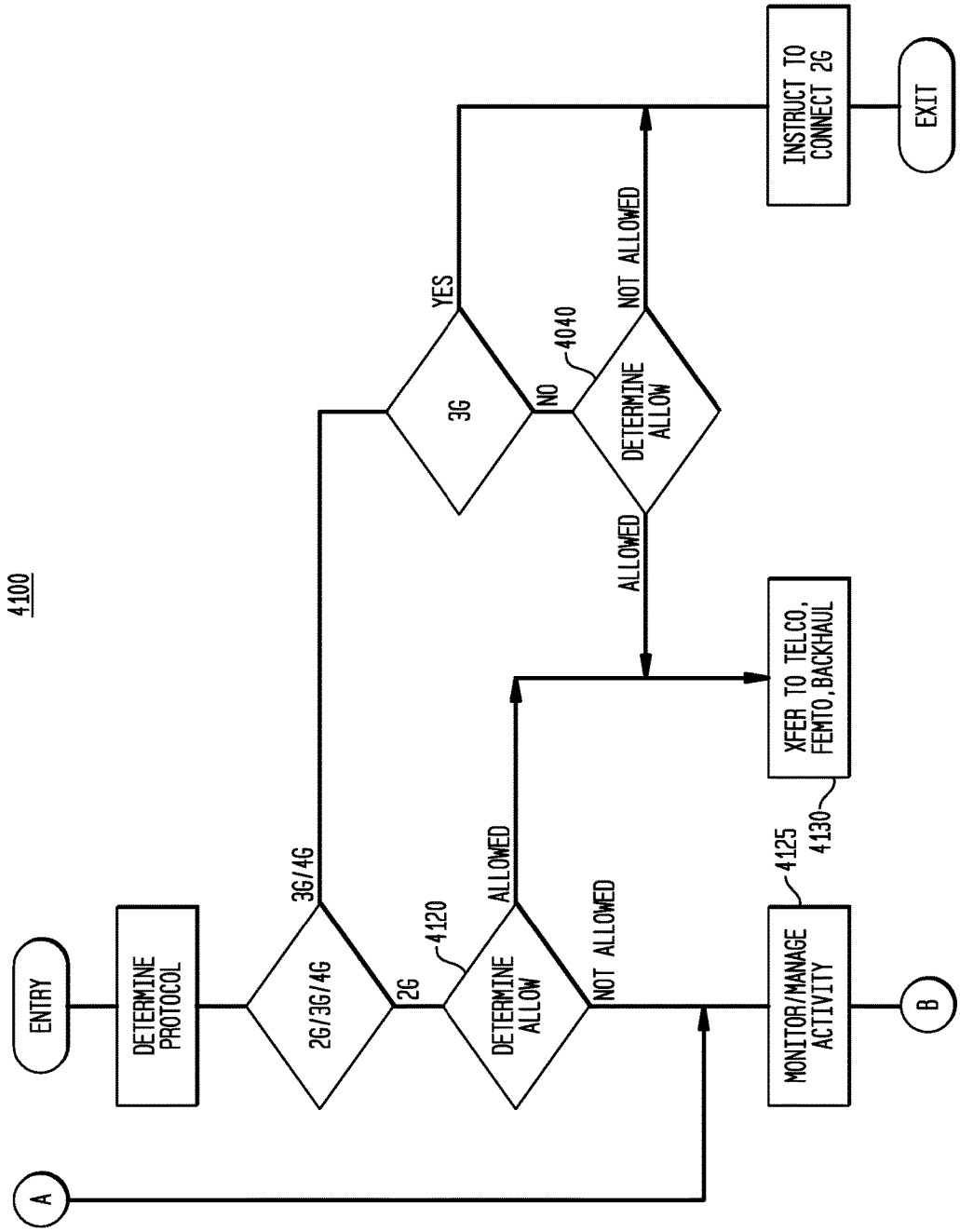
FIG. 41 illustrates a flow chart of an exemplary process for managing a wireless communication device in accordance with the principles of the invention.
Figures 2, 41:
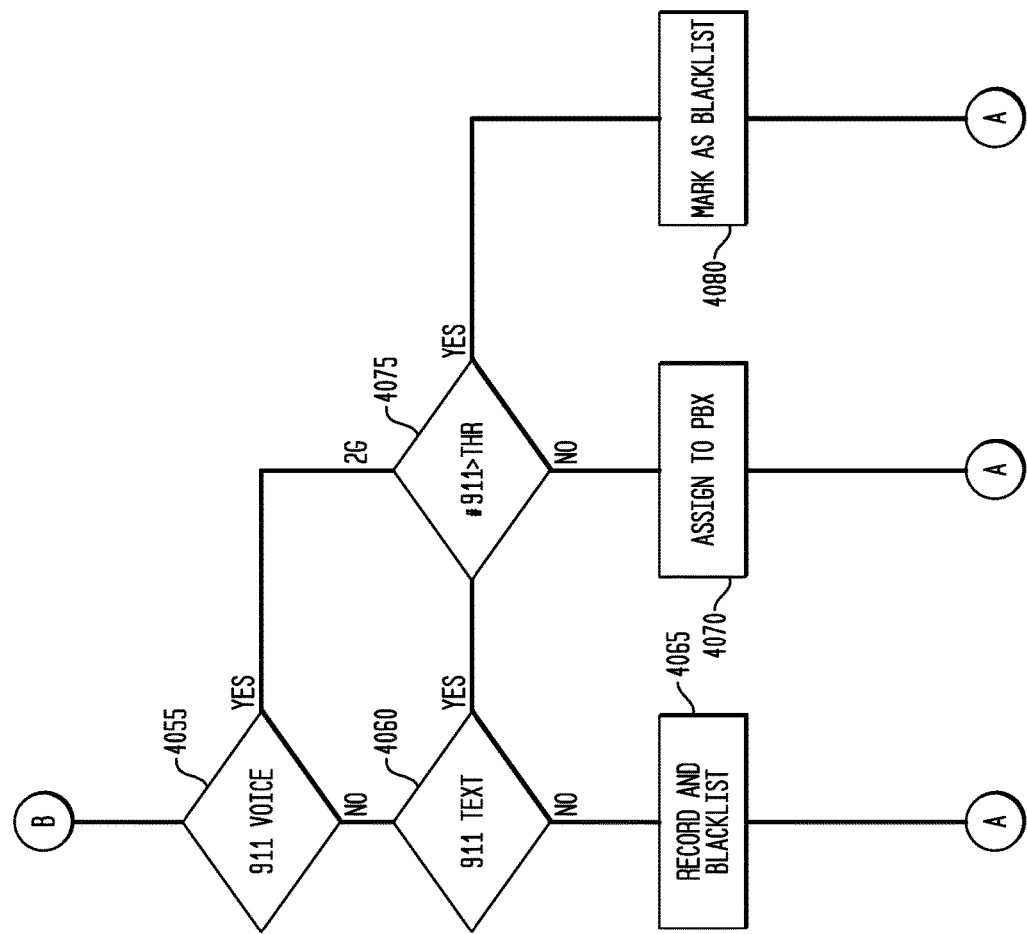

In the invention shown in FIGS. 40 and 41 exemplary processing associated with the detection, capture and authorization process associated with specific commercial carriers and allocation of carrier channels are shown. In these exemplary embodiments of the invention, redirection to MAS (Mobile Access System) channels, playback coverage channels, blocking channel, backhaul and switching methodologies of authored and unauthorized handsets are further shown.

For example, for a Code Division Multiple Access (CDMA) technology, which is currently used by commercial carrier such as Verizon and Sprint, for the capture of a 2G/3G/4G capable cell phones (see FIG. 40, 4000), the system in accordance with the present invention (hereinafter referred to as a Managed Access System (MAS)), transmits a dominate signal strength of the control channel associated with the common carrier, wherein the dominate signal strength has generally a received signal strength within a designated area that is at least 7 db greater than the signal strength provided by the commercial carrier within the designated area. In addition, the MAS provided signal provides a better Ec/Io (Energy carrier/interference) characteristic depending on the parameter set by the specific CDMA commercial carrier. In accordance with the principles of the invention, a handset or mobile device within the designated area is under the coverage of the MAS and is attracted to the a pilot channel (e.g., 384), wherein the MAS detects the handset and communicates and connects the handset to the MAS 384 radio. The MAS determines whether the handset is an authorized or unauthorized handset. If the handset is unauthorized, the MAS directs the handset to a second channel. In an exemplary embodiment of the invention, the second channel may represent channel 507. The detected or captured handset is then monitored for any activity. In dependence upon the regulations imposed by the FCC (Federal Communication Commission, Federal and State laws regarding communications and/or customer requirements, the MAS provides an audio message of all attempted voice calls and an SMS (Small Message Service) message response for every message attempted. The MAS may also provide a connection to the PSAP (Public Service Answer Points) via a SIP and/or a redirection to the MACRO (e.g., a base station associated with a commercial carrier) to complete a 911 call. In specific cases, the MAS may limit the number of 911 attempts (FIG. 40, 4055, 4060, 4065, 4070, 4075, 4080).

In the exemplary embodiments shown in FIG. 40, if the handset is determined to be authorized, (4020) the hand set is directed to stay on or move to channel 384 (4025) and the transmitted power associated with the 384 channel is lowered (4030) to a value such that the received signal strength within the designated area is lower the received signal strength associated with the commercial carrier. This allows the handset to attach to the signal provided by the commercial carrier, as the commercial carrier signal strength in the area is greater than the power of the MAS in the area. (4035) In another aspect of the invention, the authorized feature can also be connected to the Macro via a SIP (Session Initiation Protocol) connection, can be redirected via a femto call or to a back haul switch via to the commercial carrier. The authorized determination can be redundantly checked, via a femto cell system parameter or by the commercial carrier HLR/VLR (Home Location Register/Visitor Location Register).

In a preferred embodiment of the invention the MAS provides a radio set on a frequency and parameter of the commercial carrier, and/or setup to attract all handsets of a specific carrier and/or protocol/standard to cover the LTE (4G)/UMTS (3G) channel(s) of the commercial carrier. In this aspect of the invention, the MAS are connected to the commercial carrier's database to obtain the encryption keys to communicate with the handset attracted to the MAS. Alternatively, the MAS is provided a set of encryption keys of the phones identified to be under the MAS coverage area (4015). If the handset is determined to be authorized (4040) the handset may be redirected (4045) to the commercial carrier radio channel, or redirected to the commercial carrier network via a switch or via a femto cell channel or via a MSC (Mobile Switching System) to MSC (Mobile Switching System) interconnection or via a SS7 (Signalling System No. 7) switch or similarly known conventional transfer means. If the handset is determined to be unauthorized, the handset is held on the capture channel or moved to a hold channel to maintain control of the handset and to monitor its attempted activities. In another embodiment of the invention, where the encryption keys are not provided or available, the MAS provides a radio transceiver on the frequency and parameter of the commercial carrier, and setup to attract all handset of a specific carrier and/or protocol/standard to cover the LTE (4G) channel(s) of the commercial carrier, however, without encryption keys, the LTE communication handshake cannot be accomplished, and the MAS will then re-direct the handset to a lower protocol (4050) which does not require encryption keys to communicate. In a preferred situation the handset, even without encryption keys provides its ESN and/or Pseudo ESN and/or IMSI and the authorized/unauthorized determination can be made. In such a case the authorized handsets can be redirected to the commercial carrier radio channel, or redirected to the commercial carrier network via switch or via a femtocell channel or via a MAS MSC (Mobile Switching Center) to Commercial Carrier MSC (Mobile Switching Center) interconnection or via similarly known conventional transfer means. In such a case, If the handset is determined to be unauthorized, the handset will be redirected to a CDMA protocol that does not require encryption keys and is held on the capture channel and/or moved to a hold channel to maintain control of the handset and to monitor its attempted activities.

If the MAS possesses the ability to communicate with the handset via the encryption keys, the MAS can hold the handset on the channel it has acquired by redirecting the handset to operate an a designated channel that lacks any ability to communicate with a commercial carrier (i.e., a hold channel). The hold channel may be a channel that is not associated with the commercial carrier, for example. When the mobile device is operating on the hold channel, the communication activity of the handset may be monitored to determine factors such as number being called, content of voice message, recording of text message, etc.

In a situation in which the encryption keys were not provided to the MAS, the handset can be redirected to a different standard/protocol (e.g., 3G to 2G) (4050) and reacquired with the protocol of a 2G system. In this case the communication of the handset may be monitored on a channel, using a protocol, in which the handset can communicate with the MAS. See FIG. 40.

In an embodiment of the invention, shown in FIG. 41 (4100), processing steps associated with the MAS to control of 2G (GSM), 3G (UMTS, W-CDMA) and 4G (LTE) protocol capable handsets are shown. In these exemplary embodiments, one modification from the previously discussed methodologies is to provide a dominant GSM channel (dominant in the terms of greater received signal strength in a designated area) and detect, capture and attract all handset within the designated area onto the GSM control channel. Processing steps similar to those previously described with regard to authorization (allowed, not allowed), number determination (911), etc. are performed to manage and monitor unauthorized/and authorized handsets and the like. As discussed previously, when the MAS has the encryption keys for the handsets associated with the commercial carrier and the protocol employed by the commercial carrier, the MAS has the ability to communicate with the handsets, the MAS controls the handsets on channels it has the ability to communicate with. FIG. 41 illustrates the exemplary processing associated with an authorized connection methodology associated with a commercial carrier and also processing associated with an emergency number (i.e., 911) connection methodology including landline connections, for example.

Thus, in accordance with the principles of the invention, where the MAS is covering UMTS channels and the encryption keys are not available, the UMTS handsets are actively pushed to a 2G GSM channel of the MAS for processing (4120, 4130), and as previously discussed in situations in which the IMSI and IMEI is obtained, and the authorized handset are determined, the authorized handsets can be redirected to the commercial carrier radio channel, or redirected to the commercial carrier network via switch or via a femtocell channel or via a MAS MSC (Mobile Switching Center) to Commercial Carrier MSC (Mobile Switching Center) interconnection or via similarly known conventional transfer means. However, If the handset is determined to be unauthorized (4120), the handset will be redirected to a GSM protocol which does not require encryption keys and is held on a capture or hold channel and/or moved to a hold channel to maintain control of the handset and to monitor the attempted activities of the handset (4125).

Returning to the embodiments of the invention described in FIGS. 34-39, these figures describe and outline the exemplary processing associated with the detection, capture and control of handset depending of the parameters set forth by the underlying commercial carrier (e.g., Verizon, AT&T) and/or set forth by law and regulation. These figures describe and outline some of the aspects of the MAS system including detection, handshake, band identification, carrier identification, processes depending and Commercial Carrier network core implementation, encryption setup and deployment parameters, protocol and handset characteristics and standards.

Referring again to FIG. 34, FIG. 34 illustrates exemplary processing steps in accordance with an embodiment of the invention to detect, capture and control a wireless communication device. (3400). At step 3410, a signal transmission is detected. At step 3420, identification of the signal and the signal bandwidth of the transmission is determined. At step 3430, the processing determines the type of protocol of the transmission (e.g., 2G, 3G, 4G, LTE, UMTS). At step 3440, the processing identifies the commercial carrier based on the bandwidth type. At step 3430, the processing determines the process path depending on the carrier type. At steps 3462, 3264, 3466, 3472 and 3474 the processing determines, which of a plurality of commercial carrier/protocol specific processing steps is to be employed in order to continue processing the detected signal transmission from the wireless communication device.

Referring again to FIG. 35A, FIG. 35A illustrates exemplary processing steps in accordance with an embodiment of the invention to capture and control a wireless communication device operating using a 2G protocol. In this exemplary aspect of the invention, step 3510, the processing decodes the signal to obtain characteristics of the transmission signal and of the wireless transmission device that may be included within the transmission signal. At step 3520, the processing determines the identification of the wireless communication device (mobile device, handset, etc.) based on the signal information transmitted in the transmission signal. At step 3525, the processing determines the allowability of the wireless communication device. The allowablity of the device depends on a set of pre-determined parameters as has been previously described. At step 3530, the processing determines a next set of step of processing steps depending on the determined allowability of the wireless communication device. At step 3535, for example, processing associate with allowable 2G wireless communication device is initiated (refer to FIG. 35B). At step 3537, the processing determines a channel upon which the wireless device may be re-directed to so that the device may communicate with the associated commercial carrier (i.e., Macro). However, if the processing indicates that the device is not allowed, then processing is directed to step 3550 wherein the non-allowable 2G protocol is initiated (refer to FIG. 35C). At step 3580, the processing performs steps to retain control of the device by providing control signals to direct the device to operate on a hold channel or maintain the signal power at a current power level to prevent the device from connecting to the commercial carrier or provide commands to the device to alter the ability of the device to transmit any information.

Returning to FIG. 35B, FIG. 35B illustrates exemplary processing steps in accordance with an embodiment of the invention to capture and control a wireless communication device for a allowed 2G processing. In this exemplary aspect of the invention, an open or available channel is determined at step 3536. At step 3538, a determination is made regarding a particular processing to perform is made. Based on the desired processing the wireless device may be directed to the open channel associated with the commercial carrier (step 3540), redirected to the open channel of a Femto cell associated with the MSC (step 3544)), or assigned to be directed to a backhaul switch that may be associated with the MSC (step 3548).

Returning to FIG. 35C, FIG. 35C illustrates exemplary processing steps in accordance with an embodiment of the invention to capture and control a wireless communication device for a non-allowed 2G processing. In this exemplary aspect of the invention, step 3550 starts the non-allowable 2G process, wherein at step 3552, the processing initiates a monitoring and maintaining process of the 2G held device, wherein the communication of the device may be recorded and/or managed. At step 3554, the processing determines the attempted activity of the wireless communication device (e.g., voice, text, emergency call). At step 3556, processing is directed based on the type of communication or action being attempted the wireless communication device. That is the communication or action may be one of: an attempted voice call, an attempted 911 call and an attempted text call (e.g., data call, data push attempt, and application connection attempt). At step 3558 processing directs and connects the wireless communication device to a PBX servicer to record the communication and receive a recorded message regarding the attempted voice communication. At step 3560, the processing records the received text message and provides a text response to the wireless communication device in response to the attempted text message. At step 3562, the processing determines a number of attempted 911 calls and redirect the processing to determine a number of 911 call attempts. At step 3564, the processing determines whether the number of 911 call attempts exceeds a designated value (e.g., 5) and directs the wireless communication device accordingly. At step 3566, the number of 911 attempts is less than the limit, thus, the processing connects the wireless communication device to a landline connection for subsequent connection to a local PSAP 911 operator. Otherwise at step 3568, the processing marks the wireless communication device as attempting too many calls as black listed and proceeds with a set of instruction set for wireless communication devices that are blacklisted. For example, the wireless device may be inhibited to make 911 for a predetermined period of time (e.g., a day). Alternatively, the number of 911 calls may be monitored on a per time basis wherein the limit is based on a per time bases (e.g., number of 911 attempts/hour, or/day).

Returning to FIG. 36A, FIG. 36A illustrates exemplary processing steps in accordance with an embodiment of the invention to capture and control a wireless communication device, wherein at step 3464 3G protocol process is initiated. At step 3610, the processing decodes the 3G wireless transmitted signal. At step 3620, the processing determines whether the signal is decodable and also determine whether the system can properly communicate with the wireless communication device. The processing redirect the wireless communication device accordingly. At step 3622, the processing re-direct the 3G capable wireless communication device to a decodable protocol and also to a protocol that allows for the proper communication capability with the wireless communication device. Furthermore, the system at step 3630 directs to wireless communication device to a proper communication capable protocol (e.g., to a lower protocol like a 2G un-encrypted protocol). At step 3632, the processing sets and or maintains the signal level of the re-directed channel to a power level and/or signal setup wherein the wireless communication device is connected to the new channel. At step 3640 the processing determines an Identification of the wireless communication device based on the decoded information. At step 3642 the processing determines the allowability of the wireless communication device depending on a pre-determined set of parameters. At step 3644 the processing determines the allowability of the wireless communication device and redirects the processing according to the determined allowability. At step 3660 the processing starts the 3G allow processing (FIG. 36B). At step 3670 the processing starts the 3G non-allow processing (FIG. 36C).

Returning to FIG. 36B, FIG. 36B illustrates exemplary processing steps in accordance with an embodiment of the invention to, wherein, at step 3622, the processing starts the re-direct process of a 3G Protocol wireless communication device that cannot be decoded. At step 3624, the system log the 3G detection and at step 3626 sets the protocol to a 2G wireless communication device.

Returning to FIG. 36C, FIG. 36C illustrates exemplary processing steps in accordance with an embodiment of the invention wherein at step 3670 the 3G non-allow process is initiated. At step 3672 the processing determines hold channel parameters and preferences. That is the channel, not available to the commercial carrier, that the wireless communication device should be held or, alternatively, re-directed to a new hold channel based on the system configuration. The processing further determines on which channel to keep a non-allowed wireless communication device, depending on a pre-determined set of parameters. The pre-determined parameters may include channel capacity, wireless communication device location, wireless communication device ownership, wireless communication device relationship to another wireless communication device and the like. At step 3674 the processing determine the proper signal parameters to maintain control of the wireless communication device. At step 3637 the processing performs the processing of the 3G wireless communication device, similar to the steps for processing a 2G wireless communication device which is also not allowed.

Returning to FIG. 36D, FIG. 36D illustrates exemplary processing steps in accordance with an embodiment of the invention wherein at step 3630, s 3G allow process of wireless communication device is initiated. At step 3661 the processing determines a proper allowable channel and processing the wireless communication device so that it may (in this example make and receive call, text messages and data). At step 3662, the processing outlines three possible processes for the wireless communication device to achieve a connection with the commercial carrier such that the wireless device may make and receive voice communication (calls), text messages and data. At step 3664 the processing leaves the wireless communication device on the current channel and lowers the signal parameters to allow the wireless communication device to communicate with an available channel associated with the commercial carrier. For example, the power may be lowered for a set of period of time, which is set to be long enough for the wireless communication device to acquire communication with the commercial carrier channel and short enough so that non allowed wireless communication devices are retained captured and/or be recaptured and re-directed to the appropriate hold channel as previously described. At step 3666 the processing re-directs the wireless communication device to a Femto cell channel, and in this example, the Femto cell may be set to re-authorize the wireless communication device according to pre-determined set of parameters, to insure that a non-allowed wireless communication device is not inadvertently allowed to continue communication with he authorized Femto cell channel. At step 3668 the processing transfers the wireless communication device via the MSC and/or the SS7 connections through the Telco switch and allows the macro connection to the commercial carrier and the like.

Returning to FIG. 37, FIG. 37 illustrates exemplary processing steps in accordance with an embodiment of the invention wherein at step 3466, 4G processing of wireless communication device is initiated. The 4G processing performs processing similar to that of 3G processing, previously described. 4G protocol utilizes parameters and protocols associated with the 46 protocol. However, the processing is similar to that of 3G.

Returning to FIG. 38, FIG. 38 illustrates exemplary processing steps in accordance with an embodiment of the invention wherein at step 3472 CDMA processing of wireless communication device is initiated. As illustrated, 3G processing performs a similar processing as previously described with 3G processing. In this case, 3G CDMA protocol processing includes its own set of pre-determined parameters, including, for example, encryption capabilities and the like. At step 3805 the processing attempts to communicate and decode the wireless communication device. At step 3810, the processing determines the decodability of the wireless communication device. At step 3815, the processing performs the 2G GSM/3G UMTS signal processing, as previously described, with regard to non-decodable wireless communication device. At step 3820, the processing, performs the 2G GSM/3GUMTS signal processing, as previously described, for a decodable wireless communication device.

Returning to FIG. 39, FIG. 39 illustrates exemplary processing steps in accordance with an embodiment of the invention wherein at step 3474, CDMA 4G LTE processing is initiated. As illustrated 4G processing performs similar processing as that of the 4G GSM based processing and/or the 3G UMTS (W-CDMA) utilizing its owns set of pre-determined parameters and the like, including for example encryption capabilities and the like. At step 3476 the processing performs the same steps for the CDMA base 4G LTE processes as was performed on a 4G GSM based wireless communication device, as previously described.

In a preferred an embodiment, where it is the intention is to deploy a Managed Access System (MAS) that is able to continuously maintain a known signal strength (e.g., 10 db) advantage over each commercial carrier's (e.g. Verizon, AT&T, Sprint, T-Mobile, etc.) signal in every inmate's cell. In most cases, to control and override out the signal transmitted by the commercial carrier, a signal advantage, in the order of 10 db, is desired to be maintained even as the commercial carriers add channels, add frequency bands, and increase signal strength.

Figure 42:
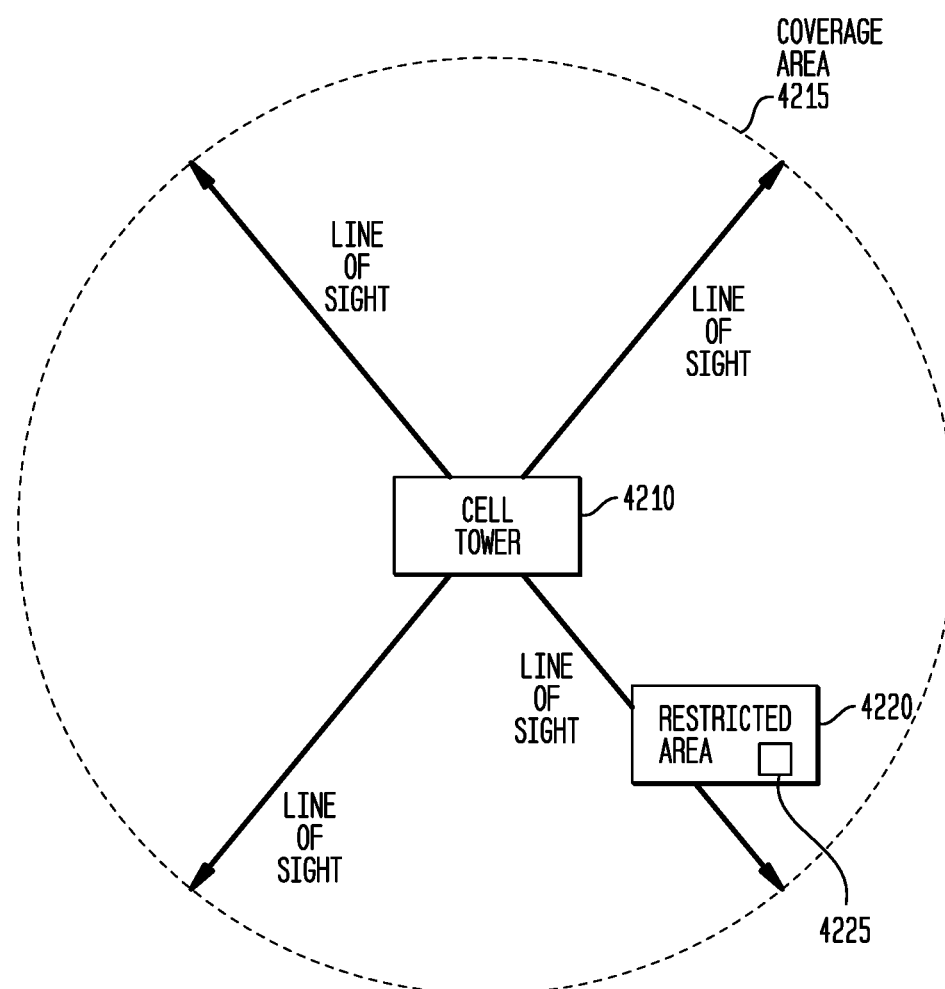
FIG. 42 illustrates Cell tower location and signal direction in relationship to Housing Units FIG. 43 further illustrates cell tower location and signal direction in relationship to housing units within a restricted area.

One of the major challenges is that the commercial carrier's cell tower antennas face directly at the windows for the housing units, as shown in FIG. 42. In this illustrated configuration, a cell tower 4200 in this example, has a known coverage area 4215. The cell tower is typically, 50 feet tall, and is located approximately at a center of the coverage area. The cell tower typically has a set of antennas facing toward the facility 4225 within the restricted are 4220. Thus, a managed access system (MAS) needs to maintain a signal strength in the restricted area that is greater than the cell tower's signals, for the MAS to work effectively.

Figure 43:
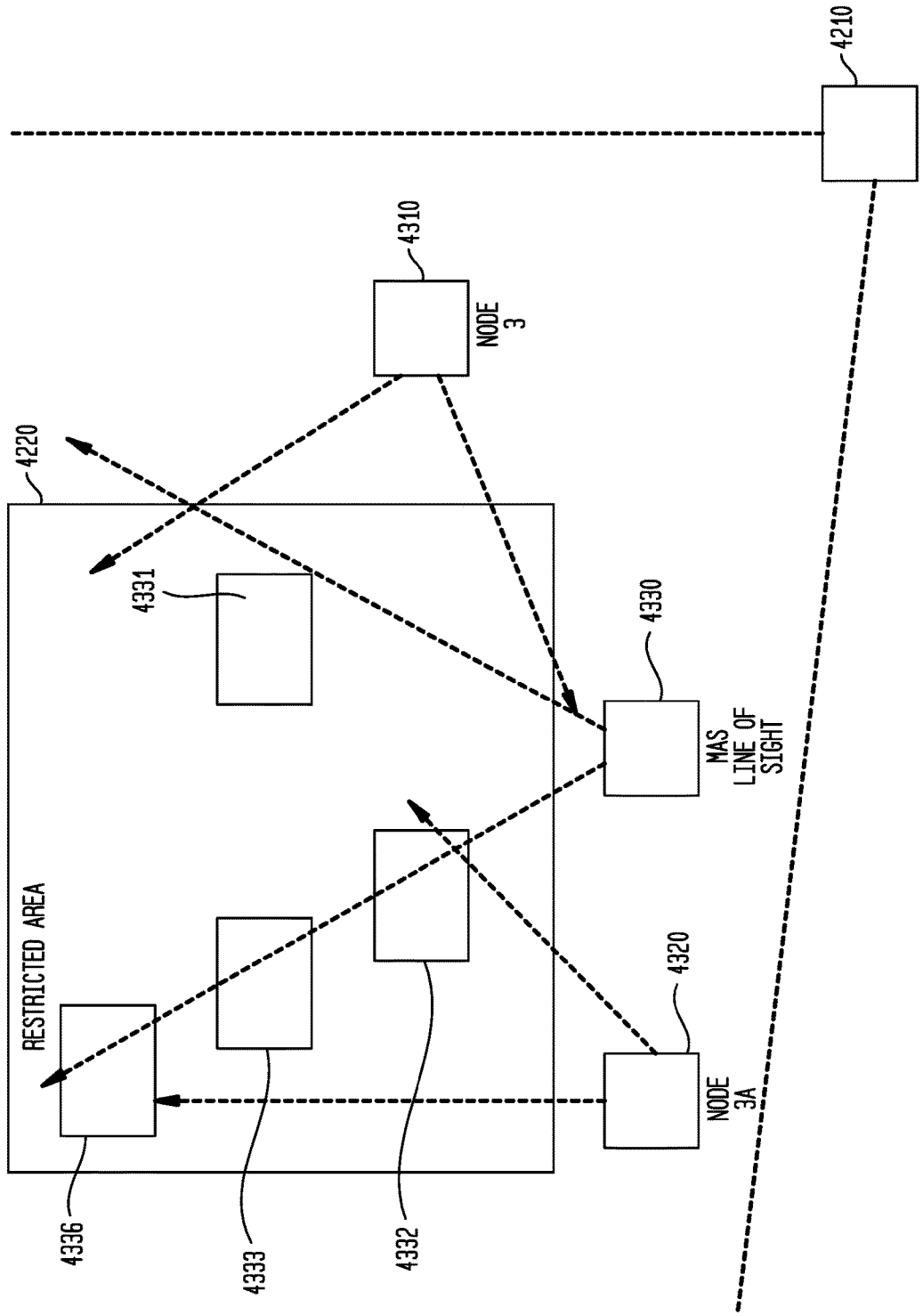

FIG. 43 illustrates an expanded view of the restricted area 4220 shown in FIG. 42. The lines emanating from the bottom right of FIG. 43 represent the signals coming from the commercial cell tower 4210. MAS Node 3 is located to one side of the buildings within the restricted area. The lines emanating from Node 3 represents signal coverage area of the restricted area 4220.

Node 3 is in the proper position to cover the right side and south face of the restricted area and maintains a greater signal than the signal coming from the commercial cell tower located southeast of the facility.

The commercial cell tower is 250 feet tall and has a direct line of site to the cell windows located on the east side of Building 4331. The antenna at Node 3, 4310 is 24 feet above the ground and the building is approximately the same height. Therefore, antennas of node 3, 4310 is blocked by the building 4331 and is unable to provide a direct line of site to Building 4334. Consequently, the antenna at Node 3 cannot provide the proper coverage to all of the cells located in Building 4331.

Figure 44:
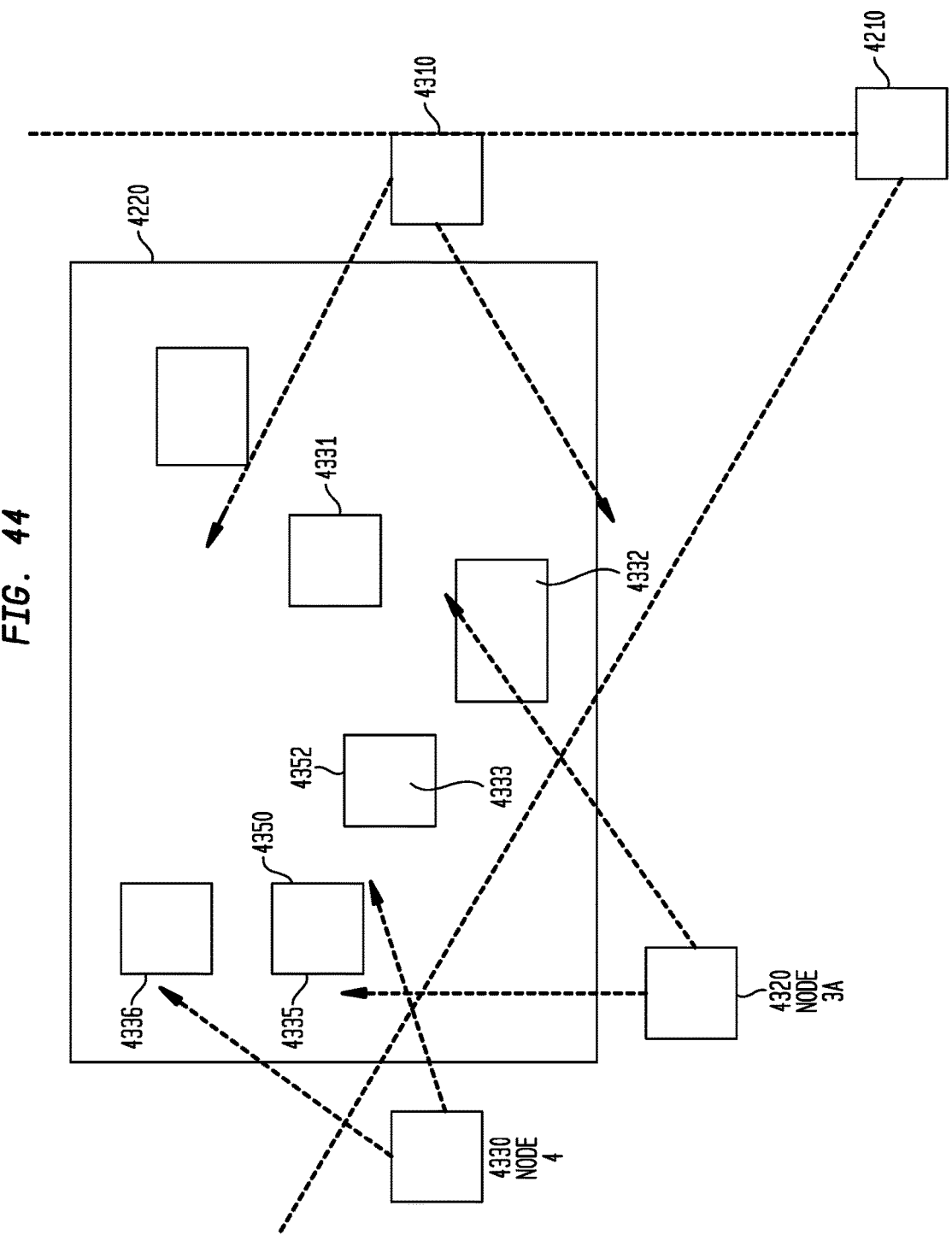
FIG. 44 further illustrates cell tower location and MAS antenna relation and signal direction in relationship to housing units and each other

Additionally, the commercial cell tower has a direct line of site to the cell windows located on the southeast side of Building 4331 (FIG. 44). Node 4 effectively provides coverage to the majority of Building 4336.

Figure 45:
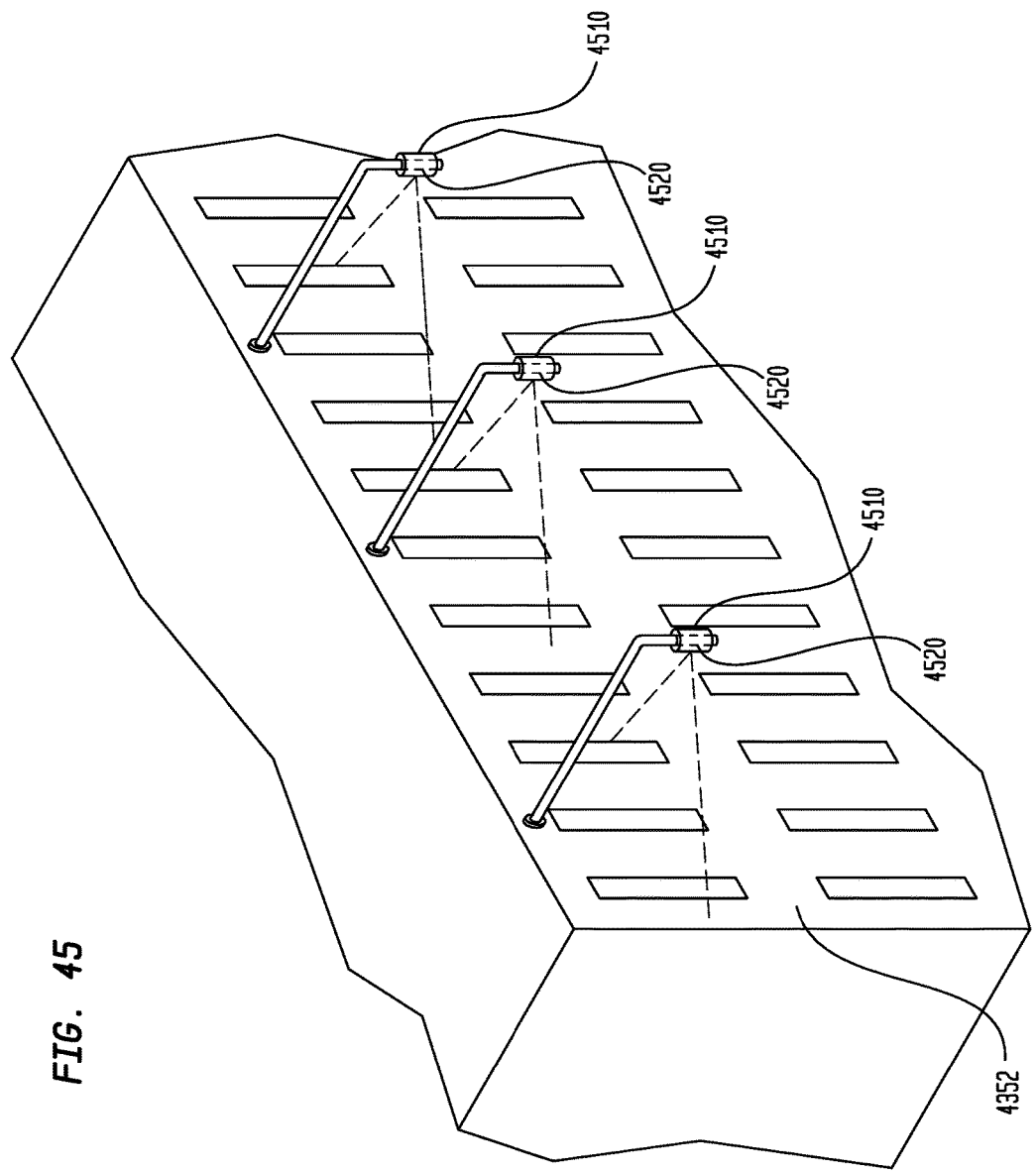
FIG. 45 illustrates a Mast arm on a building and an exemplary solution for managing wireless communication device(s) in accordance with the principles of the invention FIG. 46 further illustrates MAS Antenna locations and their relationship to MAS signals and Housing Units

In a second alternative solution, is to add a new node between Nodes 3, 4320 and 4, 4330 (see FIG. 44) provide overlapping coverage of buildings 4335 and 4336. For example Node 3A, 4320 provides full coverage to one side of building 4335, while node 4, 4330 provides full coverage of a second side of building 4335. However, even with the extra coverage area provided by the additional nodes, there still remains areas of coverage that do not maintain the desired increased signal strength. For example surfaces 4350 and 4352 in buildings 4335 and 4333, respectively, lack the proper desired coverage.

in one aspect of the invention, a mast arm antenna design provides each face or surface of every housing unit 4331, 4332, 4333, 4335, with uniform line of site and signal power. FIG. 45 illustrates an exemplary mast arm configuration, wherein at least one antenna 4520 is held suspended from the surface 4352, for example. In this case the antenna/transceiver combination 4520 is directed directly toward at least one opening (e.g., a window) within surface 4352.

The use of the mast arm configuration shown in FIG. 45 also provides an advantage in as the transmitted power of the antenna/transceiver requires significantly less transmit power (e.g., 25 dB) than the configuration shown in FIG. 44, for example, as the nodes 4310, 4320 and 43300 may be in the order of 450 feet away from the corresponding unit 4331, 4332, 4335, 4336.

This solution shown in FIG. 45 is further advantageous as it provides for modifications to be made as the commercial carriers to add towers, frequency bands, protocols, channels and/or increase/decrease signal strength. This new antenna coverage methodology corrects the short comings of the perimeter based antenna coverage solution which is shown in FIG. 44, for example.

In an alternative an embodiment of the invention, an in-building iDAS solution may be provided wherein the antennas/transceivers may be placed inside the housing units. This type of solution provides great results in dormitory setting but does not work in a cell steel door environment. For example, when the cell door is closed, the MAS signal from the internal antenna drops by significantly. Thus to cover a cell phone that is receiving a commercial carrier signal coming in the exterior cell window at −50 dB, the MAS, to provide coverage at least by 10 dB, is required to generate a channel signal at −18 dB. The solution would require high gain antennas and a greater than 20-watt node in every housing unit.

Figure 46:
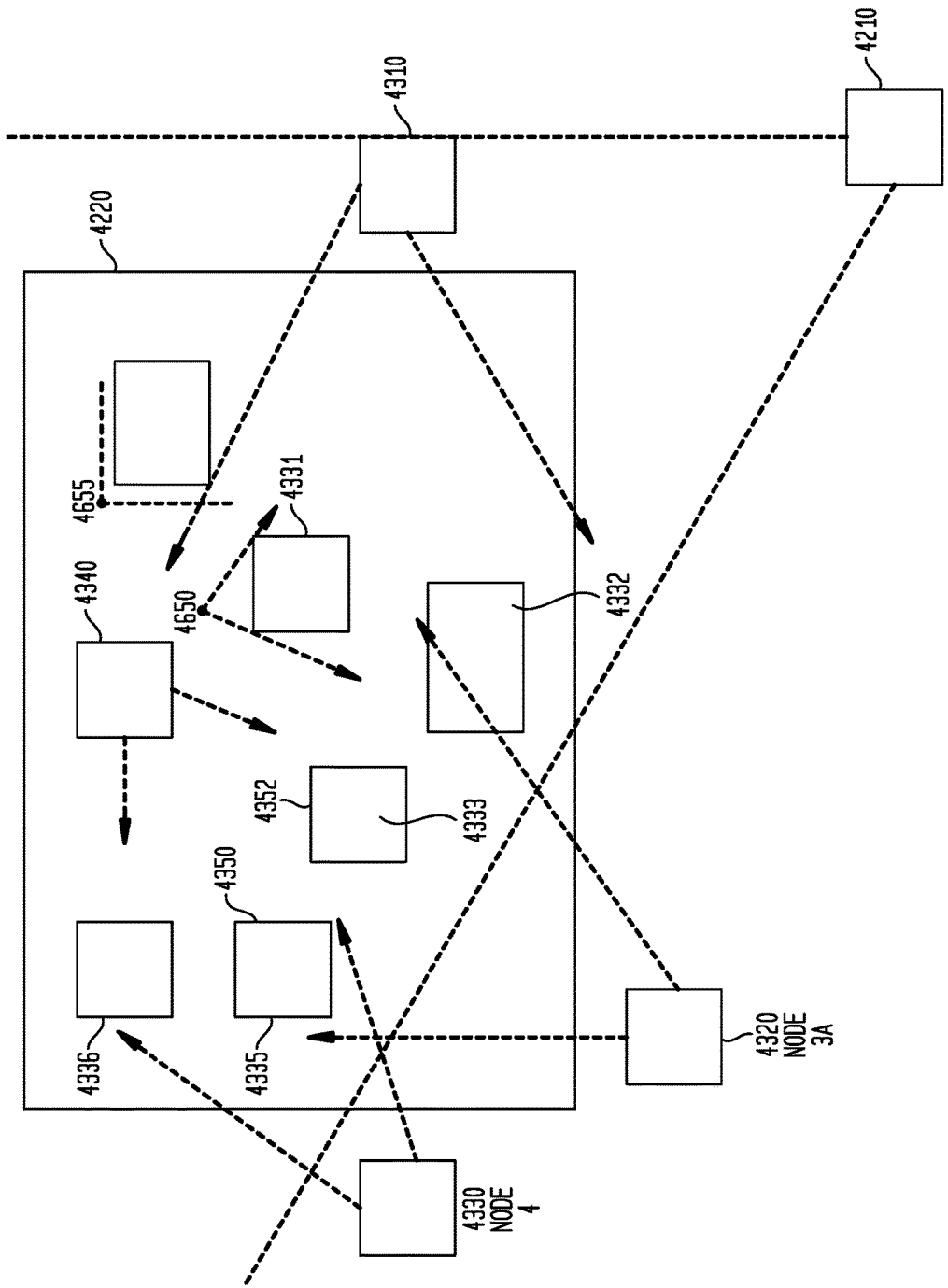

In an alternative an embodiment of the solution is to add additional MAS nodes 4340 to the tower(s) shown in FIG. 46. However, adding these new nodes presents additional challenges in that it increases the cost of the system and portions of the buildings may still be uncovered.

In an alternative an embodiment of the solution, additional MAS nodes may be mounted on poles 4350, 4355 between the metal building and the housing units. However, while this may have some advantages there is an increased cost in including further antenna/transceiver combinations.

Returning to the configuration shown in FIG. 45 or 46, the additional antenna/transceiver configuration (i.e., projecting mast antenna/transceiver combination 4520 or station 4340 or 4350, 4355) may comprise a forward looking antenna (i.e., toward cell windows or the restricted area) and a rear looking antenna (i.e., away from the restricted area). In this manner a determination may be made whether a detected signal is emanating from the restricted area or from outside the restricted area. For example, signal detection may be nominally directed toward the restricted area using the forward looking antenna. The receiving system may be in a wide band operating mode to detect any signal within the bandwidth. When a signal is detected, the receiving system (not shown) may select and activate a corresponding rear looking antenna to capture the detected signal. The receiving system may be retained in a nominal wideband mode when activating the rear-looking antenna or the bandwidth may be narrowed around the frequency of the detected signal. After a detection of the signal in the rear looking antenna, the receiving system may select and activate the forward looking antenna to receive the detected signal. Again, the receiver configuration may be retained in the wide-band mode or in a narrow band mode.

The toggling from forward to rear to forward antenna may continue for a plurality of alternations. The signals from the forward and rear antennas may be provided to a processor which compares the amplitudes of the detected signals. In one aspect of the invention, the multiple samples in each of the forward looking antenna and the rear looking antenna may be summed and/or average and/or processed to normalize the collected samples. The summed, averaged or noramalized samples may then be compared to determine which of the two amplitudes is greater and the greater amplitude signal determines the direction of the detected signal.

In another aspect of the invention, the antenna may represent a phase array antenna provideing forward and backward coverage. As would be known in the art, the phase array antenna may detect a signal in one or more directional antenna patterns to determine an angle of arrival of the detected signal. In this embodiment of the invention, a determination of an angle may determine whether the detected signal is located forward (toward the building) or located to the rear (away from building). In another aspect of the invention, the antenna may be a rotatable antenna with a high degree of directivity (i.e., narrow beamwidth). In this aspect of the invention, a determination of a location of the detected signal may be based on the pointing direction of the rotatable antenna.

Figure 47A:
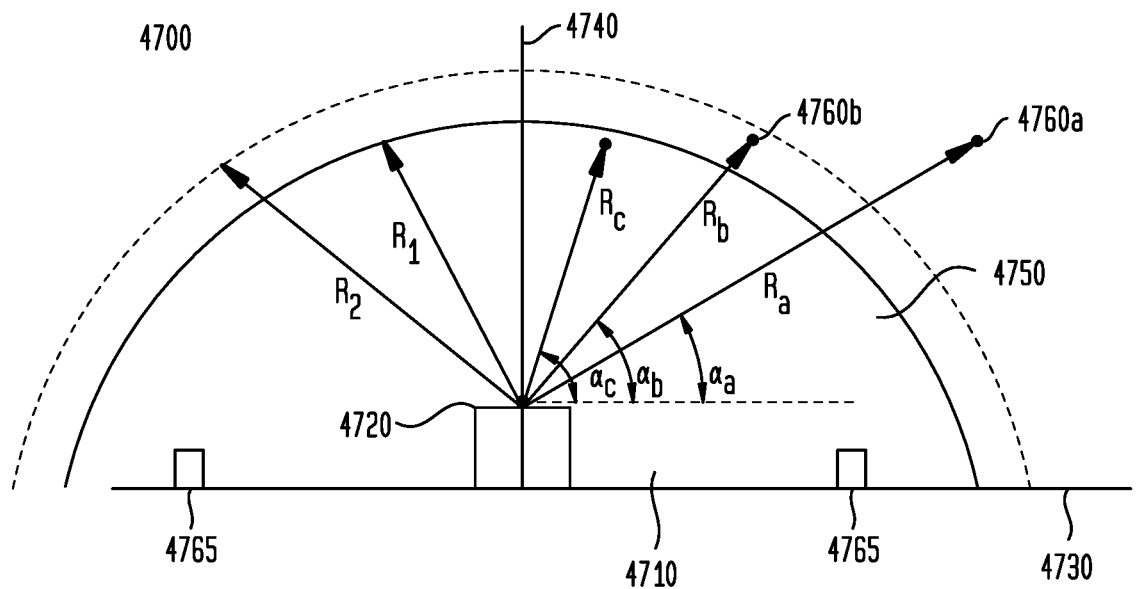
FIG. 47A illustrates a prospective view of a system configuration in accordance with the principles of the invention.

With regard to a still further aspect of the invention claimed, FIG. 47A illustrates an exemplary system configuration 4700 in accordance of the principles of the invention.

As shown, a restricted area 4710 is guarded by a system 4720 which monitors the environment surrounding the restricted area 4710. In an exemplary configuration, system 4720 monitors the surrounding environment 360 degrees in a horizontal plane 4730 and 180 degrees in a vertical plane 4740. In an ideal configuration, the system 4720 provides a hemispherical zone 4750 for the monitoring restricted area 4710.

In one aspect of the invention, a radius of the protection zone 4750 may be adjusted based on a degree of protection required of the restricted area. A nominal radius (R1) of protection zone 4750 may be determined based on predetermined criterion (or criteria). For example, the radius of protection zone 4750 may be greater than on outer dimension of the restricted zone 4750. In this illustrated case, the outer dimension of the restricted zone 4750 may be represented by walls 4765. Furthermore, the nominal radius (R1) of protection zone 4750 may be increased and/or decreased based on a second set of predetermined criterion or criteria. For example, FIG. 47A illustrates two protection area; one represented by radius R1 and the second represented by radius R1. Protection zone determined by radius R2 may represent a warning area whereas protection zone 4750, determined by radius R1, may represent a reaction zone.

As is also shown, in three different configurations, is drone 4760 travelling or hovering about restricted zone 4710. In one configuration, drone 4760 (represented as 4760a) may be positioned at a range (Ra) which is outside the protection zone 4750. In another configuration, drone 4760 (represented as 4760b) may be at a range (Rb) that positions the drone 4760 (4760b) outside the restricted zone 4710 but within the protection zone 4750. In another configuration, drone 4760 may be positioned at a range (Rc) which is within the restricted area 4710.

As shown, drone 4760, in each of the illustrated aspects, may be located at different height (elevations) with respect to a horizontal plane 4740 associated with the system 4720 (or restricted area 4710). The position of the drone 4760 may be represented by a vertical angle of alpha (α; αa, αb, αc, respectively) measured with respect to horizontal plane 4740.

Figure 47B:
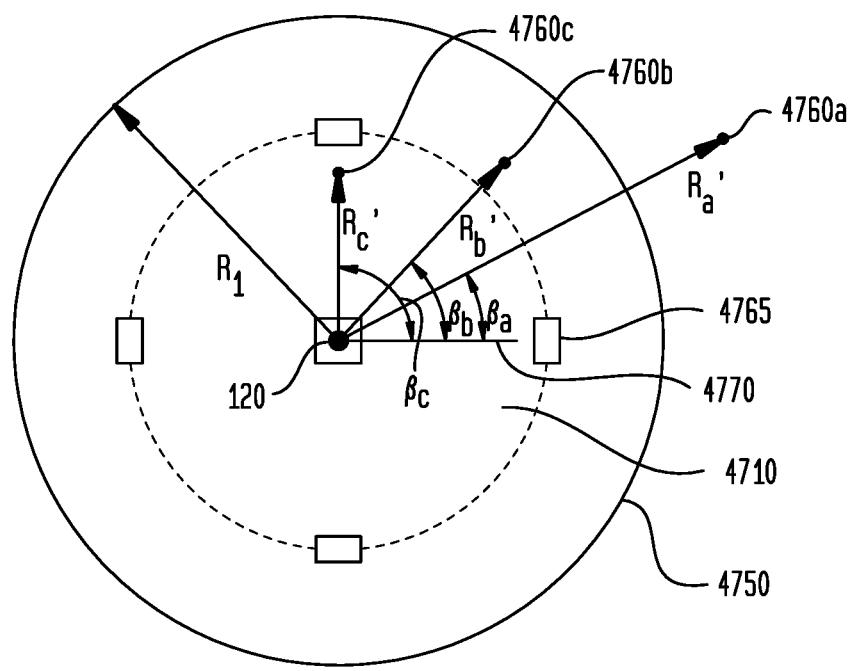
FIG. 47B illustrates a planar view of a system configuration in accordance with the principles of the invention.

FIG. 47B illustrates a planar view of the prospective view of the system configuration shown in FIG. 47A.

As illustrated, drone 4760 (i.e., 4760a, 4760b, 4760c) may be at different angles with respect of a center point (for example) of restrictive zone 4710. The position of the drone 4760 (i.e., 4760a, 4760b, 4760c) may be represented by a distance (R'; R'a, R'b, R'c, respectively) and angle beta (β; βa, βb, βc, respectively) measured with respect to an axis 4770 in the horizontal plane 4740. FIG. 47B illustrates a conventional orientation of an X-axis in an X-Y coordinate system. However, it would be appreciated that angle beta may be taken with respect to any axis in the X-Y coordinate system. As would be known, the distance or radius R' is a projection of radius R on horizontal plane 4740. Conventional the horizontal plane 4740 is a horizontal plane in which system 4720 resides. When system 4720 is located at an elevated location, as shown in FIG. 47A, the horizontal plane 4740 and the angles measured with regard to a horizontal plane on a ground surface may be translated and/or normalized using known translation procedures.

In addition, from the mathematics of spherical geometry, the position of drone 4760 may be determined using a polar coordinate system (R/theta (θ)), wherein theta (θ) represents a polar angle that considers angles alpha and beta and R' represents a polar radius.

Figure 48:
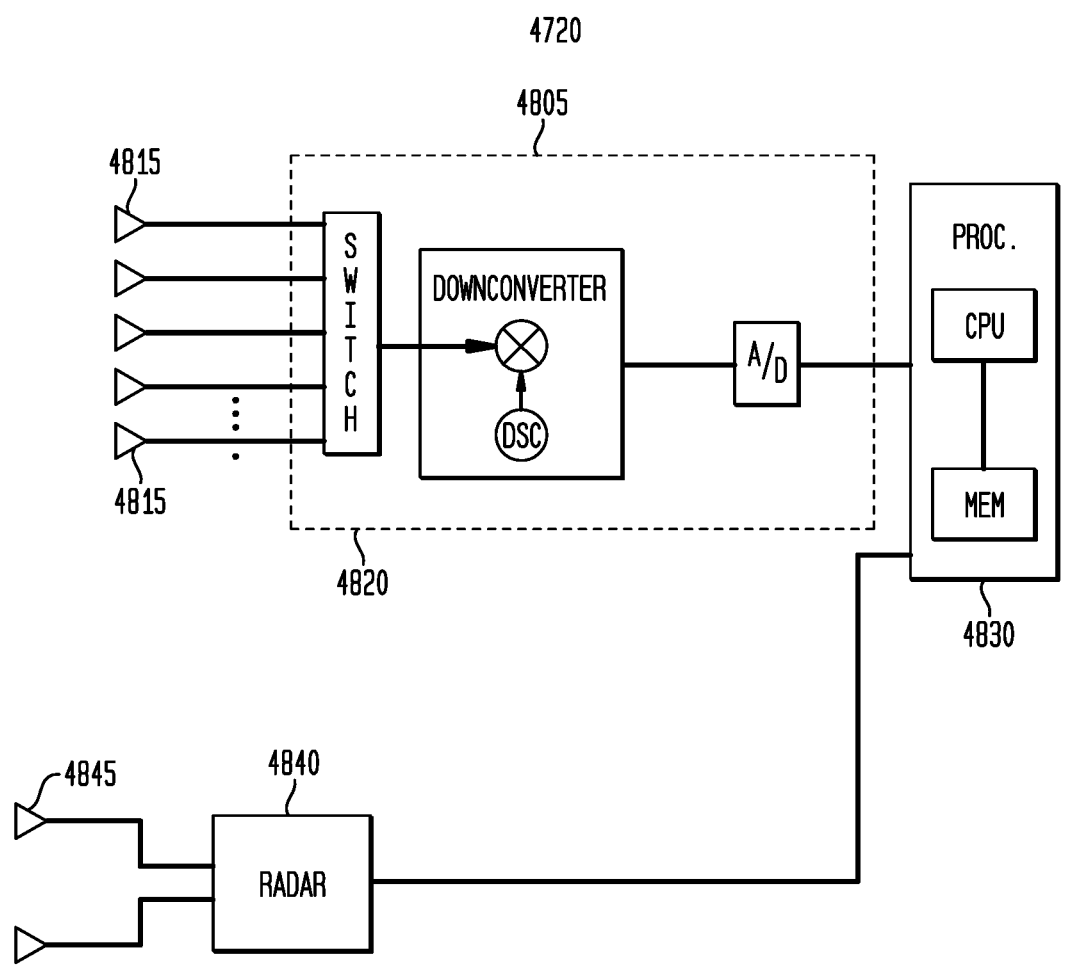
FIG. 48 illustrates a block diagram of an exemplary system in accordance with the principles of the invention.

FIG. 48 illustrates a block diagram of an exemplary system 4720 in accordance with the principles of the invention.

As illustrated, system 4720 includes a detection system 4805 including at least one receiving antenna 4815 which receives signals propagating within an environment. Signals received by antenna(s) 4815 are provided to a transceiver system 4820. Transceiver (i.e., a transmitting/receiving) system 4820 includes components, such a switch, a downconverter, which includes a mixer and a local oscillator, and an analog/digital convertor. Downconverter processes the received signals from a received signal frequency (RF) to an intermediate frequency (IF). A/D converter converts the signal from analog to digital and the digital representation Is provided to processor 4830. As transceiving system 4820 and the associated components are well known in the art, the specific details for processing a received signal need not be discussed in detail.

The digitized received signals are then provided to a processing system 4830, which processes the received signals to determine characteristics of the received signals. Processing system 4830 comprises processing units and memories, which include code for decoding and processing the received signals, are also known in the art and the specific details for processing digitized received signals need not be discussed in detail.

In one aspect of the invention, processing system 4830 may determine a location (R'/theta) of the source of the receiving signals In addition, processing system 4830 may determine control and/or characteristics of the device (e.g., drone) based on the received signals.

Once the determined control and/or characteristics suggest or valid the presence of drone 4760, the processing system 4830 may provide for the management of the detected drone 4760.

System 4720 may further include a radar type system 4840 which generates and transmits a steam of pulses. Those pulses intercepting an object are reflected by the object. The reflected pulses may then be received by one or more of antenna 4815 or a separate antenna system 4845. A time difference between the transmission of a pulse and the reception of the pulse may be used to determine a distance to the object. An angle to the object may be determined from measurements of the amplitude of the received pulse by the antenna 4815 or antenna system 4845. As would appreciated antenna 4815 and/or antenna system 4845 may represent a phase-array antenna system, which allows for the determination of a horizontal angle (beta) and a vertical (or elevation) angle (alpha).

In one aspect of the invention, processing system 4720 may detect the presence of a drone 4760 based on the received radar pulses or may detect the presence of a drone 4760 based on detection of one or more of the uplink signals sent to the drone, from a control system, or the downlink signals sent from the drone to the control system. In a combination system using both radar system 4840 and detection system 4805, the processing system 4830, may, after radar detection of an object, direct the detection system 4805 to target for detection a signal in the frequency bands associated with uplink and/or downlink transmissions.

In another aspect of the invention, detection system 4805 may continuous monitor one or more known frequency bands associated with uplink and/or downlink transmission of drones. In this case, the antenna system may be spatially fixed (i.e., 360 degrees horizontally, 90 degrees vertically) or may be of a scanning type. A scanning type antenna provides for greater sensitivity as the antenna 4815 is directional and a complete circular rotation of the antenna 4815 is required to cover the horizontal plane. Alternatively, the antenna system may scans multiple frequency bands and spatial zones simultaneously.

Upon detection of the uplink and/or downlink transmission signals processor 4830 may begin one or more processes to manage and/or control the viewable image of the detected drone.

Figure 49:
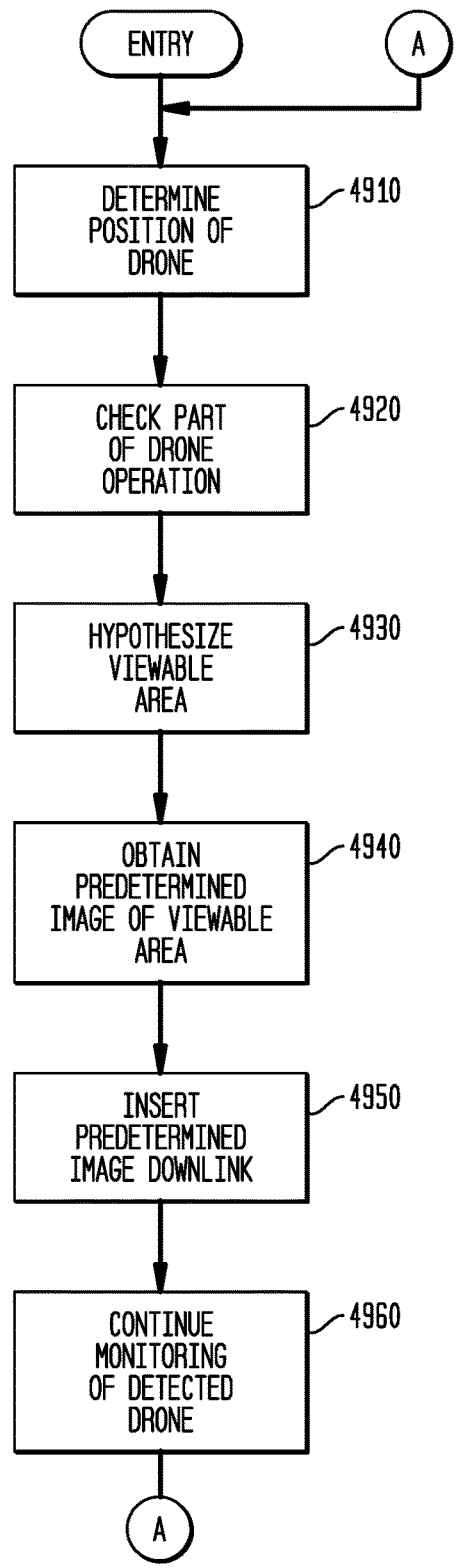
FIG. 49 illustrates a flow chart of an exemplary processing in accordance with a first embodiment in accordance with the principles of the invention.

FIG. 49 illustrates a flow chart of a first exemplary processing in accordance with the principles of the invention.

At step 4910, a position of a detected drone (i.e., 4760, FIG. 47A) is determined. As discussed above, the position of the drone may be determined based on a detection from one or both of radar detection system 4840 or a signal detection system 4805. The position of the drone may be translated from a polar coordinate system to a positional system such as an X-Y system or a longitude/latitude system. Similarly, a position of the drone may be determined based on a detection of a GPS location signal transmitted by the drone back to a control station. In this case, the drone 4760 may include a GPS receiving system, which provides the drone information regarding its position. The drone 4760 may provide the GPS determined position to the control system in order for the control system to manage and maintain control of the flight characteristics of the drone.

At step 4920, a determination of the operating characteristics of the drone may be determined. For example the operation of a camera (e.g., still, video, zoom, etc.) may be determined from uplink transmission characteristics.

At step 4930, a view of the restricted area 4710 from the position (location and elevation) of the drone 4760 may be hypothesized. The view of the restricted area 4710 may be hypothesized as the physical position of the drone may not represent the actual view as the operating characteristic of the on-board camera may alter the effective range. For example, a view of a restricted zone 4710 may be altered based on a zoom level of the on-board camera. Thus, a no-zoom condition may provide a wide angle view from a detected position. However, a 6× zoom, for example, narrows the view from the same detected position.

Based on the location and elevation of the drone, a predetermined image of the hypothesized view may be obtained from a data base at step 4940. In one aspect of the invention, the predetermined image may represent views of the restricted area 4710 from similar locations and elevations. In one aspect of the invention, the predetermined images are stored in a data base which is accessible through the location and elevation angle. In another aspect of the invention, the predetermined images may be based on location and dynamically adjusted based on the elevation angle. In still another aspect of the invention, an interpolation of adjacent images may be performed for those drone positions which do not have corresponding predetermined images.

At step 4950, the predetermined image is inserted into the downlink data stream from the drone to the control system.

At step 4960, the detection system continues to monitor the operation of the detected drone by continuous monitoring of the one or both of the uplink transmission and the downlink transmission. Processing continues at step 4910 to continuously monitor the operation of the drone.

Figure 50:
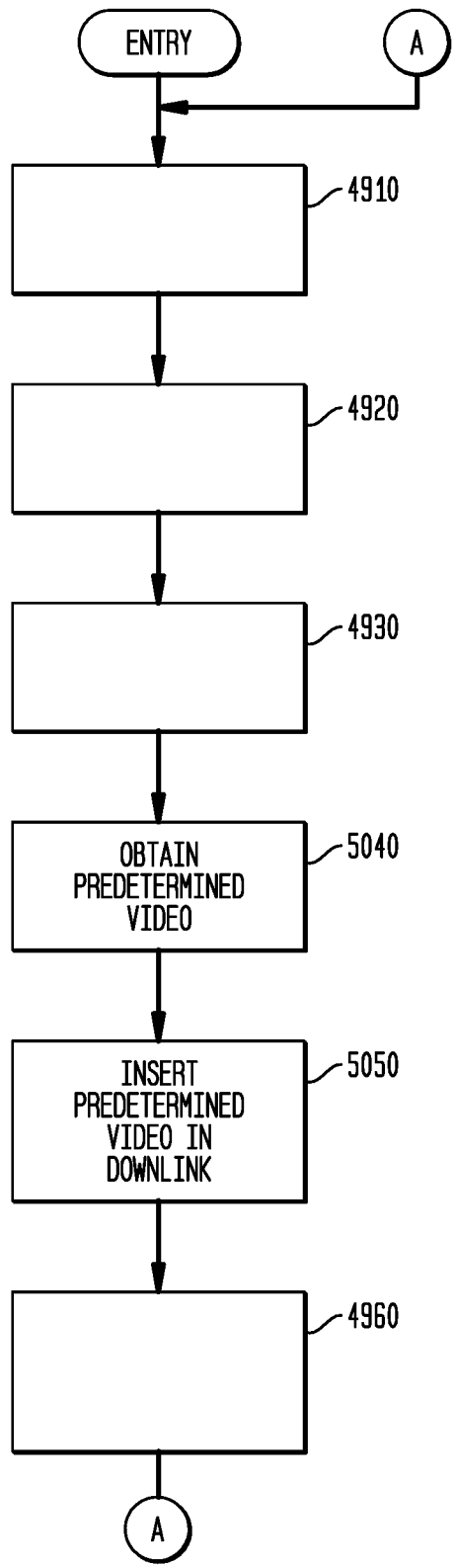
FIG. 50 illustrates a flow chart of an exemplary processing in accordance with a second embodiment in accordance with the principles of the invention.

FIG. 50 illustrates a flow chart of a second exemplary processing in accordance with the principles of the invention.

In this illustrated aspect, steps 4910-4940 and 4960 are similar to those described with regard to FIG. 49 and need not be repeated.

After determining the position and operating condition of the drone, as previously discussed, a predetermined video image associated with the position of the drone may be accessed from a data base (similar to that described with regard to step 4940). At step 5050, the predetermined image is inserted into the downlink stream.

Continuous monitoring of the drone position is performed by the processing returning to step 4910 (FIG. 50) as discussed with regard to step 4910 (FIG. 49).

Figure 51:
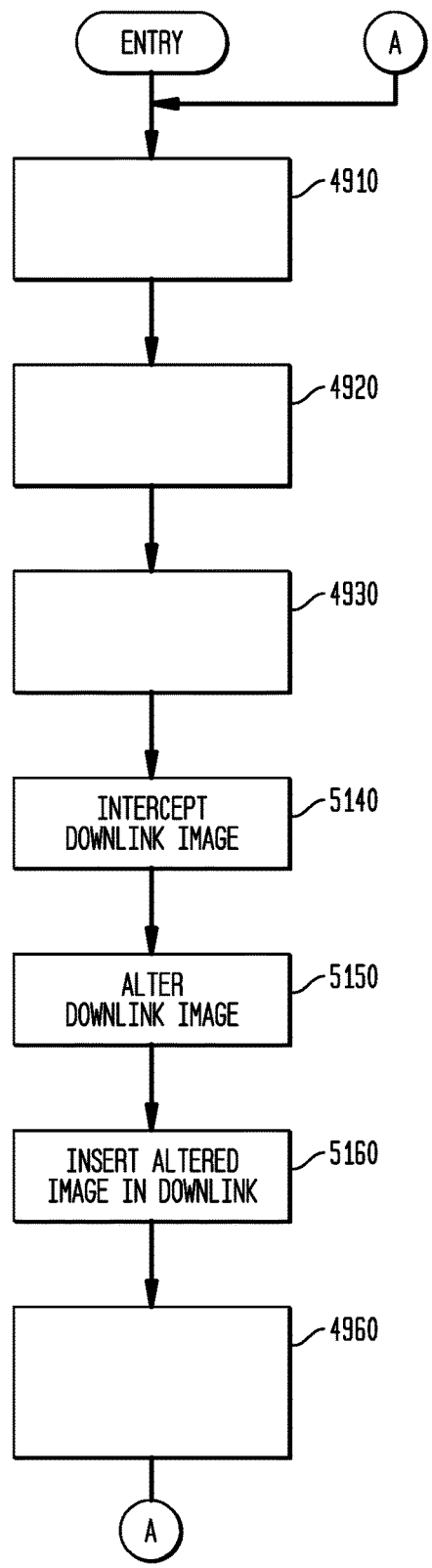
FIG. 51 illustrates a flow chart of an exemplary processing in accordance with a third embodiment in accordance with the principles of the invention.

FIG. 51 illustrates a flow chart of a third exemplary processing in accordance with the principles of the invention.

In this illustrated aspect, steps 4910-4940 and 4960 are similar to those described with regard to FIG. 49 and need not be repeated.

After determining the position and operating condition of the drone, as previously discussed, the image (still or video) in the downlink stream is intercepted at step 5140. At step 5150, the images within the intercepted downlink stream is digitally altered. In one aspect of the invention, the alteration may remove one or more objects from the images. In another aspect of the invention, the alteration may include one or more objects in the images.

At block 5160, the altered images are inserted into the downlink stream.

Continuous monitoring of the drone position is performed by the processing returning to step 4910 (FIG. 51) as discussed with regard to step 4910 (FIG. 49).

In a preferred embodiment of the invention the Managed Access System utilizes a Software Defined Radio (SDR) transceiver system which incorporates the time domain invention, a phased array set of antennas and phased array wireless communication invention, the system tracks, locates, monitors, and when necessary controls and disables said Drone activity in and around the area of interest of the Managed access system. This is accomplished though a set of invention, working together and/or individually. (1) tracking and locating the Drone using the uplink/downlink communication frequencies of the drone, (2) using the frequency of the blades to detect and track the drones, (3) sonar and motion detection of the drone, (4) CCTV motion detection tracking (5) SDR and small cross section radar to identify location of drone, (6) audio detection of the drone (7) explosive detection sniffer, (8) ion detection analyzer, (9) tracking and locating the Drone driver using the communication frequencies of the drone and the other methods listed above, and 10) ammonia detector, 11) acoustical detector; 12) Magnetic field of the drone, and the like. Once the Drone is located the MAS system alerts the appropriate personnel and deploys the counter measures, depending on the detection protocol and procedures set up, parameters for determining response include size of drone, cargo of drone, location of drone; location of drone driver, the countermeasures options include but is not limited to: 1) jamming the communication frequencies of the drone, 2) deployment of Birds of prey, 3) speadnet trajectory, 4) Trajectory options, 5) Focus EMP trajectory, and the like.

In a preferred embodiment of the invention, the a programmable radio front-end to receive and transmit specific frequencies, in a well implemented development of the Software Defined Radio (SDR) to be able to implement filtering in real-time to implement spectrum hoping. This embodiment not only allows you to define and program the signal bandwidth, amplitude via a variable gain amplifier, Baseband processing, center frequency, with up to 8 pll digital up/down conversion, front-end FCC defined selectable uplink/downlink band pass filters, noise floor reduction circuitry, in a preferred embodiment of the invention a Programmable power amplifier with individualize channel selected multiple band pass filter(s) are added to the chain to filter out unwanted amplification allowing for a clean hi power up to 200 watt LNA. A programmable array antenna which can be set the optimize the phased array data and the like.

In a preferred an embodiment, where it is the intention to run an automated prisons to lower the necessary number of personnel and still the run a safe and secure facility. This automated facility is controlled by a centralized command and control center and/or a decentralize compartmental command and control center for all functions of the facility including movement of the persons within the facility. In this type of a facility, where complete and accurate identification and location of all personnel is critical, the tracking of individuals, their wireless transmission devices, cell phones, identification units, Willkie-Talkies, and verifying their access to authorized areas, integrating their movement with CCTV and positive facial identification, biometric identification, preventing movement into unauthorized area, developing inclusion zones, creating exclusion zones, ensuring proper count, providing an ability to restrict and/or authorized movement a specific design of the facility and convergence of technology is essential. The technologies discussed herein integrated to the central control provide the backbone and framework to operate such an automated facility, wherein each staff member and inmate transmission facility will allow specific movement throughout the facility. All movement throughout the facility may be monitored through CCTV and facial recognition. At each egress point, movement will be restricted to individual movement through one area to another area of the facility. For example, daily functions include, meals, medical, programs, court visits, and recreation, may be functions that may be monitored and controlled. As an example of the facility of the needs within the automation and the parameters and rules, Example—Inmate Movement: need a creation of a Movement list and movement schedule, scheduling recourses, allocation seats in particular Programs area classrooms, Access to computers, access to the Law library, time allocation in program and use facility assets, Enemy exclusion, (predator sheep wolf exclusion) conflicts in scheduling GED, adult education, culinary arts anger management developing Waiting list, ability for inmates to signup, Morning schedule and movement, afternoon schedule and movement, Pre-trail and religious services scheduling. Data mining database techniques and methodologies may be executed to provide for inmate scheduling movement and allocation of assets for the inmate relying on transmission facility authorization. The transmission facility will control access to all moment, asset recourses, doors and egress, facility recourses and the time allocation on facility assets and in which movement takes place. Because of minimum human interaction, display kiosks displays schedule and informs the inmate where it is scheduled and the like.

In this embodiment, where there is limited, corrections personnel, all cells will be designed to allow outdoor access and unit access. The facility structure, may need to be modified to allow inmate access to the outdoor area, this design modification eliminates the need for outside movement and still provides greater freedom for the inmates with less need for direct supervision and the like.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

One of the challenges of a controlled managing wireless communications is making adjustments to the Managed/controlled Environment/MAS coverage area and having to constantly adjusting to the changes in the Macro/TELCO environment, that includes automatic and/or technology assisted changes in response to the commercial carrier(s) making frequency changes, Band changes, Protocol changes, Parameter changes, power changes, changes in the components of the signal and broadcasting tower changes and the like. All of these changes in the macro channels create challenges in controlling unauthorized wireless communications.

Another challenge of a managing wireless communications is the ability to monitor and control a wireless device within a pre-defined geographic area and to accurately determine the specific location of said wireless device.

Another challenge of a controlled managing wireless communications is the ability to allow authorized wireless had set to connect to the mobile commercial carrier.

Another challenge of a controlled managing wireless communications is the ability to include a geo location system to detect when a wireless communications device enters or exits a defined geographic area. It is also important to be able define the specific geographic coverage area and the ability to set multiple areas within a large complex location.

Another challenge of a controlled/managed wireless communications system is the detection, controlling and manipulation of a drone and/or drone like apparatus (UAV) (surveillance) technology is the ability to include a geo location system to detect when a wireless communications device enters or exits a defined geographic area.

Another challenge of a controlled managing wireless communications is the ability to providing authorized handsets a WiFi connection via the Access Network Discovery and Selection Function ANDSN is a key technology for enabling carriers to offload data traffic from the mobile network and is an element of the 3GPP standard that is designed to assist mobile devices in discovering offload destinations, including Wi-Fi, WiMAX, and CDMA2000 networks.

Another challenge of a controlled managing wireless communications is the ability to providing authorized handsets via a WiFi SIP connection.

Another challenge of a controlled managing wireless communications is the ability to protect against SMS received e-sim multiple capability Another challenge in developing a controlled wireless communications system is the ability to provide an accurate notification when a wireless communications device enters or leaves a specific area Another challenge of a controlled managing wireless communications is the ability to provide an accurate geo-fence and/or a virtual perimeter for a real-world geographic area. A geo-fence could be dynamically generated—as in a radius around a store or point location, or a geo-fence can be a predefined set of boundaries, like school attendance zones or neighborhood boundaries.

Another challenge is keeping up with the every growing FCC spectrum allocation. Currently the NTIA has a 500 MHZ commercial bandwidth increase plan.

The use of a geo-fence is called geo-fencing, and one example of usage involves a location-aware device of a location-based service (LBS) user entering or exiting a geo-fence. This activity could trigger an alert to the device's user as well as messaging to the geo-fence operator. This info, which could contain the location of the device, could be sent to a mobile telephone or an email account.

Another challenge of a managing wireless communications is the ability to where the managing system is not connected and/or not communicating with the commercial carrier determining the locations of the wireless communications devices via Global Positioning System (GPS) and/or Wireless Positioning System (WPS) without using cell tower and Wi-Fi access points.

One embodiment of the invention is to place multiple Managed Access transceiver system throughout the complex see (complex 1 diagrams). Each Managed Access transceiver system is made up of multiple Software Defined Radios (SDR) programmed to cover all frequencies of all of the commercial carriers, 700, 806, 850, 1700/2100 (AWS), 1900, 2.3G and 2.5G bands (where applicable) for 2G, 3G, 4G, 5G (CDMA, GSM, UMTS, and LTE cellular) protocols or any new technology. Additionally the SDR's are programmed to cover each of the WiFi frequency band.

One embodiment of the invention is to designing and configure the SDR circuit with Dual frequency bandwidth capability, (example one frequency bandwidth is 100 Mhz-2 Ghz radio frequency and the second frequency bandwidth is covering 2 Ghz-6 Ghz frequency spectrum) this capability provides the system to expand dynamically as the new FCC spectrum comes on line, such as the new proposed 5.9 GHz frequency band or the proposed 600 Mhz band.

One embodiment of the invention is the designing, developing, configuring and manipulating the 3GPP wireless communication standard and/or the Core network functionality and/or handset functionality of the cellular and wireless protocols and handset parameters to better control and hold on to unauthorized devices and to re-direct authorized devices. The manipulation of the following parameters and finality include at least some of the following, tracking area Functionality, the Evolved Packet Core functionality and protocol stack functionality, Mobility Management Entity functionality, load balancing functionality, outbound/inbound roaming functionality, signal load, control plane and location functionality, paging and authentication/authorization Parameters, IP connectivity, Mobility function functionality, area connections parameters, gateway, selection, registration processes, data transfer functionality, signal handover, Serving Gateway functionality, node b parameters and functionality, radio resource management functionality and the like.

One benefits of configuring and/or manipulating the 3GPP wireless communication standards and/or core network functionality and/or handset functionality is the ability to do at least one of the following actions/functions: move a handset or set of handset(s) to a specific channel; reject and/or accept a handset or set of handset(s) to and/or from a specific channel or a specific set of channels; preventing and/or allowing a handset or set of handset(s) to/from a channel or a specific set of channels; moving a handset or set of handset(s) from one band and/or one frequency, and/or one protocol to another; increasing/decreasing a handset or set of handset(s) attractiveness to connect to a specific channel and/or frequency and/or band and/or protocol, disabling a handset or set of handset(s) from connecting to a channel or a specific set of channels, re-directing a handset or set of handset(s) to the Macro, and/or to WiFI, and/or a backhaul portal and/or to a SIP interface and/or to a femto and/or a another core network and/or another service provider and or another network and the like.

Depending on the desired results the configuring and/or manipulating of the 3GPP wireless communication standards and/or core network functionality and/or handset functionality can be to alone or in concert and/or in conjunction with other functionality changes.

In a preferred embodiment of the invention is to designing and configure the high gain 40 Db front to back ratio, 30 db side lobe directional antennas circuit with Dual frequency bandwidth capability, (example one frequency bandwidth is 100 Mhz-2 Ghz radio frequency and the second frequency bandwidth is covering 2 Ghz-6 Ghz frequency spectrum) this capability provides the system to expand dynamically as the new FCC spectrum comes on line, such as the new proposed 5.9 GHz frequency band or the proposed 600 Mhz band and the like.

A preferred embodiment of the invention is to designing and configure the SDR amplification system The SDR front and transceiver is set with each circuit configured for each channel covered by said amplification system, This prevents Noise on out of spectrum frequencies and provides for superior amplifications and a −110 db noise floor and the like.

One embodiment of the invention is to configure the programmable radio to communicate on with WiFi devices then tune the programmable radio to a specific set of Wifi parameters to attract authorized and/or unauthorized wireless Wifi enabled devices and the like.

One embodiment of the invention is to determine location of each wireless communication device detected. Said wireless communication device include but are not limited to cellular protocol enabled devices, WiFi enabled devices, transceiver enabled devices, transmitter enabled devices, and receiver enabled devices and the like.

In a preferred embodiment of the invention the determination of the location of the device is improved for greater accuracy with at least one of the following methods and/or a combination of said methods: determination the best band, and/or channel, and/or frequency, and/or signal formation, and/or signal characteristics, and/or protocol and/or sets of bands, and/or channels, and/or frequency(s), and/or signal formation(s), and/or signal characteristics, and/or protocols which provide the best uplink and/or downlink signal characteristics to determine location and the like. Multiple techniques including C-pitch Carrier Signal power, RSSI value, EC/No value, phase array measurement, time domain measurement and/or time domain determination and other location techniques discussed the this application and related applications and the like.

In a preferred embodiment of the invention is to provide a at least one SDR programmed to scan all pertinent commercial carrier channels and bands to determine each and all carriers network parameters for each downlink channel, including the Network Name, Technology being decoded such as (CDMA, GSM, UMTS, LTE), determine the UARFCN, ARFCN, PDSC, RSSI, Ec/Io, PLMN, CellID, LAC, Channel, NID, SID, BSSID, Band, BTS frequency for all cells detected, MS frequency for all cells detected, relationships among controlling and neighbor cells, and the ability to automatically refresh scan data. Additionally the scans will include determining the C-pitch Carrier signal power, RSSI value, EC/No value for each signal.

In another preferred embodiment of the invention is to provide at least one receiver system programmed to scan all pertinent Managed Access channels and bands to determine each and Managed Access parameters for each downlink channel, including the Network Name, Technology being decoded such as (CDMA, GSM, UMTS, LTE), determine the UARFCN, ARFCN, PDSC, RSSI, Ec/Io, PLMN, CellID, LAC, Channel, NID, SID, BSSID, Band, BTS frequency for all cells detected, MS frequency for all cells detected, relationships among controlling and neighbor cells, and the ability to automatically refresh scan data. Additionally the scans will include determining the C-pitch Carrier signal power, RSSI value, EC/No value for each signal.

In preferred embodiment of the invention, a receiver system is a custom SDR designed system, with said custom SDR includes at least, a transceiver module which is capable of communicating in at least one of the following protocols all cellular protocols, GSM, UMTS EVDO, IXrtt, D-AMPS, CDMA, IS-95 CDMA2000, AM, FM, IMT-2000, WiMAX, FDMA, AMPS, GAN, WiFi, GPRS, SMS, TDMA, HCSD, CSD, HSDPA, WCDMA iDEN, Mobitex, NMT, PDC, PHS, TACS, TDMA, DECT, TD-SCDMA, WCDMA, IMT-2000, WiDEN, BWA and the like.

In preferred embodiment of the invention, a receiver system is a custom SDR designed system, with said custom SDR includes at least, a decoder module which is capable of decoding the communications of at least one of the following protocols all cellular protocols, GSM, UMTS EVDO, IXrtt, D-AMPS, CDMA, IS-95 CDMA2000, AM, FM, IMT-2000, WiMAX, FDMA, AMPS, GAN, WiFi, GPRS, SMS, TDMA, HCSD, CSD, HSDPA, WCDMA iDEN, Mobitex, NMT, PDC, PHS, TACS, TDMA, DECT, TD-SCDMA, WCDMA, IMT-2000, WiDEN, BWA and the like.

In preferred embodiment of the invention, said custom software designed system, includes at least, an amplitude detection circuit, a phased array detection circuit, time domain circuit based on at least nanosecond per foot accuracy, and the like.

Another embodiment of the invention is to provide and Managed Access spectrum analysis program which compares the commercial carrier network scans and compare them to the Managed Access channels, protocols and bands, and an analysis program which determines and automatically adjustments the parameters of the signals of the Managed Access system to maintain a system which controls all wires communication within the defined restricted communications area and the like need to be made Another embodiment of the invention is software designed circuit board which includes at least, the time domain stop clock invention and programmed to scan all.

Another embodiment of the invention incorporates the ability of covering 4G/LTE on the 700, 806, 1900, 2100 and 2.3 ghz bands. The MAS solution also includes 802.11 Wi-Fi on the 2.4 ghz band. The solution is designed such that future generations of wireless protocols can be integrated simply with little impact to on-site hardware by utilizing the latest software defined radio technology. The system also stays up to date on the latest developments in future technologies to minimize the integration time between new technology releases and MAS integration; this includes the proposed 5G network which is anticipated for 2021.

In an preferred embodiment of the invention a drone detection system may comprised some of the following components, an array of sensory devices (see diagram below) positioned to cover the exterior perimeter of the complex/facility. The compellations of sensory devices provide an integrated set of detections technologies to detect and locate drone/quadcopter trying entering the perimeter of the complex The technologies include a set of at least, a software defined detection and intercept system to Scan, detect, identify and locate the RF transmissions of the drone/quadcopter (uplink/downlink), an array acoustical sensors, optical sensor, which are used to scan and detect the approach of a drone/quadcopter and accurately locate its position and direction.

These three arrays are integrated with daylight and infrared image detection system which tracks, confirm identify, characterizes and monitors the movement of the drone/ quadcopter. Additionally the integrated signal detections sensors along with the image detection system allow for the identification of certain drone models and types. Specific characteristics of new drones are continuously updated in the system, in order to generate database of drone signatures. These signatures are then stored in a database and are used for drone recognition and identification purposes. Optical sensor includes a range and thermal sensor, video unit, laser rangefinder, an asset recognition unit and a predictive motion and movement analysis system and the like.

It is expressly intended that all combinations of those elements that perform substantially the same function in substantially the same way to achieve the same results are within the scope of the invention. Substitutions of elements from one described embodiment to another are also fully intended and contemplated. For example, while the term "cell phone" or "transmission facility", "transmission device", "mobile device", "handset", have been used herein, such terms relate to a general class of wireless transmission devices that includes standard cell phones, smart phones (e.g., PALM CENTRO), and iPhones. PALM is a registered trademark and CENTRO is a trademark of the Palm Inc., Sunnyvale, Calif. iPhone is a registered trademark of Apple Inc. Cupertino, Calif.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

What is claimed is:

1. A manage access system for managing wireless devices in a restricted area, the system comprising:
   at least one antenna positioned outside of a restricted area, said at least one antenna providing coverage of the restricted area;
   at least one second antenna providing coverage not covered by said at least one antenna;
   a receiving system configured to:
      receive signals from said at least one antenna and said at least one second antenna; and
   a processor configured to:
      receive a signal from said receiving system detected by at least one of said at least one second antenna;
      determine a direction of the received signal, said determination of direction comprising:
         alternate a direction of signal detection associated with said at least one of said at least one second antenna;
         receive said signal in at least one of said alternant direction of signal detection;
         associate said direction of said received signal with a direction of signal detection having a largest amplitude of said received signal; and
      process the received signal based on the determined direction being within the restricted area, said processing comprising:
         identify a wireless device based on information associated with the received signal;
            determine an allowability of the identified wireless device based on the identity of the wireless device; and
            prevent continued transmission from the identified wireless device when allowability indicates not allowed.

2. The system of claim 1, wherein said maximum amplitude is determined over at least one cycle of said altering of said direction signal detection.

3. The system of claim 1, wherein said altering of said direction of signal detection occurs upon detection of said signal.

4. The system of claim 1, wherein said alternating of said direction of signal detection comprises:
   changing said direction of signal detection from at least a first direction to a least a second direction.

5. The system of claim 1, wherein said alternating of said direction of signal detection comprises:
   changing a processing bandwidth of said receiving system.

6. The system of claim 1, wherein said alternating of said direction of signal detection comprises:
   changing a tuning frequency of said receiving system.

7. The system of claim 1, wherein said receiving system comprises:
   a receiver associated with each of said at least one antenna and at least one second antenna.

8. The system of claim 1, wherein said at least one second antenna comprises a narrow beam antenna.

* * * * *